(12) United States Patent
Seki et al.

(10) Patent No.: US 11,575,181 B2
(45) Date of Patent: Feb. 7, 2023

(54) BATTERY, BATTERY PACK, AND STATIONARY POWER SUPPLY

(71) Applicant: KABUSHIKI KAISHA TOSHIBA, Minato-ku (JP)

(72) Inventors: Hayato Seki, Kawasaki (JP); Yasuyuki Hotta, Tokyo (JP); Shinsuke Matsuno, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 548 days.

(21) Appl. No.: 16/551,098

(22) Filed: Aug. 26, 2019

(65) Prior Publication Data

US 2020/0295334 A1 Sep. 17, 2020

(30) Foreign Application Priority Data

Mar. 15, 2019 (JP) .............................. JP2019-048203

(51) Int. Cl.
*H01M 10/42* (2006.01)
*H01M 50/463* (2021.01)
*H01M 50/46* (2021.01)

(52) U.S. Cl.
CPC ....... *H01M 50/463* (2021.01); *H01M 10/425* (2013.01); *H01M 50/46* (2021.01); *H01M 2010/4271* (2013.01); *H01M 2220/10* (2013.01)

(58) Field of Classification Search
CPC ............... H01M 50/46; H01M 50/463; H01M 10/425; H01M 2220/10; H01M 2010/4271
See application file for complete search history.

(56) References Cited

U.S. PATENT DOCUMENTS

| 10,128,542 B2 | 11/2018 | Hayashi et al. |
| 2014/0199579 A1* | 7/2014 | Morita ................ H01M 4/583 252/507 |
| 2017/0373298 A1 | 12/2017 | Kitoh et al. |
| 2018/0083246 A1 | 3/2018 | Gonda et al. |
| 2018/0277899 A1 | 9/2018 | Takami et al. |
| 2019/0288332 A1 | 9/2019 | Hotta et al. |

FOREIGN PATENT DOCUMENTS

| JP | 2016-129156 A | 7/2016 |
| JP | 2017-59529 A | 3/2017 |
| JP | 2017-91949 A | 5/2017 |
| JP | 2017-183182 A | 10/2017 |
| JP | 6383038 B1 | 8/2018 |
| JP | 2019-160748 A | 9/2019 |
| WO | WO 2016/147497 A1 | 9/2016 |
| WO | WO 2016/204050 A1 | 12/2016 |
| WO | WO 2017/002815 A1 | 1/2017 |

\* cited by examiner

*Primary Examiner* — Osei K Amponsah
(74) *Attorney, Agent, or Firm* — Oblon, McClelland, Maier & Neustadt, L.L.P.

(57) ABSTRACT

According to one embodiment, a battery includes a container member, a separator, a first electrode, a first electrolyte, a second electrode and a second electrolyte. The container member has a housing space in the interior, and the separator is housed in the housing space of the container member. The separator includes a bag, and the first electrode is housed in an interior of the bag. The first electrolyte is retained on the first electrode in the interior of the bag. The second electrode is located outside the bag in the housing space. The second electrolyte is retained by the second electrode outside the bag in the housing space.

26 Claims, 16 Drawing Sheets

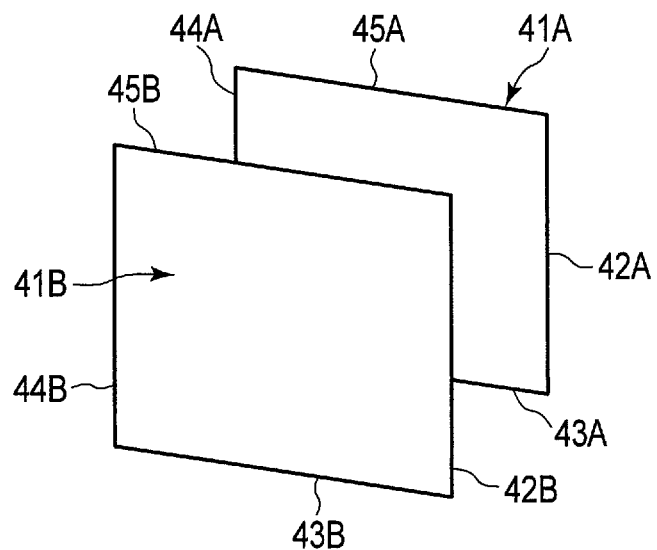
F I G. 5A
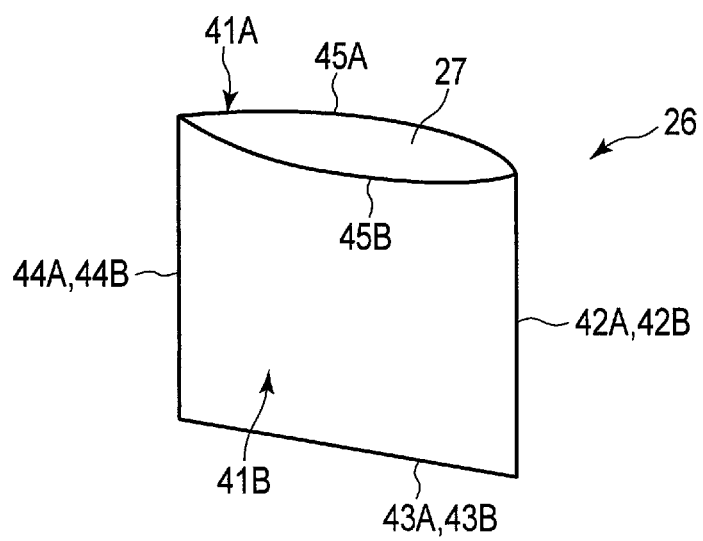
F I G. 5B

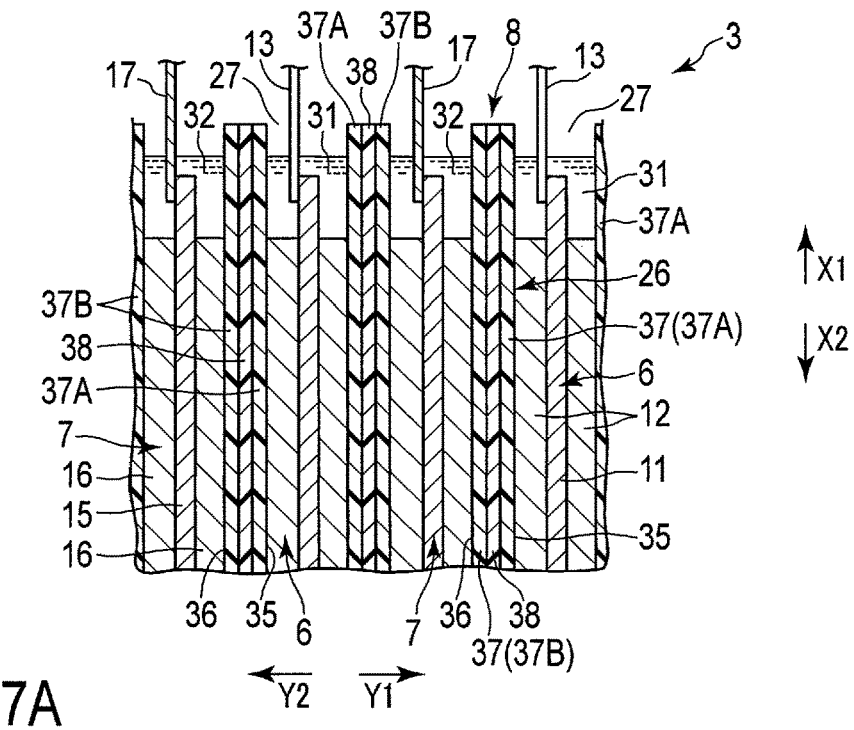
F I G. 7A
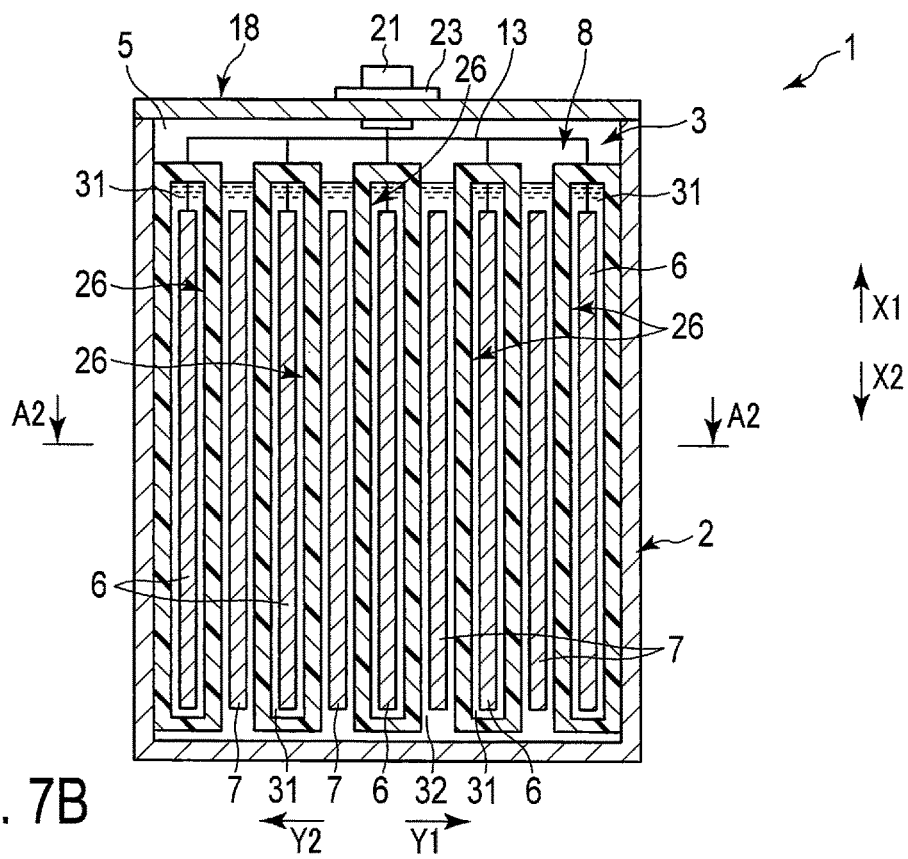
F I G. 7B

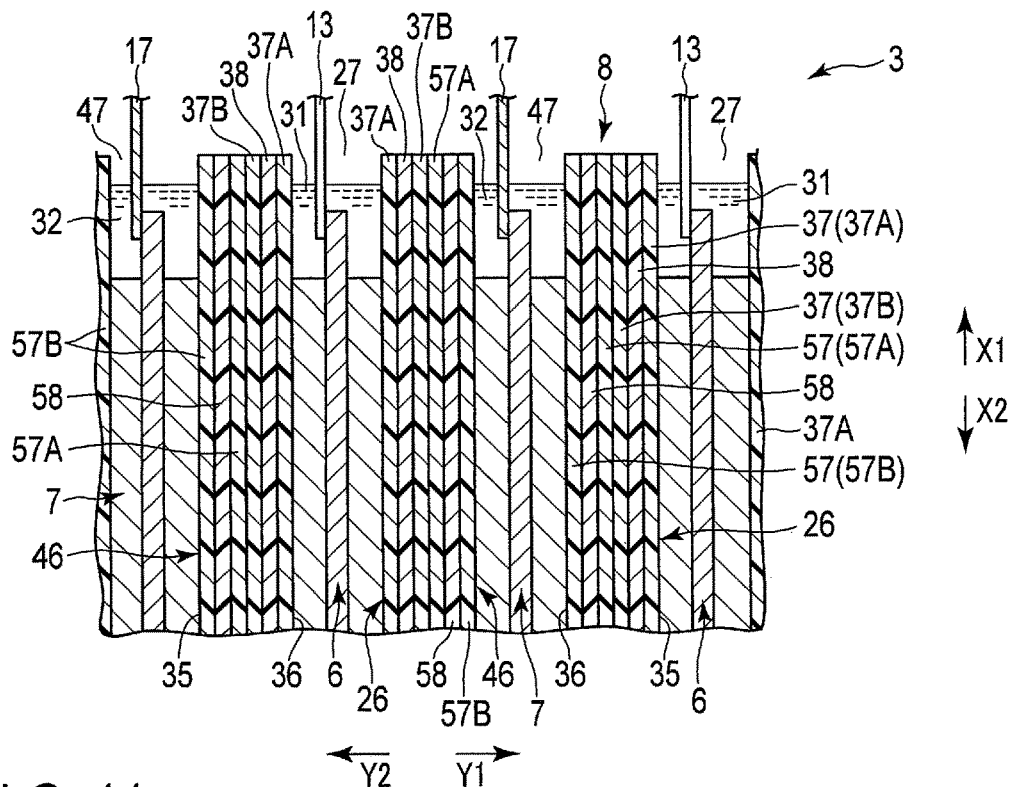
F I G. 11
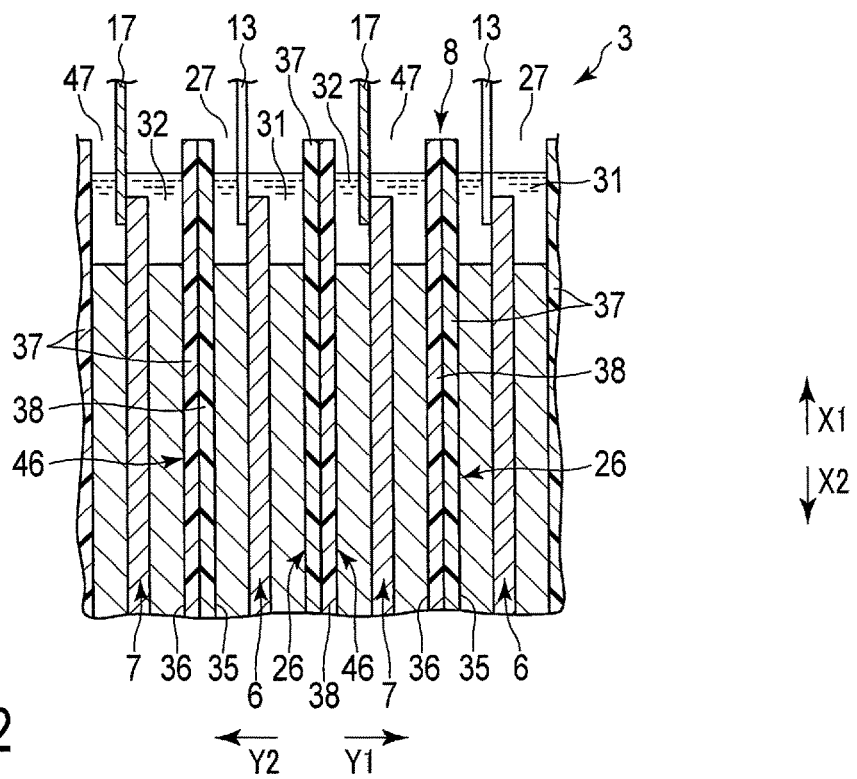
F I G. 12

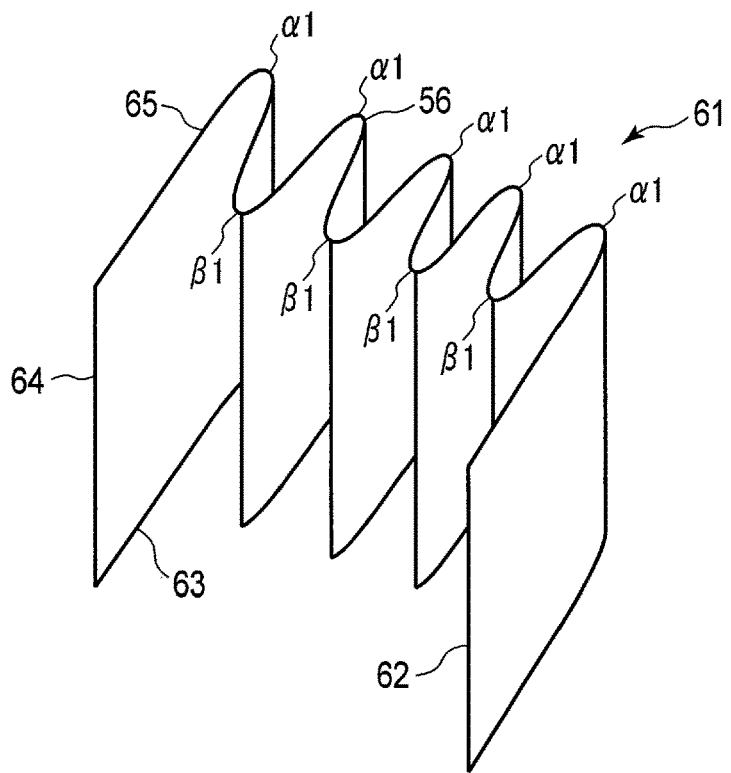
F I G. 15A
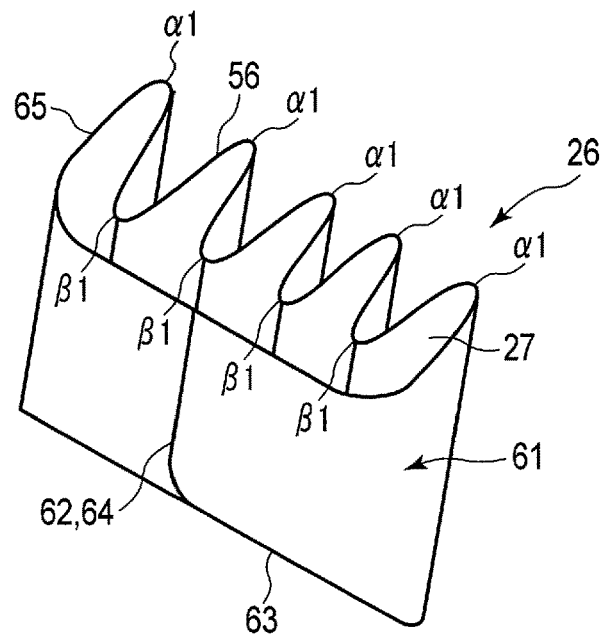
F I G. 15B

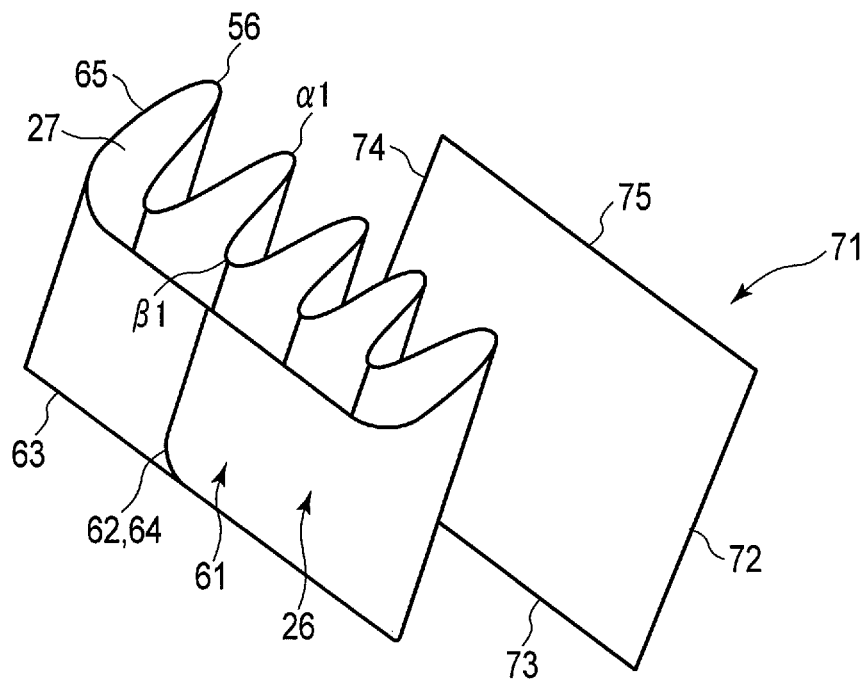
F I G. 17A
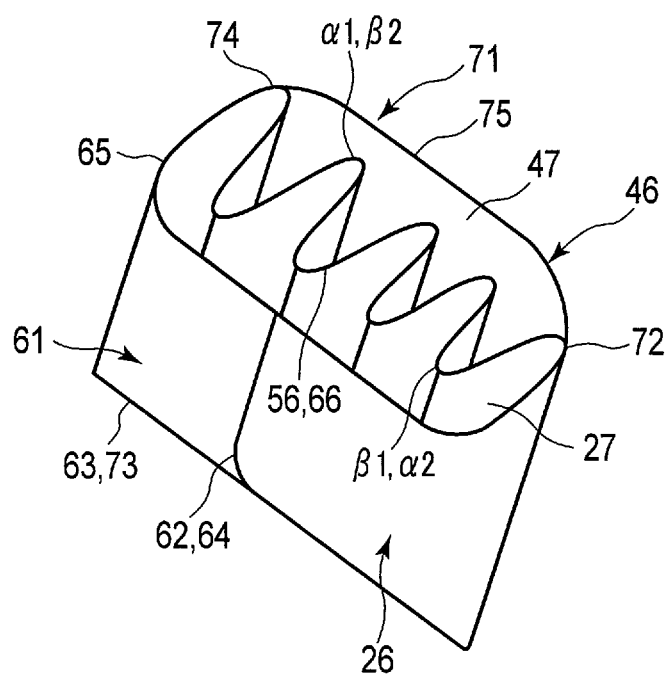
F I G. 17B

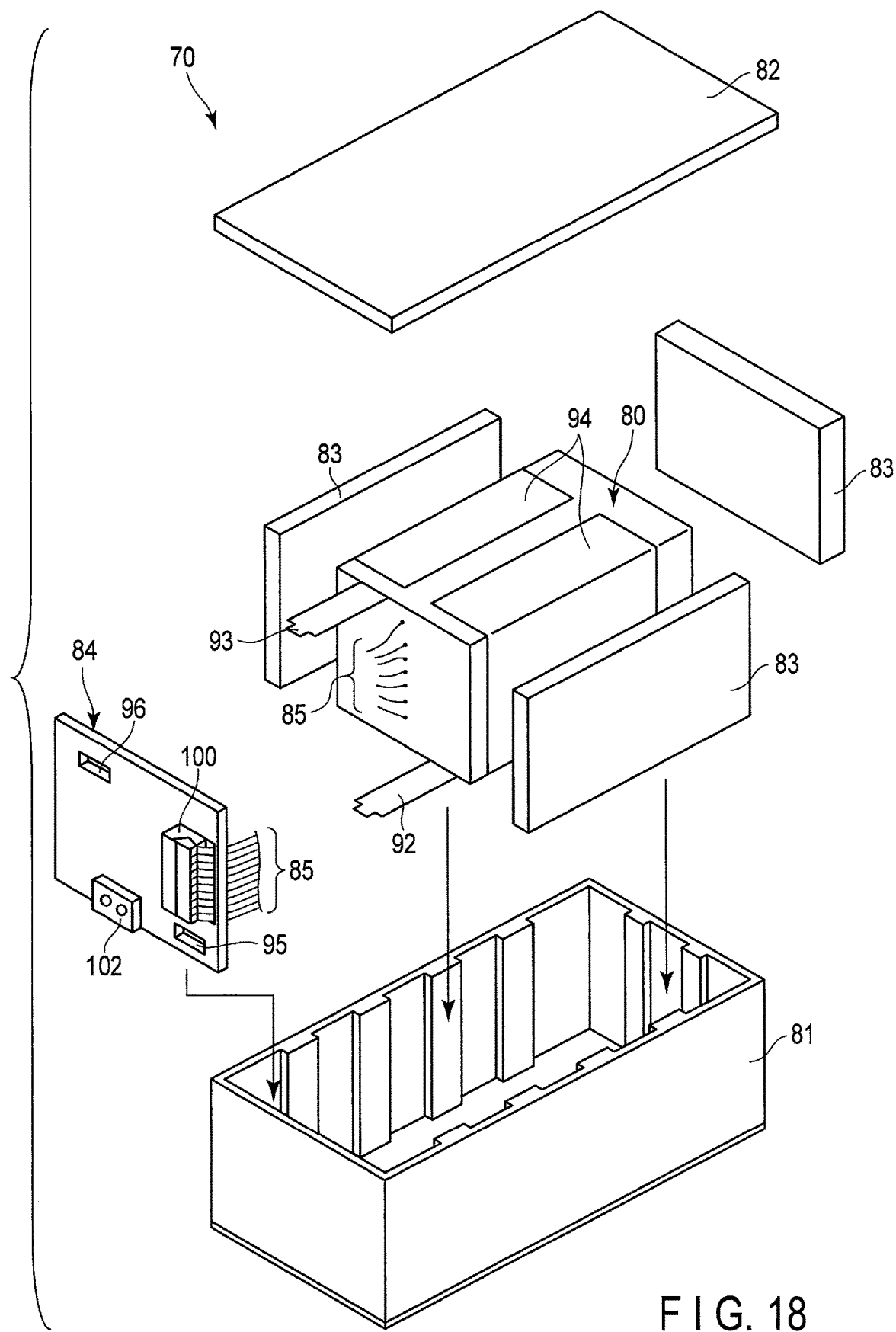
F I G. 18

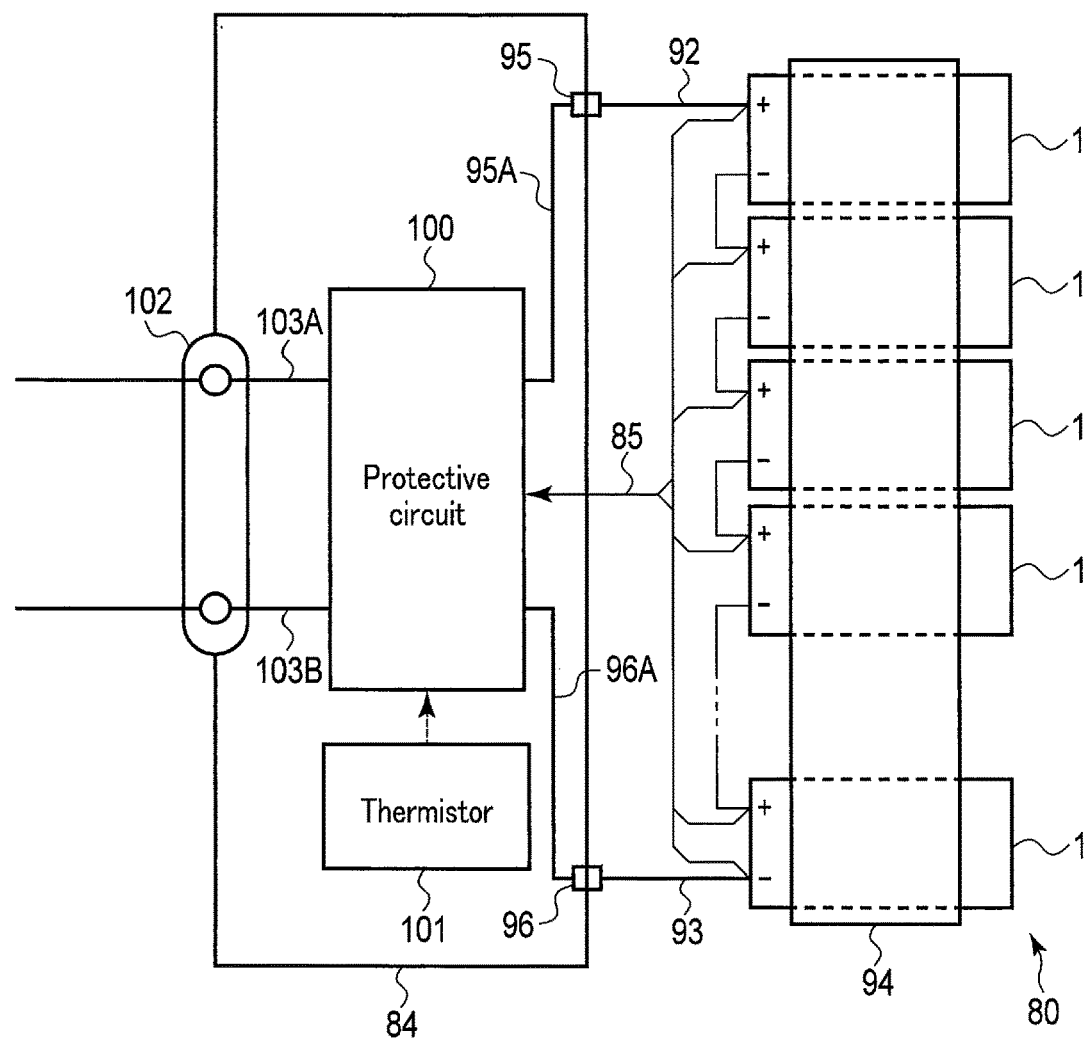
F I G. 19
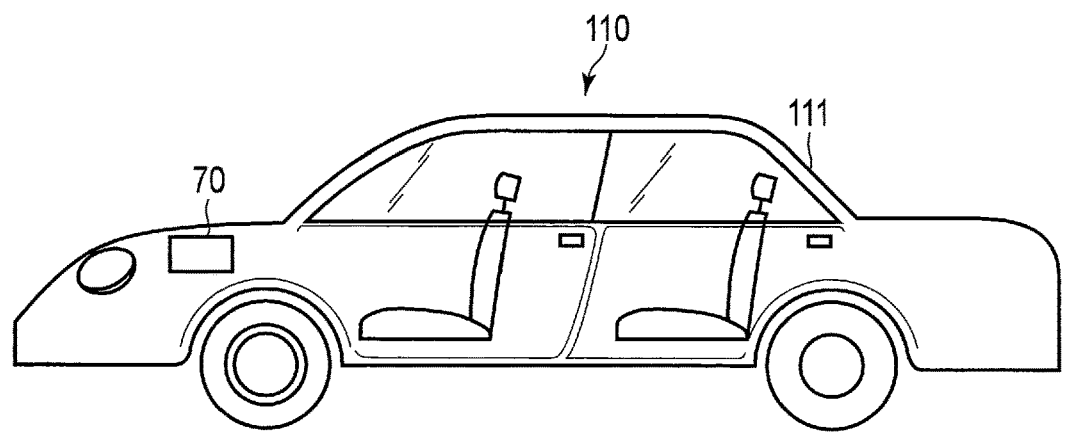
F I G. 20

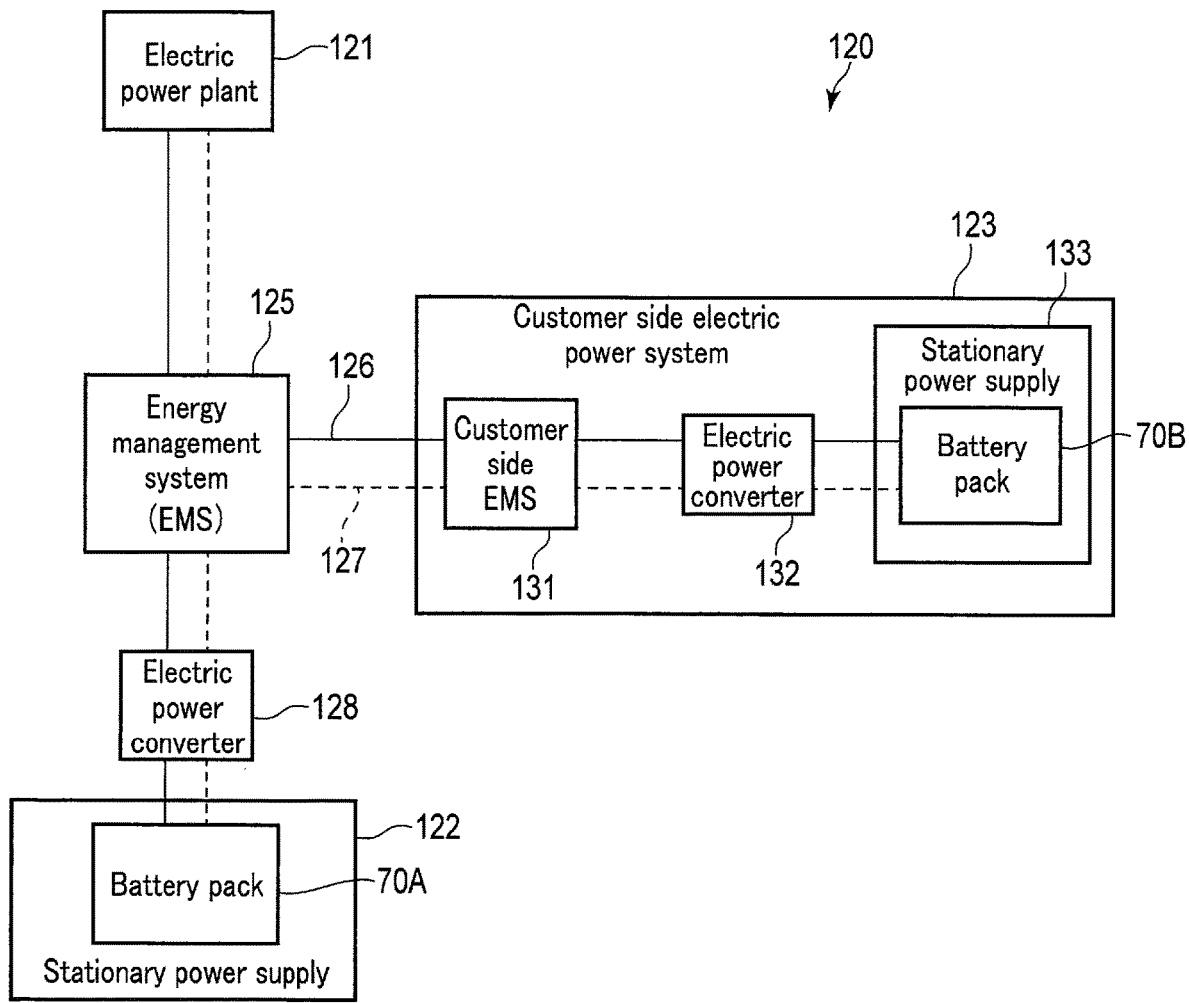
F I G. 21 ing of priority from Japanese Patent Application No. 2019-048203, filed Mar. 15, 2019; the entire contents of which are incorporated herein by reference.

BATTERY, BATTERY PACK, AND STATIONARY POWER SUPPLY

CROSS-REFERENCE TO RELATED APPLICATIONS

This application is based upon and claims the benefit of priority from Japanese Patent Application No. 2019-048203, filed Mar. 15, 2019; the entire contents of which are incorporated herein by reference.

FIELD

Embodiments relate to a battery, a battery pack, and a stationary power supply.

BACKGROUND

In recent years, various applications of secondary batteries such as lithium ion batteries have been advanced as batteries with high energy density. Batteries such as these secondary batteries are required to be excellent in charge/discharge efficiency (Coulombic efficiency), storage performance, cycle characteristics and the like, in addition to further increasing an energy density. Therefore, it is necessary to combine a material which is excellent in chemical and electrochemical stability, corrosion resistance, etc. as a material which forms a battery. Here, in order to further improve the energy density and at the same time improve other characteristics, it is necessary to make a side reaction of electrolyte such as electrolysis solution less likely to occur in the battery. For example, when an aqueous electrolysis solution containing an aqueous solvent is used as the electrolyte, it is necessary to make electrolysis of water less likely to occur. In order to make it difficult for the electrolysis of water to occur, it is necessary to increase oxidation resistance of the electrolysis solution at a positive electrode and to increase the reduction resistance of the electrolysis solution at the negative electrode. From above-described circumstances, in a battery such as a secondary battery, it is required to realize a configuration in which the side reaction of the electrolyte is stably suppressed.

BRIEF DESCRIPTION OF THE DRAWINGS

FIG. 5A is a schematic view showing an example of a manufacturing method of a bag of a separator of an electrode group according to the first embodiment;

FIG. 5B is a schematic view showing a state in which two sheets are heat-bonded to each other from the state of FIG. 5A to form a bag;

FIG. 7A is a cross-sectional view schematically showing a part of an electrode group of a battery according to a modification of the first embodiment;

FIG. 7B is a cross-sectional view schematically showing a battery according to a modification other than FIG. 7A of the first embodiment;

FIG. 11 is a cross-sectional view schematically showing a part of an electrode group of a battery according to a modification of the second embodiment;

FIG. 12 is a cross-sectional view schematically showing a part of an electrode group of a battery according to a modification different from FIG. 11 of the second embodiment;

FIG. 15A is a schematic view showing an example of a manufacturing method of a bag of a separator of an electrode group according to the third embodiment;

FIG. 15B is a schematic view showing a state in which a part of the sheet is heat-bonded to another part of the sheet from the state of FIG. 15A to form a bag;

FIG. 17A is a schematic view showing an example of a manufacturing method of two bags of a separator of an electrode group according to the fourth embodiment;

FIG. 17B is a schematic view showing a state in which a sheet is heat-bonded to one bag (first bag) from the state of FIG. 17A, and the other bag (second bag) is formed;

FIG. 18 is an exploded perspective view schematically showing an example of a battery pack using the battery according to embodiments;

FIG. 19 is a schematic view showing a circuit configuration of the battery pack of FIG. 18;

FIG. 20 is a schematic view showing an example of a vehicle equipped with a battery pack using the battery according to the embodiments; and FIG. 21 is a schematic view showing an example of a system including a stationary power supply on which a battery pack using the battery according to the embodiments is mounted.

DETAILED DESCRIPTION

According to an embodiment, the battery includes a container member, a separator, a first electrode, a first electrolyte, a second electrode and a second electrolyte. The container member has a housing space in the interior, and the separator is housed in the housing space of the container member. The separator has an air permeability coefficient of $1.0 \times 10^{-14}$ m$^2$ or less and includes a bag. The first electrode is housed in the interior of the bag of the separator in the housing space. The first electrolyte is retained on the first electrode in the interior of the bag. The second electrode is opposite polarity to the first electrode and is located outside the bag in the housing space. The second electrolyte is retained by the second electrode outside the bag in the housing space.

Further, according to the embodiment, the battery includes a container member, a separator, a plurality of the first electrodes, a first electrolyte, a plurality of the second electrodes, and a second electrolyte. The container member has a housing space in the interior. The separator includes a bag and is housed in the housing space of the container member. The plurality of first electrodes are housed in the interior of the bag of the separator in the housing space. The first electrolyte is retained by the plurality of first electrodes in the interior of the bag. The second electrodes are opposite polarity to the first electrodes, and the plurality of second electrodes are disposed outside the bag in the housing space. The second electrolyte is retained by the plurality of second electrodes outside the bag in the housing space.

Further, according to the embodiment, a battery pack including one or more of the above-described batteries is provided.

Further, according to the embodiment, a stationary power supply including the above-described battery pack is provided.

Hereinafter, embodiments will be described with reference to the drawings.

[Battery]

First, the battery according to the embodiment will be described.

First Embodiment

Figure 1:
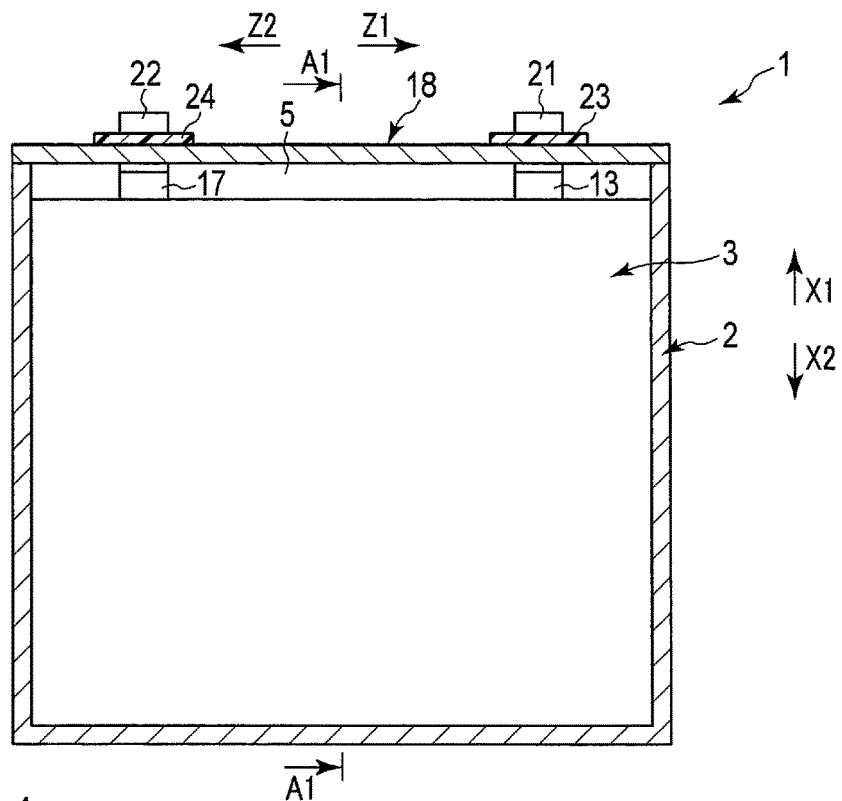
FIG. 1 is a schematic view showing a battery according to a first embodiment.
Figure 2:
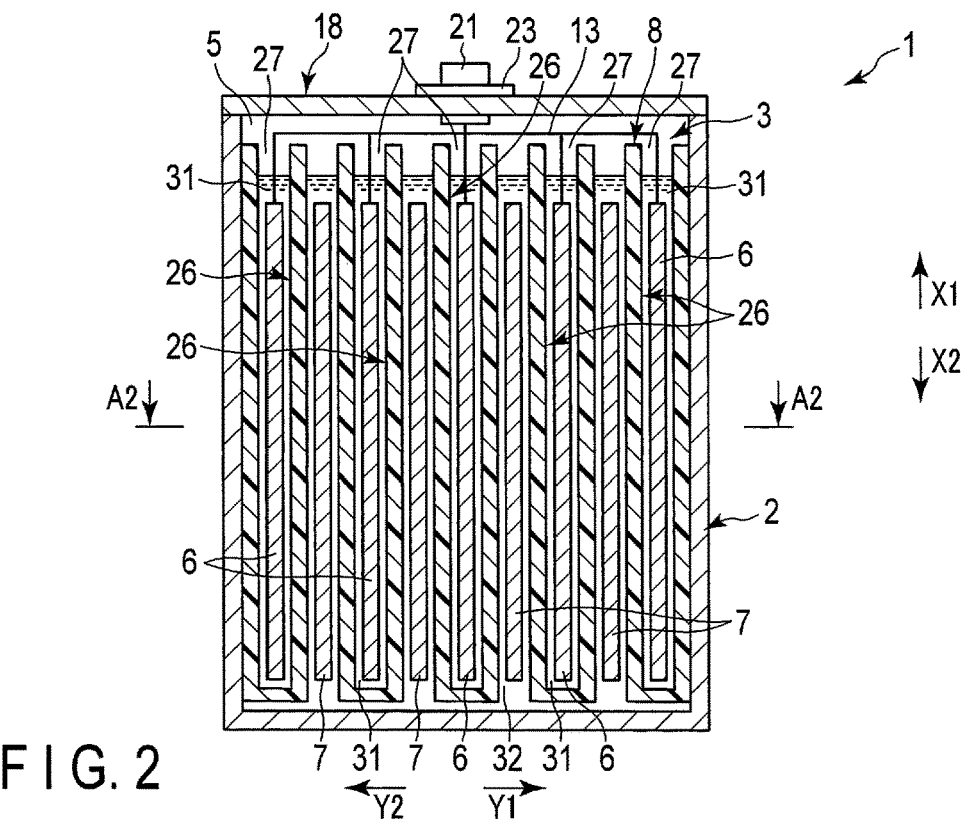
FIG. 2 is a cross-sectional view schematically showing a cross section A1-A1 of FIG. 1.
Figure 3:
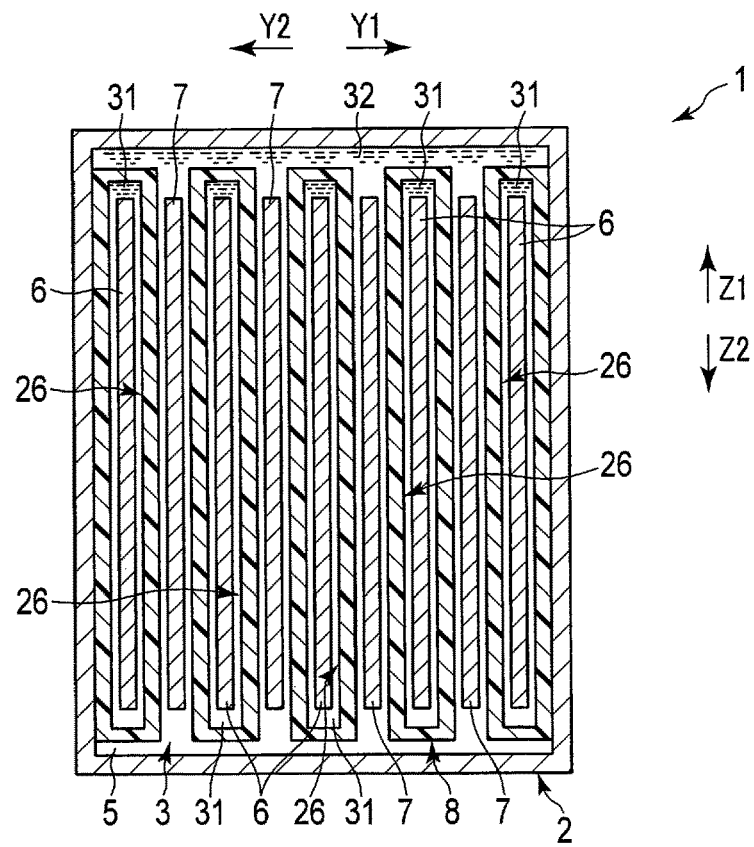
FIG. 3 is a cross-sectional view schematically showing a cross section along A2-A2 of FIG. 2.

FIGS. 1 to 3 show a battery 1 according to a first embodiment as an example of the battery. The battery 1 is, for example, a secondary battery. FIG. 2 shows an A1-A1 cross section of FIG. 1, and FIG. 3 shows an A2-A2 cross section of FIG. 2. As shown in FIGS. 1 to 3 and the like, the battery 1 includes a container member (container) 2 and an electrode group 3. The container member 2 is formed f, for example, metal. A housing space 5 is defined in the interior of the container member 2, and the electrode group 3 is housed in the housing space 5.

Here, in the battery 1 of the present embodiment, a height direction (directions indicated by arrows X1 and X2), a first crossing direction (arrow Y1 and arrow Y2) intersecting (perpendicularly or substantially perpendicularly to) the height direction, and a second crossing direction (directions indicated by arrow Z1 and arrow Z2) intersecting (perpendicularly or substantially perpendicularly to) both the height direction and the first crossing direction. FIG. 1 shows a cross section perpendicular or substantially perpendicular to the first crossing direction, and FIG. 2 shows a cross section perpendicular or substantially perpendicular to the second crossing direction. And FIG. 3 shows the cross section perpendicular or substantially perpendicular to the height direction. In the present embodiment, the container member 2 is formed in a cylindrical shape with a bottom, and the housing space 5 of the container member 2 opens toward one side (arrow X1 side) in the height direction of the battery 1.

The electrode group 3 includes one or more (plural in the present embodiment) negative electrodes 6, one or more (plural in the present embodiment) positive electrodes 7, and a separator 8. The negative electrode 6 and the positive electrode 7 are of opposite polarity to each other. In the housing space 5, the negative electrode and the positive electrode 7 are alternately arrayed. In the present embodiment, an array direction of the negative electrodes 6 and the positive electrodes 7 matches or substantially matches the first crossing direction. Therefore, the array direction of the negative electrodes and the positive electrodes 7 intersects (is perpendicular or substantially perpendicular to) both the height direction and the second crossing direction. In addition, in the housing space 5, at least a part of the separator 8 is interposed between the negative electrode 6 and the positive electrode 7 adjacent to each other in the array direction.

Figure 4:
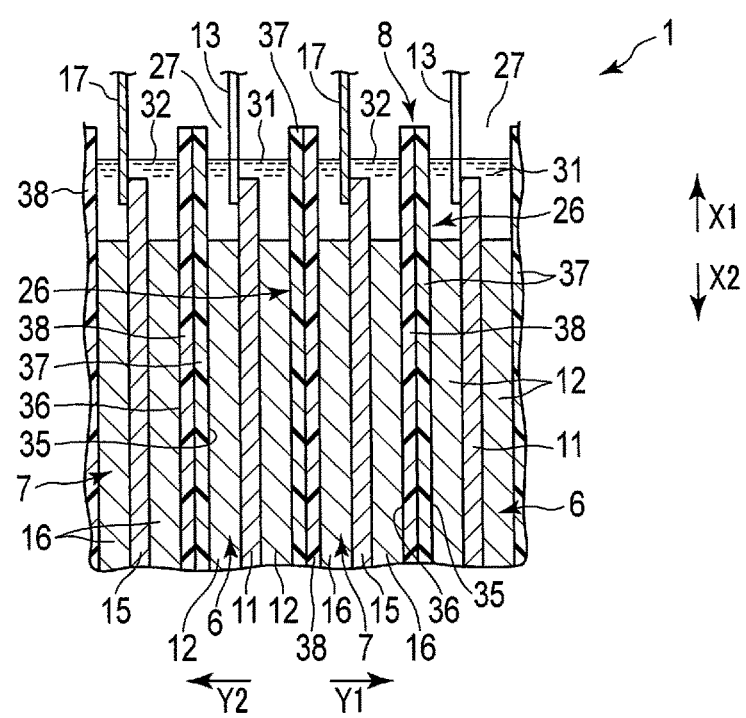
FIG. 4 is a cross-sectional view schematically showing a part of an electrode group of the battery according to the first embodiment in an enlarged manner.

FIG. 4 shows a part of the electrode group 3 in an enlarged manner. In FIG. 4, the electrode group 3 is shown in a cross section perpendicular or substantially perpendicular to the second crossing direction. As shown in FIG. 4 and so forth, each of the negative electrodes 6 includes a negative electrode current collector 11 and a negative electrode active material-containing layer 12. The negative electrode active material-containing layer 12 contains a negative electrode active material, and is supported on both sides or one side of the negative electrode current collector 11. In addition, the negative electrode current collector 11 has a portion in which the negative electrode active material-containing layer 12 is not supported. Similarly, each of the positive electrodes 7 includes a positive electrode current collector 15 and a positive electrode active material-containing layer 16. The positive electrode active material-containing layer 16 contains a positive electrode active material, and is supported by both sides or one side of the positive electrode current collector 15. In addition, the positive electrode current collector 15 has a portion in which the positive electrode active material-containing layer 16 is not supported.

In one example, the negative electrodes 6 are disposed at outer ends of the electrode group 3 in the array direction. Then, in the negative electrode current collector 11 of each of the negative electrodes 6 disposed at both outer ends in the array direction, the negative electrode active material-containing layer 12 is supported only on one side, that is, only the surface facing inward in the array direction. Then, in each of the negative electrodes 6 other than the negative electrodes 6 disposed at both outer ends, the negative electrode active material-containing layers 12 are supported on both sides of the negative electrode current collector 11. In each of all the positive electrodes 7, the positive electrode active material-containing layers 16 are supported on both sides of the positive electrode current collector 15.

As shown in FIGS. 1, 2 and 4 and so forth, the battery 1 includes a negative electrode lead 13, a positive electrode lead 17 and a lid 18. The lid 18 is formed, for example, of metal. The lid 18 is attached to the container member 2 at the opening of the housing space 5 by welding or the like, and closes the opening of the housing space 5. Each of the leads 13 and 17 is made of, for example, a metal or the like, and has electrical conductivity. In each of the negative electrodes 6, the negative electrode lead 13 is connected to the negative electrode current collector 11 at the portion where the negative electrode active-material containing layer 12 is not supported. In the same manner, in each of the positive electrodes 7, the positive electrode lead 17 is connected to the positive electrode current collector 15 at the portion where the positive electrode active material-containing layer 16 is not supported. In the present embodiment, the leads 13 and 17 are disposed apart from each other in the second crossing direction, and contact of the leads 13 and 17 with each other is prevented. Further, the contacts of the leads 13 and 17 to the container member 2 and the lid 18 are prevented by an insulating member (not shown) or the like. Therefore, a short circuit between the leads 13 and 17 is effectively prevented.

The negative electrode terminal 21 and the positive electrode terminal 22 are attached to the outer surface of the lid 18. Each of the terminals 21 and 22 is formed of, for example, a metal or the like, and has electrical conductivity. The negative electrode lead 13 is connected to the negative electrode terminal 21, and the positive electrode lead 17 is connected to the positive electrode terminal 22. In the present embodiment, the terminals 21 and 22 are disposed apart from each other in the second crossing direction, and the contact of the terminals 21 and 22 with each other is prevented. Further, the contact of the negative electrode terminal 21 to the lid 18 is prevented by an insulating member 23 and the like, and the contact of the positive electrode terminal 22 to the lid 18 is prevented by an insulating member 24 and the like. Therefore, a short circuit between the terminals 21 and 22 is effectively prevented.

As shown in FIGS. 2 to 4 and the like, the separator includes one or more (a plurality of in the present embodiment) bags 26. In the present embodiment, the bags (first bags) 26 are provided by the same number as the negative electrodes 6. The corresponding one of the negative electrodes 6 is housed in the interior of each of the bags 26. Therefore, in the present embodiment, each of the negative electrodes 6 serves as a first electrode disposed in the interior of corresponding one of the bags (first bags) 26. Moreover, each of the bags 26 is disposed in the housing space 5 of the container member 2 in the state of housing corresponding one of the negative electrodes 6 in the interior thereof. In the example of FIGS. 2 to 4, each of the bags 26 has a bag opening 27. The interior of each of the bags 26 opens at the bag opening 27 toward the side (arrow X1 side) where the lid 18 is located in the height direction of the battery 1. Each of the bags 26 opens to the outside only at the bag opening 27 and does not open to the outside at a portion other than the bag opening 27. That is, in each of the bags 26, the portions other than the bag opening 27 are closed.

Further, in the housing space 5 of the container member 2, each of the positive electrodes 7 is disposed outside all the bags 26 and is not housed in any of the bags 26. Therefore, in the present embodiment, each of the positive electrodes 7 serves as the second electrode disposed outside all the bags (first bags) 26. Here, in the present embodiment, a region located outside all the bags 26 is located outside the separator 8. In the present embodiment, as described above, the negative electrode 6 and the positive electrode 7 are alternately arrayed. Therefore, in the housing space 5, the bags 26 and the positive electrodes 7 are alternately arrayed in a state in which the corresponding one of the negative electrodes is housed in each of the bags 26. Further, since the corresponding one of the negative electrodes 6 is housed in each of the bags 26, at least parts of the separators 8 is interposed between the negative electrodes 6 and the positive electrodes 7 adjacent to each other in the array direction as described above.

As shown in FIGS. 2 to 4 and the like, the battery 1 includes the electrolytes 31 and 32. In one example, each of the electrolytes 31 and 32 is an aqueous electrolysis solution containing an aqueous solvent. The electrolyte (first electrolyte) 31 is housed in the interior of each of the bags (first bags) 26. Then, in each of the interiors of the bags 26, the electrolyte 31 is retained by (impregnated in) the corresponding one of the negative electrodes 6. In addition, an electrolyte (second electrolyte) 32 is provided outside all the bags 26 in the housing space 5. Then, the electrolyte 32 is retained (impregnated) by the positive electrode 7 outside all the bags 26 in the housing space 5. In addition, in the illustration in FIG. 2 to FIG. 4 and so forth, the electrolytes 31 and 32 which are electrolysis solution or the like are emphasized.

As described above, in the present embodiment, two electrolytes 31 and 32 of the negative electrode side electrolyte and the positive electrode side electrolyte are used. Then, the electrolytes 31 and 32 are isolated from each other by the bag 26 of the separator 8. In the present embodiment, since the electrodes disposed in the interior of the bag 26 are negative electrodes, the electrolyte (first electrolyte) 31 housed in the interior of each of the bags 26 is the negative electrode side electrolyte, and the electrolyte (second electrolyte) 32 disposed outside all the bags 26 is the positive electrode side electrolyte. And in the present embodiment, the electrolyte 31 which is a negative electrode side electrolyte exists on the side where the negative electrode 6 is located with respect to the separators 8, and the electrolyte 32 which is a positive electrode side electrolyte is exists on the side where the positive electrode 7 is located with respect to the separators 8. In the battery 1, the interface such as the liquid level of each of the electrolytes 31 and 32 is maintained on the side (arrow X2 side) opposite to the side where the lid 18 is positioned with respect to bag opening 27 of each of the bags 26, that is, at the vertically lower position. Accordingly, an outflow of the electrolyte 31 through the bag opening 27 to the outside the bag 26 is effectively prevented, and an inflow of the electrolyte 32 through the bag opening 27 into the interior of the bag 26 is effectively prevented.

One of the electrolytes 31 and 32 having a smaller osmotic pressure is preferably 10% or more and 100% or less with respect to the other of the electrolytes 31 and having a larger osmotic pressure. That is, the relationship of 10%≤(the smaller osmotic pressure/the larger osmotic pressure)×100≤100% is established, and the osmotic pressure ratio, which is a ratio of the smaller osmotic pressure out of those of the electrolytes 31 and 32 with respect to the larger osmotic pressure out of those of the electrolytes 31 and 32 is in a range from 10% to 100%. Moreover, it is more preferable that the smaller one of the osmotic pressures of the electrolytes 31 and 32 be 50% or more with respect to the other larger one of the osmotic pressures of the electrolytes 31 and 32. Here, the osmotic pressure Π (N/m$^2$) is calculated as follows. That is, where the volume of the solvent in the electrolyte (electrolysis solution) is V (m$^3$), the substance mass (total number of moles) of the solute in the electrolyte is n (mol), the gas constant is R (m$^2$·kg/(s$^2$·K·mol)), and the absolute temperature of the electrolyte is T (K), the osmotic pressure Π is calculated in the following Equation (1).

$$\Pi = (n \cdot R \cdot T)/V \tag{1}$$

Here, when the electrolytes 31 and 32 are electrolysis solution, the solute of the electrolytes is inorganic salts, organic compounds, and the like. For the inorganic salts, the structure is identified by inductively coupled plasma (ICP) analysis, and for organic compounds, the structure is identified by Fourier-transform infrared spectroscopy (FT-IR). Then, the concentration of the electrolysis solution is calculated by fractionating the electrolyte (electrolysis solution), and the amounts of substances such as inorganic salts and organic compounds in the electrolysis solution are calculated. Note that the substance mass n is the total number of moles of the solute, and the ionization of the solute is also taken into consideration. In fact, when the solute is an inorganic salt, an organic compound, and the like, it is considered that these solutes are all ionized in the electrolysis solution. For example, when the solute is an alkali metal salt, an alkaline earth metal salt or the like, the alkali metal ion and the alkaline earth ion are considered to be all ionized with respect to the anion, and the substance mass n is calculated. For example, when 12 mol/L of LiCl is dissolved as a solute, the concentration is considered to be 24 mol/L because it ionizes into $Li^+$ and $Cl^-$ in the electrolysis solution.

When each of the electrolytes 31 and 32 is a water-based electrolysis solution or the like, the electrolytes 31 and 32 have different pH values from each other. In this case, the positive electrode side electrolyte separated on the side where the positive electrode 7 is located with respect to the separator 8 in the electrolytes 31 and 32 is smaller in pH than that of the negative electrode side electrolyte separated on the side where the negative electrode 6 is located for the separator 8 in the electrolytes 31 and 32. That is, in the present embodiment, the electrolyte 32 serving as the positive electrode side electrolyte has a smaller pH than the electrolyte 31 serving as the negative electrode side electrolyte.

As shown in FIG. 4 and the like, the separator 8 has separator surfaces 35 and 36. The separator surfaces 35, face away from each other. In the present embodiment, the separator surface (first separator surface) 35 faces the side where the negative electrode 6 is located and faces the negative electrode 6. The separator surface (second separator surface) 36 faces the side where the positive electrode 7 is located, and faces the positive electrode 7. As mentioned above, in the present embodiment, the corresponding one of the negative electrodes 6 is housed in the interior of each of the bags 26. Therefore, in the present embodiment, in each of the bags 26, the separator surface (first separator surface) faces the inner negative electrode 6 side, and the separator surface (second separator surface) 36 faces the outer positive electrode 7 side.

Further, in the present embodiment, the separator 8 includes a composition layer 37 and a supporter 38. The composition layer 37 is at least one of a layer containing particles and a polymer, and a solid electrolyte containing layer including a solid electrolyte. If the composition layer 37 includes particles and a polymeric material, the composition layer 37 may be a mixed layer in which the particles and the polymeric material are mixed. In one example, the composition layer 37 is a mixed layer in which particles and a polymeric material are mixed, and the mixed layer includes a solid electrolyte as particles. In this case, the composition layer 37 is a solid electrolyte containing layer. Further, the composition layer 37 has low permeability for the aqueous solvent and the like of the electrolysis solution, and has high conductivity for lithium ions. In the separator 8, the composition layer 37 is laminated on one side of the supporter 38. In the present embodiment, the supporter 38 includes a porous layer in the separator 8. Therefore, the supporter 38 has high permeability for the aqueous solvent or the like of the electrolysis solution as compared to the composition layer 37. The composition layer 37 has a lower air permeability coefficient than the supporter 38. Further, in the separator 8 formed of the composition layer 37 and the supporter 38, the air permeability coefficient is $1.0 \times 10^{14} m^2$ or less.

Here, the air permeability coefficient KT ($m^2$) of the separator 8 is calculated as follows. In the calculation of the air permeability coefficient KT, for example, when the separator 8 having a thickness L (m) is to be measured, a gas having a viscosity coefficient σ (Pa·s) is allowed to pass through the range of the measurement area A ($m^2$). At this time, the gas is allowed to permeate under a plurality of conditions in which the pressure p (Pa) of the introduced gas is different from each other, and the amount of gas amount Q ($m^3$/s) having permeated through the separator 8 is measured under each of the plurality of conditions. Then, from the measurement result, the gas amount Q is plotted against the pressure p to obtain a slop dQ/dp. Then, from the thickness L, the measurement area A, the viscosity coefficient σ, and the slope dQ/dp, the air permeability coefficient KT is calculated as in Equation (2).

$$KT = ((\sigma \cdot 1)/A) \times (dQ/dp) \qquad (2)$$

In an example in which the air permeability coefficient KT is calculated, the separator 8 is sandwiched between a pair of stainless steel plates, each having a hole of 10 mm in diameter. Then, air is fed at a pressure p from the hole of one stainless steel plate. Then, the gas amount Q of air leaking from the hole of the other stainless steel plate is measured. Therefore, the area of the hole ($25_\pi mm^2$) is used as the measurement area A, and 0.000018 Pa·s is used as the viscosity coefficient G. Further, the gas amount Q is calculated by measuring the amount δ ($m^3$) of leakage from the hole in 100 seconds and dividing the measured amount δ by 100.

Then, at four points at which the pressure p separates from one another by at least 1,000 Pa, the gas amount Q with respect to the pressure p is measured as described above. For example, the gas amount Q with respect to the pressure p is measured at each of four points at which the pressure p is 1,000 Pa, 2,500 Pa, 4,000 Pa and 6,000 Pa. Then, the gas amount Q is plotted with respect to the pressure p at the four measured points, and the slope (dQ/dp) of the gas amount Q with respect to the pressure p is calculated by linear fitting (least squares method). Then, the air permeability coefficient KT is calculated by multiplying the calculated slope (dQ/dp) by (σ·L)/A.

Note that in the measurement of the air permeability coefficient of the separator 8, the battery 1 is disassembled to separate the separator 8 from the other components of the battery 1. The separator 8 is washed with pure water on both sides, immersed in pure water and left for 48 hours or more. Thereafter, the both sides are further washed with pure water and dried in a vacuum drying furnace at 100° C. for 48 hours or more, and then the air permeability coefficient is measured. Further, the air permeability coefficient is measured at a given plurality of points in the separator 8. Then, a value at a point where the air permeability coefficient is the lowest value among the given plurality of points is taken as the air permeability coefficient of the separator 8.

Further, in each of the bags 26 of the present embodiment, the composition layer 37 is laminated on the side where the negative electrode 6 is positioned with respect to the supporter 38. Then, in each of the bags 26, the composition layer 37 is laminated on a surface of the supporter 38 facing the side where the negative electrode is located. Further, in the present embodiment, the separator surface (first separator surface) 35 of the separator 8 facing the negative electrode 6 is formed of the composition layer 37. A separator surface (second separator surface) 36 of the separator 8 facing the positive electrode 7 is formed of a supporter 38.

FIGS. 5A and 5B show an example of a manufacturing method of the bag (first bag) 26. In one example of FIGS. 5A and 5B, one bag 26 is formed of two sheets 41A, 41B. As shown in FIG. 5A, the sheet 41A is formed in a substantially rectangular shape having four sides 42A to 45A, and the sheet 41B is formed in a substantially rectangular shape having four sides 42B to 45B. In the manufacture of the bag 26, as shown in FIG. 5B, a portion of the sheet 41A in the vicinity of the side 42A is heat-bonded to a portion of the sheet 41B in the vicinity of the side 42B, and a portion of the sheet 41A in the vicinity of the side 43A is heat-bonded to a portion of the sheet 41B in the vicinity of the side 43B. Then, the portion of the sheet 41A in the vicinity of the side 44A is heat-bonded to the portion of the sheet 41B in the vicinity of the side 44B. Accordingly, fusion bonded portion of the sheets 41A and 41B are formed in a substantially U-shape. In the fusion bonded portion, the sheets 41A and 41B are heat-bonded to each other through the resin having fusion bonding properties. By forming the fusion bonded portion as described above, in the bag 26, the opening edge of the bag opening 27 is formed by the side 45A of the sheet 41A and the side 45B of the sheet 41B.

Figure 6A:
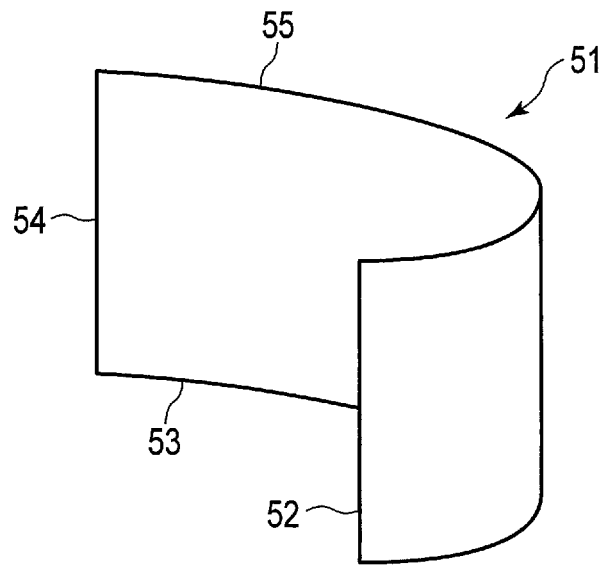
FIG. 6A is a schematic view showing another example of the manufacturing method of the bag of the separator of the electrode group according to the first embodiment, different from the example shown in FIGS. 5A and 5B.
Figure 6B:
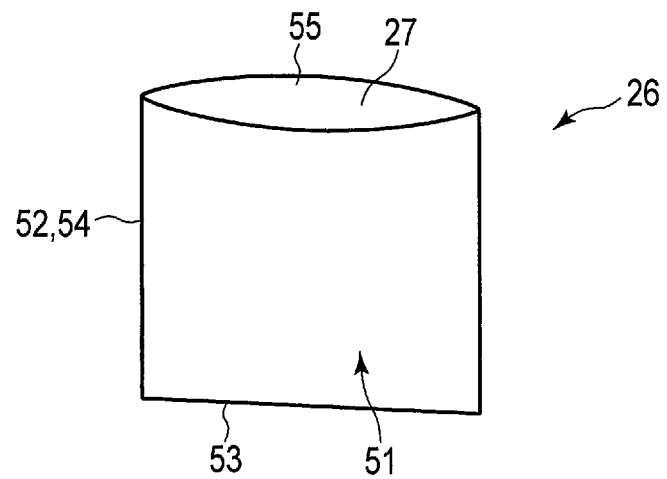
FIG. 6B is a schematic view showing a state in which a part of the sheet is heat-bonded to another part of the sheet from the state of FIG. 6A to form a bag.

FIGS. 6A and 6B show another example of the manufacturing method of the bag 26. In the example of FIGS. 6A and 6B, the bag 26 is formed of only one sheet 51. As shown in FIG. 6A, the sheet 51 is formed in a substantially rectangular shape having four sides 52-55. In the manufacture of the bag 26, as shown in FIG. 6B, a portion of the sheet 51 in the vicinity of the side 52 is heat-bonded to a portion of the sheet 51 in the vicinity of the side 54. Then, a range of the sheet 51 in which the side 53 is extended is closed by heat-bonding. Accordingly, the fusion bonded portion of part of the sheet 51 to another part of the sheet 51 is formed in a substantially L shape. In the fusion bonded portion, a part of the sheet 51 is heat-bonded to another part of the sheet 51 through a resin having fusion bonding properties. By forming the fusion bonded portion as described above, in the bag 26, the opening edge of the bag opening 27 is formed by the side 55 of the sheet 51.

The above-described composition layer 37 and the supporter 38 are formed on each of the sheets 41A and 41B of one example of FIGS. 5A and 5B and the sheet 51 of one example of FIGS. 6A and 6B. In the present embodiment, as described above, the corresponding one of the negative electrodes 6 is housed in the interior of each of the bags 26, and the separator surface 35 facing the negative electrodes 6 in the separator 8 is formed of the composition layer 37. Therefore, when the bag 26 is manufactured by any of the examples of FIGS. 5A and 5B and the examples of FIGS. 6A and 6B, the composition layer 37 is positioned inside the bag 26 with respect to the supporter 38, and heat-bonding is performed to produce the bag 26.

Examples of the material (resin) used for heat-bonding include, but are not limited to, polyethylene, polyvinyl chloride, polyvinyl alcohol, polystyrene, and polyvinylidene chloride. When the composition layer 37 contains particles and a polymeric material, it is desirable that the melting point of the material used for heat-bonding be lower than a softening point of the polymeric material (binder) contained in the composition layer 37. Accordingly, the softening, melting and the like of the polymeric material contained in the composition layer 37 are prevented, and improper fusion of the sheets 41A and 41B, for example, and the like is prevented.

Modifications of First Embodiment

Although the corresponding one of the negative electrodes 6 is housed in the interior of each of the bags 26 in the above-described embodiment and the like, it is not limited thereto. In one modification, the same number of bags (first bags) 26 as the positive electrodes 7 are provided, and corresponding one of the positive electrodes is housed in the interior of each of the bags 26. In this case, each of the positive electrodes 7 serves as a first electrode disposed in the interior of corresponding one of the bags (first bags) 26. Moreover, in this modification, in the housing space 5 of the container member 2, each of the negative electrodes 6 is disposed outside all the bags 26 and is not housed in any of the bags 26. Therefore, in this modification, each of the negative electrodes 6 serves as the second electrode disposed outside all the bags (first bags) 26. In this modification, the electrolyte (first electrolyte) 31 housed in the interior of each of the bags 26 is the positive electrode side electrolyte, and the electrolyte (second electrolyte) 32 disposed outside all the bags 26 is the negative electrode side electrolyte.

Also in this modification, each of the bags 26 is manufactured in the same manner as the above-described embodiment and the like. However, in the present modification, corresponding ones of the positive electrodes 7 are housed in the interiors of each of the bags 26. Also in this modification, the separator surface 35 of the separator 8 facing the negative electrode 6 is formed of the composition layer 37. Therefore, when the bag 26 is manufactured by any of the examples of FIGS. 5A and 5B and the examples of FIGS. 6A and 6B, the composition layer 37 is positioned outside the bag 26 with respect to the supporter 38, and heat-bonding is performed to produce the bag 26.

Also, if a plurality of the bags 26 are provided, the multiple bags 26 may be independent of one another. The plurality of bags 26 can also be heat-bonded to one another at one of the portions corresponding to the sides 42A, 42B, 43A, 43B, 44A, 44B in FIG. 5B, for example.

Further, in a modification, the supporter 38 is not provided on the separator 8, and the separator 8 is formed only of the composition layer 37. In this modification, the separator surface (first separator surface) 35 facing the negative electrode 6 in the separator 8 is formed of the composition layer 37. Then, a separator surface (second separator surface) 36 facing the positive electrode 7 in the separator 8 is also formed of the composition layer 37. Therefore, both of the separator surfaces 35 and 36 are formed of the composition layer 37. Also in this modification, the air permeability coefficient of the separator 8 is $1.0 \times 10^{-14}$ $m^2$ or less.

Also in this modification, each of the bags 26 is manufactured in the same manner as the above-described embodiment and the like. However, in this modification, each of the sheets 41A and 41B of the example of FIG. 5A and FIG. 5B and the sheet 51 of the example of FIG. 6A and FIG. 6B is formed only of the composition layer 37. That is, the supporter 38 is not provided on each of the sheets 41A and 41B and the sheet 51. Also in this modification, the air permeability coefficient of the separator 8 is $1.0 \times 10^{-14}$ $m^2$ or less.

Further, in a modification shown in FIG. 7A, in the separator 8, the composition layers 37 are disposed on both sides of the supporter 38. That is, the composition layer 37 is laminated on the supporter 38 on both the side where the negative electrode 6 is located and the side where the positive electrode 7 is located. In this modification, the composition layer 37A is layered on the side where the negative electrode 6 is positioned with respect to the supporter 38, and the composition layer 37B is laminated on the side where the positive electrode 7 is positioned with respect to the supporter 38.

In this modification as well, the separator surface (first separator surface) 35 of the separator 8 facing the negative electrode 6 is formed of the composition layer 37 (37A). In this modification, the separator surface (second separator surface) 36 of the separator 8 facing the positive electrodes 7 is also formed of the composition layer 37 (37B). Therefore, in the separator 8, the supporter 38 is not exposed. Therefore, both of the separator surfaces 35 and 36 are formed of the composition layer 37. Also in this modification, the air permeability coefficient of the separator 8 is $1.0 \times 10^{-14}$ m$^2$ or less.

Also in this modification, each of the bags 26 is manufactured in the same manner as the above-described embodiment and the like. However, in this modification, the above-described composition layers 37A and 37B and the supporter 38 are formed on each of the sheets 41A and 41B of one example of FIGS. 5A and 5B and the sheet 51 of one example of FIGS. 6A and 6B.

When the composition layer 37 is a mixed layer including particles and a polymer layer, the composition layer 37 can contain aluminum oxide or silica as particles instead of the solid electrolyte. In this case, in the composition layer 37, for example, aluminum oxide or silica is mixed with the polymeric material. Also in this example, the air permeability coefficient of the separator 8 is $1.0 \times 1.0^{-14}$ m$^2$ or less. In the composition layer 37, particles of aluminum oxide and silica may be mixed with particles of a solid electrolyte and a polymeric material.

In addition, the composition layer 37 of the separator 8 may be a plate formed only of a solid electrolyte. In this case, the plate of the solid electrolyte does not allow the aqueous solvent or the like of the electrolysis solution to permeate. Further, in the configuration in which the plate of the solid electrolyte is provided in the separator 8 as the composition layer 37, the air permeability coefficient of the separator 8 is 0 m$^2$ or almost 0 m$^2$.

Figure 7C:
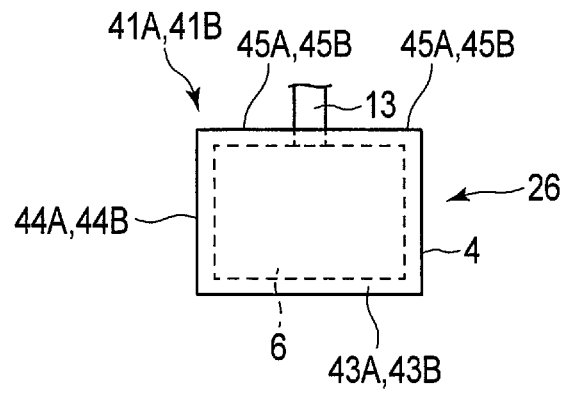
FIG. 7C is a schematic view showing a configuration of a bag of a separator of an electrode group in the modification of FIG. 7B.

Also, in certain modifications shown in FIGS. 7B and 7C, the bag opening 27 is not formed in each of the bags 26. Also in this modification, the first electrode, which is one of the negative electrode 6 and the positive electrode 7, and the electrolyte 31 are housed in the interior of each of the bags 26. In the formation of the bag 26 of the present modification, the sheets 41A and 41B are heat-bonded in a substantially U-shape, for example, in the same manner as the example of FIGS. 5A and 5B. Then, after the first electrode and the electrolyte 31 are housed in the interior of the bag 26, the portion of the sheet 41A in the vicinity of the side 45A is heat-bonded to the portion of the sheet 41B in the vicinity of the side 45B. Accordingly, the bag 26 in which the bag opening 27 is not formed is formed. In this case, for example, the negative electrode lead 13 and the like are extended to the outside the bag 26 from the portion where the sides 45A and 45B are heat-bonded. Further, in the configuration in which the plurality of bags 26 are provided, at least one of the plurality of bags 26 may not be provided with the bag opening 27.

The separator 8 according to the first embodiment described above and the modification thereof includes the composition layer 37. Then, a separator surface (first separator surface) 35 of the separator 8 facing the negative electrode 6 is also formed of the composition layer 37. Further, the air permeability coefficient of the separator 8 is $1.0 \times 10^{-14}$ m$^2$ or less.

In the first embodiment and the modifications thereof, the container member has a housing space in the interior, and the separator is housed in the housing space of the container member. The air permeability coefficient of the separator is $1.0 \times 10^{-14}$ m$^2$ or less, and the separator includes the first bag. The first electrode is housed in the interior of the first bag of the separator in the housing space. The first electrolyte is retained on the first electrode in the interior of the first bag. The second electrode is disposed outside the first bag in the housing space. The second electrolyte is retained by the second electrode outside the first bag in the housing space.

Second Embodiment

Figure 8:
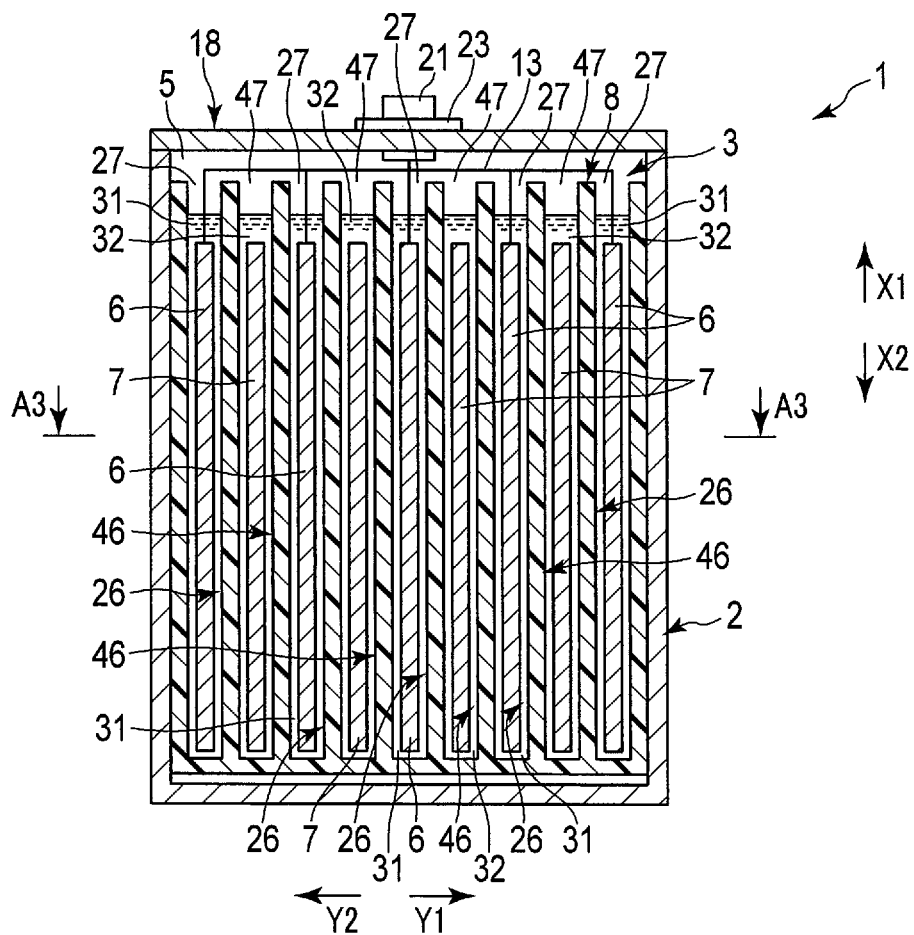
FIG. 8 is a cross-sectional view schematically showing a battery according to a second embodiment.
Figure 9:
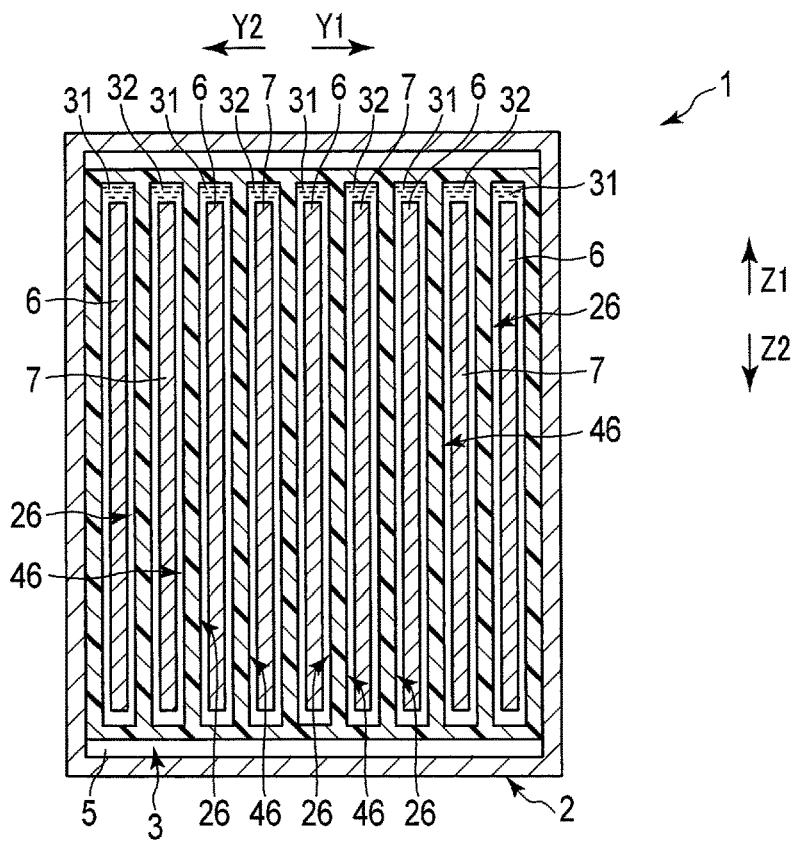
FIG. 9 is a cross-sectional view schematically showing a cross section along A3-A3 in FIG. 8.

FIGS. 8 and 9 show a battery 1 of the second embodiment. The battery 1 of the present embodiment is modified from the first embodiment in the following configuration. Here, FIG. 8 shows a cross section perpendicular or substantially perpendicular to the second crossing direction (direction shown by an arrow Z1 and an arrow Z2), and shows, for example, a cross section corresponding to the A1-A1 cross section of FIG. 1. FIG. 9 shows a cross section taken along a line A3-A3 of FIG. 8, and shows a cross section perpendicular or substantially perpendicular to the height direction (direction shown by the arrow X1 and the arrow X2).

As shown in FIGS. 8 and 9, in the present embodiment as well as the above-described first embodiment and the like, corresponding one of the negative electrodes 6 are housed in each of the bags 26. However, in the present embodiment, a separator 8 includes one or more (a plurality of in the present embodiment) bags 46 in addition to the bag 26. The bags (second bags) 46 are provided in the same number as a positive electrodes 7. The corresponding one of the positive electrodes 7 is housed in the interior of each of the bags 46. Therefore, in the present embodiment, each of the negative electrodes is a first electrode disposed in the interior of corresponding one of the bags (first bags) 26, and each of the positive electrodes 7 is a second electrode disposed in the interior of corresponding one of the bags (second bags) 46. Moreover, each of the bags 46 is disposed in a housing space 5 of a container member 2 in the state of housing corresponding one of the positive electrodes 7 in the interior thereof.

In the present embodiment, in a housing space 5 of the container member 2, each of the bags (second bags) 46 is disposed outside all the bags (first bags) 26, and is not housed in any of the bags 26. Therefore, also in the present embodiment, each of the positive electrodes 7 which are the second electrodes is disposed outside all the bags (first bags) 26. Here, in the present embodiment, a region located outside all the bags 26 and 46 is located outside the separator 8. Also, in an example of FIGS. 8 and 9, each of the bags 46 has a bag opening 47. The interior of each of the bags 46 opens at the bag opening toward the side (arrow X1 side) where a lid 18 is located in the height direction of the battery 1. Each of the bags 46 opens to the outside only at the bag opening 47, and does not open to the outside at a portion other than the bag opening 47. That is, in each of the bags 46, portions other than the bag opening 47 are closed.

Also in the present embodiment, the negative electrodes 6 and the positive electrodes 7 are alternately arrayed. Therefore, in the housing space 5, with the corresponding one of the negative electrodes 6 housed in each of the bags 26 and the corresponding one of the positive electrodes 7 housed in each of the bags 46, the bags 26, 46 are alternately arrayed. Further, since the corresponding one of the negative electrodes 6 is housed in each of the bags 26, and corresponding one of the positive electrodes 7 is housed in each of the bags 46, at least a part of the separator 8 is interposed between the negative electrodes 6 and the positive electrodes 7 adjacent to each other in the array direction.

Also in the present embodiment, an electrolyte (first electrolyte) 31 is housed in the interior of each of the bags (first bags) 26, and in each of the interiors of the bags 26, the electrolyte 31 is retained by (impregnated in) corresponding one of the negative electrodes 6. Also in the present embodiment, an electrolyte (second electrolyte) 32 is housed in the interior of each of the bags (second bags) 46, and in the interior of each of the interiors of the bags 46, the electrolyte 32 is retained by (impregnated in) corresponding one of the positive electrodes 7. Here, each of the bags 46 is disposed outside all the bags 26 as described above. Therefore, also in the present embodiment, the electrolyte 32 is retained by (impregnated in) the positive electrode 7 outside all the bags 26 in the housing space 5. In addition, in FIG. 8 and FIG. 9 and so forth, the electrolytes 31 and 32 are emphasized.

Further, in the present embodiment, the electrolyte (first electrolyte) 31 housed in the interior of each of the bags 26 serves as the negative electrode side electrolyte, and the electrolyte (second electrolyte) 32 contained in each of the bags 46 serves as the positive electrode side electrolyte provided. In the battery 1, the interface such as the liquid level of each of the electrolytes 31 and 32 needs to be maintained on the side (arrow X2 side) opposite to the side where the lid 18 is positioned with respect to the bag opening 27 of each of the bags 26 and the bag opening 47 of each of the bags 46, that is, at the vertically lower position. Accordingly, an outflow of the electrolyte 31 through the bag opening 27 to the outside the bag 26 is effectively prevented, and an inflow of the electrolyte 32 through the bag opening 27 into the interior of the bag 26 is effectively prevented. In the same manner, an outflow of the electrolyte 32 through the bag opening 47 to the outside the bag 46 is effectively prevented, and an inflow of the electrolyte 31 through the bag opening 47 into the interior of the bag 46 is effectively prevented.

Figure 10:
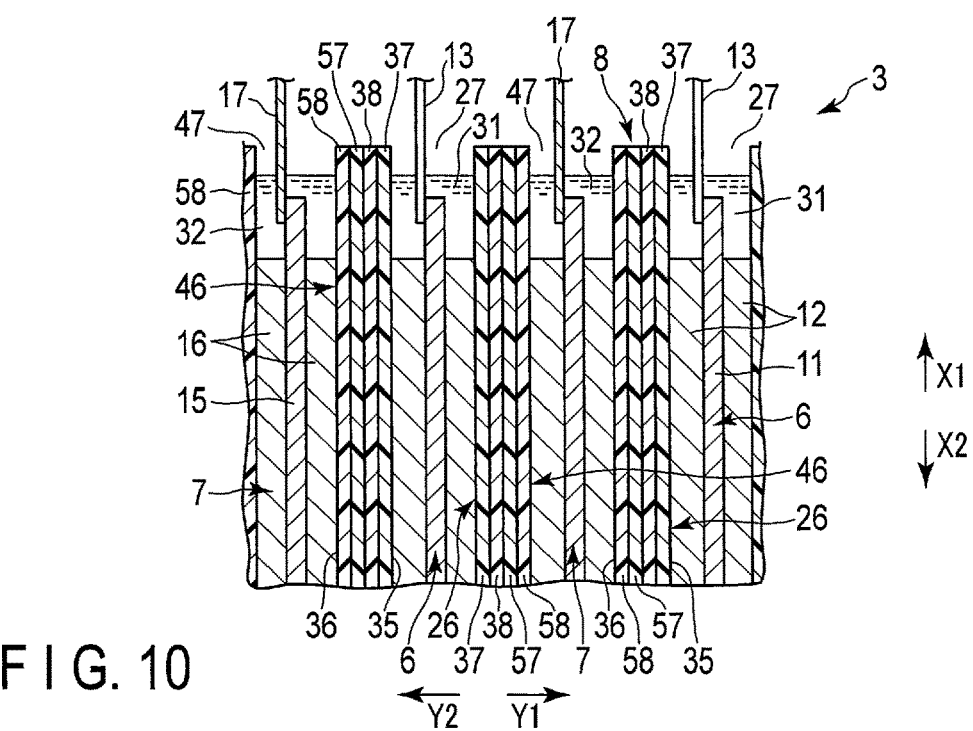
FIG. 10 is a cross-sectional view schematically showing a part of an electrode group of a battery according to a second embodiment in an enlarged manner.

FIG. 10 shows a part of an electrode group 3 of the present embodiment in an enlarged manner, and shows a part of the electrode group 3 in a cross section perpendicular or substantially perpendicular to the second crossing direction. As shown in FIG. 10 and the like, also in the present embodiment, the separator 8 has a separator surface (first separator surface) 35 facing the negative electrode 6 and a separator surface (second separator surface) 36 facing the positive electrode 7. However, in the present embodiment, as described above, the bags 46 are provided in addition to the bags 26. Therefore, the separator surface 35 faces inward in each of the bags 26. The separator surface 36 faces inward in each of the bags 46.

Further, in the present embodiment, the separator 8 includes a composition layer 57 and a supporter 58 in addition to the composition layer 37 and the supporter 38 described above. As a material for forming the composition layer 57, the same material as that of the composition layer 37 is used. Therefore, the composition layer 57 has low permeability for the aqueous solvent and the like of the electrolysis solution, and is excellent in the conductivity of lithium ions. In the separator 8, the composition layer 57 is laminated on one side of the supporter 58. As a material for forming the supporter 58, the same material as the supporter 38 is used. Therefore, the supporter 58 forms a porous layer in the separator 8, and has higher permeability for the aqueous solvent or the like of the electrolysis solution as compared to the composition layers 37 and 57. The composition layers 37 and 57 have a lower air permeability coefficient than the supporters 38 and 58. Also in the present embodiment, the air permeability coefficient of the separator 8 is $1.0 \times 10^{-14}$ m$^2$ or less. The air permeability coefficient is calculated as described above in the first embodiment. Also in the present embodiment, in each of the bags (first bags) 26, the composition layer 37 is laminated on the side where the negative electrode 6 is located with respect to the supporter 38. Further, in the present embodiment, in each of the bags (second bags) 46, the composition layer 57 is laminated on the side where the negative electrode 6 is located with respect to the supporter 58. In each of the bags 46, the composition layer 57 is laminated on the surface of the supporter 58 facing the side where the negative electrode 6 is located. Also in the present embodiment, the separator surface (first separator surface) 35 of the separator 8 facing the negative electrode 6 is formed of the composition layer 37. However, in the present embodiment, the separator surface (second separator surface) 36 of the separator 8 facing the positive electrode 7 is formed of the supporter 58.

Further, in the separator 8 according to the present embodiment, the composition layer 37, the supporter 38, the composition layer 57, and the supporter 58 are disposed in this order from a side closer to the negative electrode 6 between the negative electrode 6 and the positive electrode 7 adjacent to each other in the array direction. Therefore, the composition layer 37 and the supporter 38 are disposed on the side closer to the negative electrode 6 with respect to the composition layer 57 and the supporter 58.

The bags 46 can be manufactured in the same manner as the bags 26. Thus, the bags 46 can be manufactured in the same manner as any of the examples of FIGS. 5A and 5B and the examples of FIGS. 6A and 6B. However, when the bag 46 is to be manufactured, the above-described composition layer 57 and the supporter 58 are formed on each of the sheets similar to the sheets 41A and 41B, for example, in one example of FIGS. 5A and 5B. Further, in the present embodiment, corresponding one of the positive electrodes 7 is housed in the interior of each of the bags 46. Therefore, when the bag 46 is manufactured by the method similar to any of the examples of FIGS. 5A and 5B and the examples of FIGS. 6A and 6B, heat-bonding is performed in a state in which the composition layer 57 is formed outside the bag 46 with respect to the supporter 58, so that the bag 46 is manufactured.

In the present embodiment, since each of the bags 26 and 46 is formed as described above, two sheets similar to the sheets 41A and 41B, for example, are provided between the negative electrode 6 and the positive electrode 7 adjacent to each other in the array direction. Then, the negative electrode 6 and positive electrode 7 adjacent to each other are separated by the two sheets.

Modifications of Second Embodiment

Note that although the corresponding one of the negative electrodes 6 is housed in the interior of each of the bags 26 in the second embodiment and the like, and corresponding one of the positive electrodes 7 is housed in the interior of each of the bags 46, it is not limited thereto. In one modification, corresponding one of the positive electrodes 7 is housed within the interior of each of the bags (first bags) 26 and corresponding one of the negative electrodes 6 is housed within the interior of each of the bags (second bags) 46. In this case, each of the positive electrodes 7 serves as a first electrode disposed in the interior of corresponding one of the bags (first bags) 26. Then, each of the negative electrodes 6 serves as a second electrode disposed in the interior of corresponding one of the bags (second bags) 46. Further, in the present modification, the electrolyte (first electrolyte) 31 contained in each of the bags 26 serves as the positive electrode side electrolyte, and the electrolyte (second electrolyte) 32 housed in the interior of each of the bags 46 serves as the negative electrode side electrolyte provided.

Moreover, in a modification, the supporters 38 and 58 are not provided on the separator 8, and the separator 8 is formed only of the composition layers 37 and 57. In this modification, each of the bags 26 is formed only of the composition layer 37, and each of the bags 46 is formed only of the composition layer 57. Further, in this modification, the separator surface (first separator surface) 35 facing the negative electrode 6 in the separator 8 is formed of the composition layer 37. Then, a separator surface (second separator surface) 36 facing the positive electrode 7 in the separator 8 is formed of the composition layer 57. Also in this modification, the air permeability coefficient of the separator 8 is $1.0 \times 10^{-14}$ m$^2$ or less.

Also in this modification, each of the bags 26 and 46 is manufactured in the same manner as the second embodiment and so forth. However, in the present modification, each of the sheets (for example, sheets similar to the sheets 41A and 41B, etc.) used to form the bag 26 is formed only of the composition layer 37. Then, each of the sheets (for example, sheets similar to the sheets 41A and 41B, for example,) used to form the bag 46 is formed only of the composition layer 57.

Further, in a modification shown in FIG. 11, in the separator 8, the composition layers 37 are laminated on both sides of the supporter 38. Then, the composition layer 57 is laminated on both sides of the supporter 58. That is, the composition layer 37 is laminated on the supporter 38 on both the side where the negative electrode 6 is located and the side where the positive electrode 7 is located. The composition layers 57 are laminated on the supporter 58 on both the side where the negative electrode 6 is located and the side where the positive electrode 7 is located. In this modification, the composition layer 37A is layered on the side where the negative electrode 6 is positioned with respect to the supporter 38, and the composition layer 37B is laminated on the side where the positive electrode 7 is positioned with respect to the supporter 38. Then, the composition layer 57A is laminated on the side where the negative electrode 6 is positioned relative to the supporter 58, and the composition layer 57B is laminated on the side where the positive electrode 7 is positioned relative to the supporter 58.

In the present modification, the separator surface (first separator surface) 35 of the separator 8 facing the negative electrode 6 is formed of the composition layer 37 (37A). In this modification, the separator surface (second separator surface) 36 of the separator 8 facing the positive electrodes 7 is formed of the composition layer (57B). Further, in the separator 8 of this modification, the composition layer 37A, the supporter 38, the composition layer 37B, the composition layer 57A, the supporter 58 and the composition layer 57B are disposed in this order from the side closer to the negative electrode between the negative electrode 6 and the positive electrode 7 adjacent to each other in the array direction. Therefore, the composition layers 37A and 37B and the supporter 38 are disposed closer to the negative electrode 6 with respect to the composition layers 57A and 57B and the supporter 58. Also in this modification, the air permeability coefficient of the separator 8 is $1.0 \times 10^{-14}$ m$^2$ or less.

Also in this modification, each of the bags 26 and 46 is manufactured in the same manner as the second embodiment and so forth. However, in this modification, each of the sheets (for example, the same sheets as the sheets 41A and 41B, for example,) used to form the bag 26 is formed of the composition layers 37A and 37B and the supporter 38. Then, each of the sheets (for example, sheets similar to the sheets 41A and 41B, etc.) used to form the bag 46 is formed of the composition layers 57A and 57B, and the support 58.

Further, in a modification, as in the modification of FIG. 11, in the separator 8, the composition layer 37 (37A, 37B) are laminated on both sides of the supporter 38. However, the composition layer 57 is laminated only on the side of the supporter 58 where the negative electrode is located. In the present modification, the separator surface (first separator surface) 35 of the separator 8 facing the negative electrode 6 is formed of the composition layer 37 (37A). A separator surface (second separator surface) 36 of the separator 8 facing the positive electrode 7 is formed of a supporter 58.

Further, in another different modification, as in the modification of FIG. 11, in the separator 8, the composition layers 57 (57A and 57B) are laminated on both sides of the supporter 58. However, the composition layer 37 is laminated only on the side of the supporter 38 where the negative electrode 6 is located. In this modification, the separator surface (first separator surface) 35 facing the negative electrode 6 in the separator 8 is formed of the composition layer 37. Then, a separator surface (second separator surface) 36 facing the positive electrode 7 in the separator 8 is formed of the composition layer 57 (57B).

Further, in a modification, in the housing space 5 of the container member 2, outside all the bags (first bags) and also outside all the bag (second bag) 46 may be filled with one of the electrolytes 31 and 32. Also in this modification, the electrolyte 31 is housed in the interior of each of the bags 26, and the electrolyte 32 is housed in each of the bags 46. In the case where the electrolyte 32 is disposed outside all the bags 26 and 46 in the housing space 5, the electrolytes 31 and 32 are isolated from each other by the bag 26 of the separator 8. Also, in the case where the electrolyte 31 is disposed outside all the bags 26 and 46 in the housing space 5, the electrolytes 31 and 32 are isolated from each other by the bag 46 of the separator 8.

Further, in a modification illustrated in FIG. 12, the composition layer 57 and the supporter 58 are not provided on the separator 8, and the separator 8 is formed only of the composition layer 37 and the supporter 38. In this modification, the composition layer 37 is laminated only on the side of the supporter 38 where the negative electrode 6 is located. Then, a separator surface (first separator surface) 35 of the separator 8 facing the negative electrode 6 is also formed of the composition layer 37. However, in the present modification, the separator surface (second separator surface) 36 of the separator 8 facing the positive electrode 7 is formed of the supporter 38. Also in this modification, the air permeability coefficient of the separator 8 is $1.0 \times 10^{-14}$ m$^2$ or less.

Figure 13A:
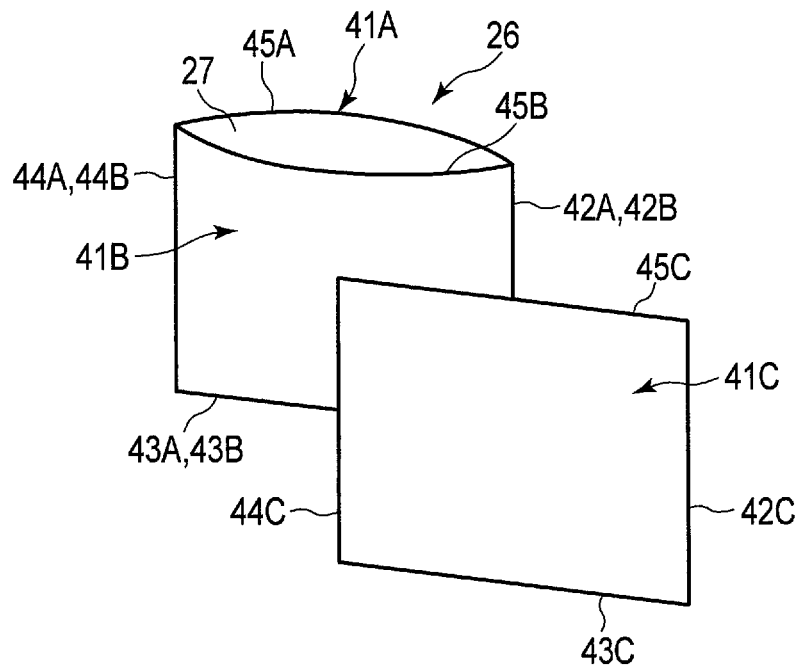
FIG. 13A is a schematic view showing an example of a manufacturing method of two bags of a separator of an electrode group according to a modification of FIG. 12.
Figure 13B:
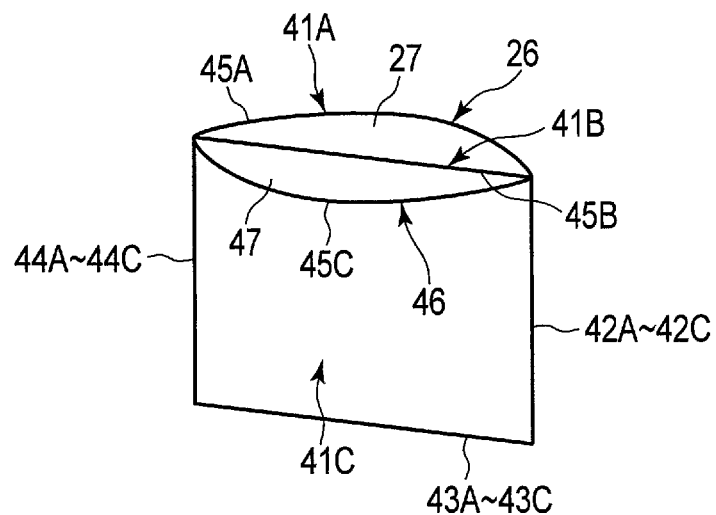
FIG. 13B is a schematic view showing a state in which a sheet is heat-bonded to one bag (first bag) from the state of FIG. 13A, and the other bag (second bag) is formed.

FIGS. 13A and 13B show an example of a manufacturing method of the bag (first bag) 26 and the bag (second bag) 46 in this modification. In the example of FIGS. 13A and 13B, both of the bags 26 and 46 are formed of the above-described sheets 41A and 41B and the sheet 41C. As shown in FIG. 13A, the sheet 41C is formed in a substantially rectangular shape having four sides 42C to 45C. In the example of FIGS. 13A and 13B, as shown in FIG. 13A, the bag (first bag) 26 is formed of the sheets 41A and 41B in the same manner as the example of FIGS. 5A and 5B.

Then, in forming the bag (second bag) 46, as shown in FIG. 13B, the portion of the sheet 41C in the vicinity of the side 42C is heat-bonded to the portion of the sheet 41B in the vicinity of the side 42B, and a portion of the sheet 41C in the vicinity of the side 43C is heat-bonded to a portion of the sheet 41B in the vicinity of the side 43B. Then, the portion of the sheet 41C in the vicinity of the side 44C is heat-bonded to the portion of the sheet 41B in the vicinity of the side 44B. Accordingly, the fusion bonded portion of the sheets 41B and 41C are formed in a substantially U-shape, and the bag 46 is formed. The sheet 41C is heat-bonded to the sheet 41B from the side opposite to the side where the sheet 41A is located. In the fusion bonded portion, the sheets 41B and 41C are heat-bonded to each other through the resin having fusion bonding properties. By forming the fusion bonded portion as described above, in the bag 46, the opening edge of the bag opening 47 is formed by the side 45B of the sheet 41B and the side 45C of the sheet 41C.

In another example, the bag (first bag) 26 is formed of the sheet 51 in the same manner as in the example of FIGS. 6A and 6B. Then, in the same manner as in the example of FIGS. 13A and 13A, the sheet 41C is heat-bonded to the bag 26, and the bag 46 is formed.

Further, in one example, it is not necessary to form the bags 26 and 46 from the three sheets 41A to 41C as in the example of FIGS. 13A and 13B, and the bags 26 and 46 are formed of only one sheet. In this case, the bags 26, are formed by heat-bonding one part of the sheet to another part of the sheet.

Also, the bags 26, 46 may be independent of one another. Also, the bags 26, 46 can be heat-bonded to one another at one of the portions corresponding to the sides 42A, 42B, 43A, 43B, 44A, and 44B of FIG. 5B, for example.

In this modification, since each of the bags 26 and 46 is formed as described above, only one sheet similar to the sheet 41A to 41C and the like are provided between the negative electrode 6 and the positive electrode 7 adjacent to each other in the array direction. Then, the negative electrode 6 and positive electrode 7 adjacent to each other are separated by the one sheet. Further, in this modification, one sheet disposed between the negative electrode 6 and positive electrode 7 adjacent to each other forms a part of the bag 26 in which the first electrode (one of the negative electrode 6 and the positive electrode 7) is housed, and forms a part of the bag 46 in which the second electrode (the other of the negative electrode 6 and the positive electrode 7) is housed. That is, one sheet disposed between the negative electrode 6 and positive electrode 7 adjacent to each other is shared by both of the bags 26 and 46.

Further, in a modification, as in the same manner as a modification of FIG. 12, the composition layer 57 and the supporter 58 are not provided on the separator 8. Then, the separator 8 is formed only of the composition layer 37, and the bags 26 and 46 are formed of the composition layer 37. In this modification, the separator surface (first separator surface) 35 facing the negative electrode 6 in the separator 8 is formed of the composition layer 37. Then, a separator surface (second separator surface) 36 facing the positive electrode 7 in the separator 8 is also formed of the composition layer 37. Also in this modification, the air permeability coefficient of the separator 8 is $1.0 \times 10^{-14}$ m$^2$ or less. Also in this modification, the bags 26 and 46 are formed in the same manner as the modification of FIG. 12. Therefore, one sheet disposed between the negative electrode 6 and positive electrode 7 adjacent to each other is shared by both of the bags 26 and 46.

Further, in a modification, as in the same manner as a modification of FIG. 12, the composition layer 57 and the supporter 58 are not provided on the separator 8. Then, in the separator 8, the composition layers 37 (37A, 37B) are laminated on both sides of the supporter 38. That is, the composition layers 37 (37A,37B) are laminated on the supporter 38 on both the side where the negative electrode 6 is located and the side where the positive electrode 7 is located. In this modification, the separator surface (first separator surface) 35 facing the negative electrode 6 in the separator 8 is formed of the composition layer 37A. Then, a separator surface (second separator surface) 36 facing the positive electrode 7 in the separator 8 is formed of the composition layer 37B. Also in this modification, the air permeability coefficient of the separator 8 is $1.0 \times 10^{-14}$ m$^2$ or less. Also in this modification, the bags 26 and 46 are formed in the same manner as the modification of FIG. 12. Therefore, one sheet disposed between the negative electrode 6 and positive electrode 7 adjacent to each other is shared by both of the bags 26 and 46.

When the composition layers 37 and 57 are a mixed layer containing particles and a polymeric material, each of the composition layers 37 and 57 can contain a solid electrolyte as particles. Also, in each of the composition layers 37 and 57, aluminum oxide or silica can be contained as particles instead of the solid electrolyte. Also, in one example, each of the composition layers 37 and 57 is formed of a solid electrolyte plate. Furthermore, in one example, a solid electrolyte and aluminum oxide or silica can be mixed.

Also, in one modification, the bag opening 27 is not formed in each of the bags 26, as in the example of FIGS. 7B and 7C. Also, in one modification, the bag opening 47 is not formed in each of the bags 46.

The separator 8 according to the second embodiment described above and the modification thereof includes the composition layer (at least one of 37 and 57). Then, a separator surface (first separator surface) 35 of the separator 8 facing the negative electrode 6 is also formed of the composition layer. Further, the air permeability coefficient of the separator 8 is $1.0 \times 10^{-14}$ m$^2$ or less.

And in the second embodiment, modification thereof, and so forth, a separator includes the second bag in which the second electrode is housed in the interior thereof in addition to the first bag. The second bag is formed outside the first bag in the housing space of the container member. The second electrolyte is retained by the second electrode in the interior of the second bag.

Third Embodiment

Figure 14:
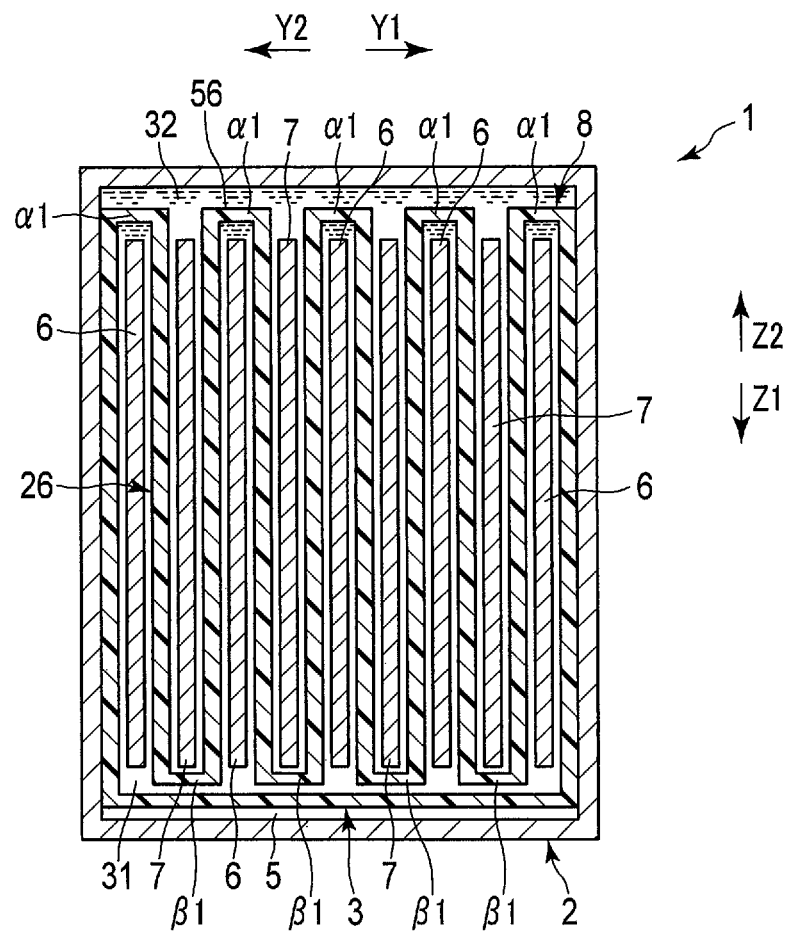
FIG. 14 is a cross-sectional view schematically showing a battery according to a third embodiment.

FIG. 14 shows a battery 1 of the third embodiment. The battery 1 of the present embodiment is modified from the first embodiment in the following configuration. Here, FIG. 14 shows a cross section perpendicular or substantially perpendicular to the height direction (direction shown by an arrow X1 and an arrow X2), and shows a cross section corresponding to the A2-A2 cross section of FIG. 2. Moreover, in the present embodiment, for example, a cross section perpendicular to or substantially perpendicular to the second direction, such as a cross section corresponding to the A1-A1 cross section in FIG. 1, is substantially the same as the first embodiment (see FIG. 2).

As shown in FIG. 14, also in the present embodiment, a bag (first bag) 26 is housed in a housing space 5 of a container member 2 in the same manner as the first embodiment and so forth described above. However, in the present embodiment, only one bag 26 is provided, and a plurality of negative electrodes 6 are housed in the one bag 26. In the present embodiment, all the negative electrodes 6 are housed in the interior of the bag 26. Then, all the positive electrodes 7 are disposed outside the bag 26 in the housing space 5. Therefore, in the present embodiment, each of the negative electrodes 6 is a first electrode disposed in the interior of one bag (first bag) 26, and each of the positive electrodes 7 is a second electrode disposed outside the bag 26. Here, in the present embodiment, a region located outside the bag 26 is located outside the separator 8. Also, in the example of FIG. 14, the bag 26 has a bag opening 27.

In the present embodiment, a zigzag portion 56 extending in a zigzag shape is formed on a peripheral wall of the bag 26. With the provision of the zigzag portion 56, convex portions α1 and concave portions 131 are alternately arrayed in the bag 26. In the interior of the bag 26, corresponding one of the negative electrodes 6 is disposed at each of the convex portions α1. Likewise, a gap is formed in each of the concave portions β1 outside the bag 26. Corresponding one of the positive electrodes 7 is disposed in the gap formed by each of the concave portions β1. Since the negative electrodes 6 and the positive electrodes 7 are disposed as described above, the negative electrodes 6 and the positive electrodes 7 are alternately arrayed also in the present embodiment. Then, a part of a separator 8 is interposed between the negative electrode 6 and the positive electrode 7 adjacent to each other in the array direction. In the present embodiment, the array direction of the negative electrodes 6 and the positive electrodes 7 matches or substantially matches the array direction of the convex portions α1 and the concave portions β1 in the zigzag portion 56.

Also in the present embodiment, an electrolyte (first electrolyte) 31 is housed in the interior of the bags (first bags) 26, and in the interiors of the bags 26, the electrolyte 31 is retained by (impregnated in) the negative electrodes 6. Then, an electrolyte (second electrolyte) 32 is retained by (impregnated in) the positive electrode 7 outside the bag 26 in the housing space 5.

Also in the present embodiment, the separator 8 has a separator surface (first separator surface) 35 facing the negative electrode 6 and a separator surface (second separator surface) 36 facing the positive electrode 7. Therefore, in the bag 26, the separator surface 35 faces inward and the separator surface 36 faces outward. The separator 8 includes at least one of the aforementioned composition layers (for example, 37). Further, in the present embodiment, the separator surface (first separator surface) 35 facing the negative electrode 6 in the separator 8 is formed of the composition layer 37 (37A) as in the first embodiment and the modification thereof, and so forth. Further, in the separator 8, as described above in the first embodiment and the modification thereof, the presence or absence or the like of each of the supporter and the composition layer 37B can be appropriately changed. Also, the composition layer is at least one of a layer containing particles and a polymeric material, and a solid electrolyte containing layer including a solid electrolyte. Also in the present embodiment, the air permeability coefficient of the separator 8 is $1.0 \times 10^{-14}$ m$^2$ or less as in the first embodiment, the modification thereof, and so forth.

FIGS. 15A and 15B show an example of a manufacturing method of the bag (first bag) 26 of the present embodiment. In the example of FIGS. 15A and 15B, the bag 26 is formed of one sheet 61. As shown in FIG. 15A, the sheet 61 is formed in a substantially rectangular shape having four sides 62-65. In the manufacture of the bags 26, the sheet is bent at a plurality of places to form the zigzag portion 56. Then, as shown in FIG. 15B, a portion of the sheet 61 in the vicinity of the side 62 is heat-bonded to a portion of the sheet 61 in the vicinity of the side 64. Then, a range in the sheet 61 where the side 63 is extended is closed by heat-bonding. Accordingly, a fusion bonded portion in which a part of the sheet 61 is heat-bonded to another part of the sheet 61 is formed. In the fusion bonded portion, a part of the sheet 61 is heat-bonded to another part of the sheet 61 through a resin having fusion bonding properties. By forming the fusion bonded portion as described above, in the bag 26, the opening edge of the bag opening 27 is formed by the side 65 of the sheet 61.

Although the bag 26 is formed of one sheet 61 in one example of FIGS. 15A and 15B, the bag 26 may be formed of a plurality of sheets. Also, in the present embodiment, as described above, the negative electrodes 6 are housed in the interior of the bags 26, and the separator surface 35 facing the negative electrodes 6 in the separator 8 are formed of the composition layer 37. Therefore, for example, when the separator 8 is formed in a two-layer structure of the composition layer 37 and the supporter 38, heat-bonding is performed in a state in which the composition layer 37 is located inside the bag 26 with respect to the supporter 38, and the bag 26 is manufactured.

Modifications of Third Embodiment

In a modification, the positive electrodes 7 are housed in the interior of the bag 26. In this case, each of the positive electrodes 7 is a first electrode disposed in the interior of bags (first bags) 26. Then, each of the negative electrodes 6 serves as a second electrode disposed outside the bag 26. In this modification, the electrolyte (first electrolyte) 31 housed in the interiors of the bags 26 is the positive electrode side electrolyte, and the electrolyte (second electrolyte) 32 disposed outside the bags 26 is the negative electrode side electrolyte.

Also in this modification, the bags 26 are manufactured in the same manner as the above-described third embodiment and the like. However, in the present modification, the positive electrodes 7 are housed in the interior of the bag 26. Therefore, for example, when the separator 8 is formed in a two-layer structure of the composition layer 37 and the supporter 38, the above described heat-bonding is performed in a state in which the composition layer 37 is located outside the bag 26 with respect to the supporter 38, and the bag 26 is manufactured.

Also, in one modification, the bag opening 27 is not formed in the bag 26, as in the example of FIGS. 7B and 7C.

Fourth Embodiment

Figure 16:
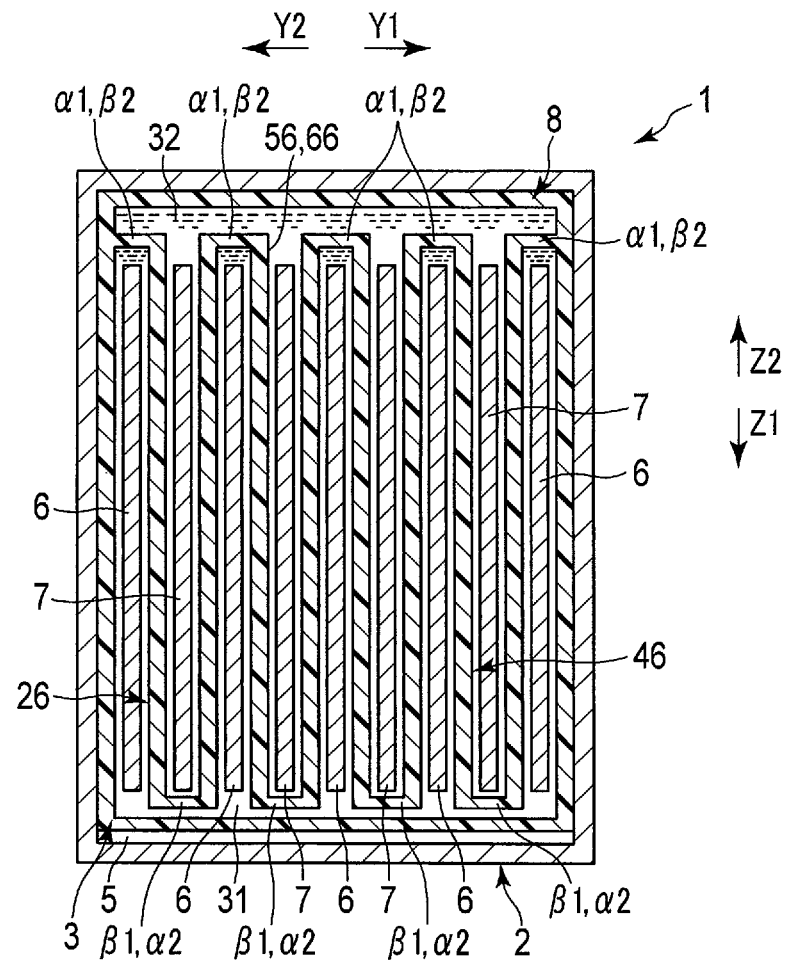
FIG. 16 is a cross-sectional view schematically showing a battery according to a fourth embodiment.

FIG. 16 shows a battery 1 of the fourth embodiment. The battery 1 of the present embodiment is modified from the second embodiment and the third embodiment in the following configuration. Here, FIG. 16 shows a cross section perpendicular or substantially perpendicular to the height direction (direction shown by an arrow X1 and an arrow X2), and shows a cross section corresponding to the A3-A3 cross section of FIG. 8. Moreover, in the present embodiment, for example, a cross section perpendicular to or substantially perpendicular to the second direction, such as a cross section corresponding to the A1-A1 cross section in FIG. 1, is substantially the same as the second embodiment (see FIG. 8).

As shown in FIG. 16, also in the present embodiment, all negative electrodes 6 are housed in one bag (first bag) 26 provided with the zigzag portion 56 in the same manner as the third embodiment and so forth described above. However, in the present embodiment, a separator 8 includes one bag (second bag) 46 in addition to the bag 26. The plurality of positive electrodes 7 are then housed in the one bag 46, and in the present embodiment, all the positive electrodes 7 are housed in the interior of the bag 46. Therefore, in the present embodiment, each of the negative electrodes 6 is a first electrode disposed in the interior of one bag (first bag) 26, and each of the positive electrodes 7 is a second electrode disposed in the interior of the bag (second bag) 46. Moreover, the bag 46 is disposed in a housing space 5 of a container member 2 in the state in which all the positive electrodes 7 are housed in the interior thereof.

In the present embodiment, in a housing space 5 of the container member 2, the bag (second bag) 46 is disposed outside the bag (first bag) 26, and is not housed in the bag 26. Therefore, also in the present embodiment, each of the positive electrodes 7 which are the second electrodes is disposed outside the bag (first bag) 26. Here, in the present embodiment, a region located outside the bags 26 and 46 is located outside the separator 8. Also, in the example of FIG. 16, the bag 46 has a bag opening 47.

Also in the present embodiment, the aforementioned zigzag portion 56 is formed on a peripheral wall of the bag 26. In the interior of the bag 26, corresponding one of the negative electrodes 6 is disposed at each of the convex portions α1 of the zigzag portion 56. Further, in the present embodiment, a zigzag portion 66 extending in a zigzag shape is formed on a peripheral wall of the bag 46. With the provision of the zigzag portion 66, convex portions α2 and concave portions 32 are alternately arrayed in the bag 46. In the interior of the bag 46, corresponding one of the positive electrodes 7 is disposed at each of the convex portions α2. Likewise, a gap is formed in each of the concave portions β2 outside the bag 46.

In the present embodiment, corresponding ones of the convex portions α2 of the zigzag portion 66 are disposed in the gaps formed by the concave portions β1 of the zigzag portion 56 of the bag 26. Therefore, corresponding ones of the positive electrodes 7 are disposed in the gaps formed by the concave portions β1 of the zigzag portion 56, respectively. Corresponding ones of the convex portions α1 of the zigzag portion 56 are disposed in the gaps formed by the concave portions β2 of the zigzag portion 66 of the bag 46. Therefore, corresponding ones of the negative electrodes 6 are disposed in the gaps formed by the concave portions β2 of the zigzag portion 66, respectively. Since the negative electrodes 6 and the positive electrodes 7 are disposed as described above, the negative electrodes 6 and the positive electrodes 7 are alternately arrayed also in the present embodiment. Then, a part of a separator 8 is interposed between the negative electrode 6 and the positive electrode 7 adjacent to each other in the array direction. In the present embodiment, the array direction of the negative electrodes 6 and the positive electrodes 7 matches or substantially matches the array direction of the convex portions α1 and the concave portions β1 in the zigzag portion 56 and the array direction of the convex portions α2 and the concave portions 132 in the zigzag portion 66.

Also in the present embodiment, an electrolyte (first electrolyte) 31 is housed in the interior of the bags (first bags) 26, and in the interiors of the bags 26, the electrolyte 31 is retained by (impregnated in) the negative electrodes 6. Then, the electrolyte (second electrolyte) 32 is housed in the interior of the bag 46 in the housing space 5, and the electrolyte 32 is retained by (impregnated in) the positive electrode 7 in the interior of the bag 46. Therefore, the electrolyte 32 is retained by (impregnated in) the positive electrode 7 outside the bag 26.

Also in the present embodiment, the separator 8 has a separator surface (first separator surface) 35 facing the negative electrode 6 and a separator surface (second separator surface) 36 facing the positive electrode 7. Therefore, in the bag 26, the separator surface 35 faces inward. In the bag 46, the separator surface 36 faces inward. The separator 8 includes at least one of the aforementioned composition layers (for example, 37, 57). Further, in the present embodiment, the separator surface (first separator surface) 35 facing the negative electrode 6 in the separator 8 is formed of the composition layer 37 (37A) as in the second embodiment and the modification thereof, and so forth. Further, in the present embodiment, as described above in the second embodiment and the modification thereof, the presence or absence or the like of each of the supporters 38 and 58 and the composition layers 37B, 57 (57A, 57B) can be appropriately changed in the separator 8. Also, the composition layers 37 and 57 is at least one of a layer containing particles and a polymeric material, and a solid electrolyte containing layer including a solid electrolyte. Also in the present embodiment, the air permeability coefficient of the separator 8 is $1.0 \times 10^{-14}$ m$^2$ or less as in the second embodiment, the modification thereof, and so forth.

The bag 46 can be manufactured in the same manner as the bag 26 by the method described above in the third embodiment and so forth of the example method of FIGS. 15A and 15B. At this time, in the same manner as formation of the zigzag portion 56, the sheet (for example, a sheet similar to the sheet 61 or the like) is bent at a plurality of points to form the zigzag portion 66. Then, in the same manner as the formation of the bag 26, heat-bonding is performed to form the bag 46. In the present embodiment, as described above, the positive electrodes 7 are housed in the interior of the bag 46. Therefore, for example, when the bag 46 is manufactured by using a sheet formed of the composition layer 57 (57A) and the supporter 58, heat-bonding is performed in a state in which the composition layer 57 is positioned outside the bag 46 with respect to the supporter 58, so that the bags 46 is manufactured.

Further, in the configuration in which the composition layer 57 (57A, 57B) and the supporter 58 are not provided in the separator 8, the bags 26, 46 can be manufactured by the method shown in one example of FIGS. 17A and 17B. When the separator 8 is to be manufactured by the method of an example of FIGS. 17A and 17B, the separator 8 is formed only of the composition layer 37 (37A), is formed only of the composition layer 37 (37A) and the supporter 38, or is formed only of the composition layers 37A and 37B and the supporter 38.

In the example of FIGS. 17A and 17B, both of the bags 26, 46 are formed of the sheet 61 described above and the sheet 71. As shown in FIG. 17A, the sheet 71 is formed in a substantially rectangular shape having four sides 72-75. In the example of FIGS. 17A and 17B, as shown in FIG. 17A, the bag (first bag) 26 is formed of the sheet 61 in the same manner as the example of FIGS. 15A and 15B. Then, in formation of bag (second bag) 46, as shown in FIG. 17B, a portion of the sheet 71 in the vicinity of side 72, a portion of the sheet 71 in the vicinity of side 73, and a portion of the sheet 71 in the vicinity of side 74 are heat-bonded to the bag 26. Accordingly, a fusion bonded portion of the sheet 71 to the bag 26 is formed, and the bag (second bag) 46 is formed. In the fusion bonded portion, the sheets 61, 71 are heat-bonded to each other through the resin having fusion bonding properties. By forming the fusion bonded portion as described above, in the bag 46, the opening edge of the bag opening 47 is formed by the side 65 of the sheet 61 and the side 75 of the sheet 71.

Modifications of Fourth Embodiment

In a modification, the positive electrodes 7 are housed in the interior of the bag (first bag) 26, and the negative electrodes 6 are housed in the interior of the bag (second bag) 46. In this case, each of the positive electrodes 7 is a first electrode disposed in the interior of the bag (first bag) 26. Then, each of the negative electrodes 6 becomes a second electrode disposed in the interior of the bag (second bag) 46. In this modification, the electrolyte (first electrolyte) 31 housed in the interiors of the bags 26 is the positive electrode side electrolyte, and the electrolyte (second electrolyte) 32 housed in the interior the bags 46 is the negative electrode side electrolyte.

Further, in a modification, as described above in the modification of the second embodiment, one of the electrolytes 31 and 32 may be disposed (filled) outside the bags 26 and 46 in the housing space 5.

Also, in one modification, the bag opening 27 is not formed in the bag 26, as in the example of FIGS. 7B and 7C. Also, in one modification, the bag opening 47 is not formed in the bag 46.

(Details of Each Component)

Hereinafter, each component of battery 1 of the above-described embodiment and so forth (modifications are included) is explained in detail. In the following description, the electrolytes 31 and 32, the negative electrode 6, the positive electrode 7, the separator 8, and the container member 2 will be described in detail.

1) Electrolyte

First, the negative electrode side electrolyte will be described. The negative electrode side electrolyte is at least retained by the negative electrode. The negative electrode side electrolyte is, for example, an aqueous solution (aqueous electrolysis solution) containing an alkali metal salt and an aqueous solvent in which the alkali metal salt is dissolved. In addition to the negative electrode, the negative electrode side electrolyte may be retained by at least one of the positive electrode and the separator.

The aqueous solvent of the negative electrode side electrolyte is a solvent containing water, and may consist of water alone or a solvent other than water and water. As solvents other than water, water-soluble organic solvents can be mentioned. Examples of the water-soluble organic solvent include γ-butyrolactone, acetonitrile, alcohols, N-methylpyrrolidone (NMP), dimethylacetamide, dimethylsulfoxide, tetrahydrofuran and the like. The number of types of solvent contained in the aqueous solvent of the negative electrode side electrolyte can be one or two or more. In the aqueous solvent of the negative electrode side electrolyte, the content of the solvent other than water is preferably 20% by weight or less.

The alkali metal salt contained in the negative electrode side electrolyte is, for example, one or two or more types of alkali metal salts selected from the group consisting of Li, Na and K. Since each of Li, Na and K is excellent in ion conductivity, the ion conductivity of the negative electrode side electrolyte can be increased. The number of types of the alkali metal salt of the negative electrode side electrolyte can be one or two or more. More preferably, $Li^+$ is obtained as an alkali metal ion by dissolving the alkali metal salt in an aqueous solvent. Therefore, it is more preferable that a lithium salt be used as the alkali metal salt of the negative electrode side electrolyte.

In the negative electrode side electrolyte, the concentration of the alkali metal ion in the aqueous solvent is preferably from 1 mol/L to 12 mol/L. By increasing the concentration of the alkali metal ion, free water molecules in the negative electrode side electrolyte can be reduced, and thus generation of hydrogen can be suppressed. The concentration of the alkali metal ion in the aqueous solvent is preferably 4 mol/L or more, more preferably 5 mol/L or more, in the range described above as well. In addition, the concentration of the alkali metal ion in the aqueous solvent is preferably 10 mol/L or less in the range described above as well.

The alkali metal salt of the negative electrode side electrolyte is, for example, a lithium salt. Examples of lithium salts include LiCl, LiBr, LiOH, $Li_2SO_4$, $LiNO_3$, $Li_2C_2O_4$, $Li_2CO_3$, Li $[(FSO_2)_2N]$, Li $[(CF_3SO_2)_2N]$ and LiB $[(OCO)_2]_2$ and the like. The number of types of lithium salt used can be one or two or more. The lithium salt to be used is preferably a lithium salt containing LiCl, LiOH, Li[$(FSO_2)_2N$] or Li[$(CF_3SO_2)_2N$].

The anion of the alkali metal salt of the negative electrode side electrolyte includes one or two or more ions selected from the group consisting of, for example, $Cl^-$, $Br^-$, $OH^-$, $SO_4^{2-}$, $NO_3^-$, $C_2O_4^{2-}$, $CO_3^{2-}$, $[(FSO_2)_2N]^-$, $[(CF_3SO_2)_2N]^-$ and B $[(OCO)_2]_2^-$. In particular, the anion preferably includes one or two or more ions selected from the group consisting of $Cl^-$, $OH^-$, $[(FSO_2)_2N]^-$ and $[(CF_3SO_2)_2N]^-$. Accordingly, the concentration of alkali metal ions can be increased, so that generation of hydrogen at the negative electrode can be suppressed. Accordingly, the charge/discharge efficiency (Coulombic efficiency) of the battery is increased, and the storage performance and the cycle life performance are significantly improved.

In addition, the pH value of the negative electrode side electrolyte is preferably in the range from 3 to 14. When the pH value is in the above-described range, the hydrogen generation potential at the negative electrode is lowered, so that the generation of hydrogen at the negative electrode is suppressed. Accordingly, this improves the storage performance and cycle life performance of the battery.

The negative electrode side electrolyte may be a gel electrolyte containing a complex of the above-described alkali metal salt and a polymeric material. When the negative electrode side electrolyte is a gel electrolyte, diffusion of water molecules from the negative electrode side electrolyte to the negative electrode can be suppressed, and generation of hydrogen at the negative electrode can be significantly suppressed. Therefore, the cycle life performance and storage performance of the battery can be significantly improved. The complex is, for example, a gel electrolyte in which an aqueous solution in which the above-described alkali metal salt is dissolved in an aqueous solvent and a polymeric material are combined to form a gel. Examples of the polymeric material to be complexed with an alkali metal salt include polyacrylate (for example, lithium polyacrylate, potassium polyacrylate etc.), polyvinylidene fluoride (PVdF), polyacrylonitrile (PAN) and polyethylene oxide (PEO). The number of types of polymeric material can be one or two or more. The form of the polymeric material can be, for example, granular and fibrous. The content of the polymeric material in the negative electrode side electrolyte can be in the range from 0.5% by weight to 10% by weight.

Next, the positive electrode side electrolyte will be described. The positive electrode side electrolyte is at least retained by the positive electrode. The positive electrode side electrolyte is, for example, an aqueous solution (aqueous electrolysis solution) containing an alkali metal salt and an aqueous solvent in which the alkali metal salt is dissolved. The positive electrode side electrolyte may be retained by at least one of the negative electrode and the separator in addition to the positive electrode.

The aqueous solvent of the positive electrode side electrolyte is a solvent containing water, and may consist of water alone or a solvent other than water and water. As solvents other than water, water-soluble organic solvents can be mentioned. Examples of the water-soluble organic solvent include γ-butyrolactone, acetonitrile, alcohols, N-methylpyrrolidone (NMP), dimethylacetamide, dimethylsulfoxide, tetrahydrofuran and the like. The number of types of solvent contained in the aqueous solvent of the positive electrode side electrolyte can be one or two or more. In the aqueous solvent of the positive electrode side electrolyte, the content of the solvent other than water is preferably 20% by weight or less.

The alkali metal salt contained in the positive electrode side electrolyte is, for example, one or two or more types of alkali metal salts selected from the group consisting of Li, Na and K. Since each of Li, Na and K is excellent in ion conductivity, the ion conductivity of the positive electrode side electrolyte can be increased. The number of types of alkali metal salt of the positive electrode side electrolyte can be one or two or more. More preferably, $Li^+$ is obtained as an alkali metal ion by dissolving the alkali metal salt in an aqueous solvent. Therefore, it is more preferable that a lithium salt be used as the alkali metal salt of the positive electrode side electrolyte.

In the positive electrode side electrolyte, the concentration of the alkali metal ion in the aqueous solvent is preferably in a range from 1 mol/L to 8 mol/L. By setting the concentration of the alkali metal ion within the above-described range, a positive electrode side electrolyte with good ion conductivity can be obtained. The concentration of the alkali metal ion in the aqueous solvent is preferably in a range from 1 mol/L to 6 mol/L or less, and more preferably from 1.5 mol/L to 6 mol/L in the range described above as well. In this case, the ion conductivity of the positive electrode side electrolyte is increased, and the reaction resistance at the positive electrode is reduced. Therefore, the high current performance of the battery is improved.

The alkali metal salt of the positive electrode side electrolyte is, for example, a lithium salt. Examples of lithium salts include LiCl, LiBr, LiOH, $Li_2SO_4$, $LiNO_3$, $Li_2C_2O_4$ r $Li_2CO_3$, Li [$(FSO_2)_2N$], Li [$(CF_3SO_2)_2N$] and LiB [$(OCO)_2$]$_2$ and the like. The number of types of lithium salt used can be one or two or more. As a lithium salt to be used, a lithium salt containing LiCl, $LiNO_3$, $Li_2CO_3$ or $Li_2SO_4$ is preferable. LiCl is concerned about the generation of $Cl_2$ during charge, but has excellent solubility in aqueous solvents. Although each of $Li_2SO_4$ and $LiNO_3$ is not highly soluble in aqueous solvents, it contributes to the improvement of high current performance and cycle life performance of the battery.

The anion of the alkali metal salt of the positive electrode side electrolyte includes one or two or more ions selected from the group consisting of, for example, $Cl^-$, $Br^-$, $OH^-$, $SO_4^{2-}$, $NO_3^-$, $C_2O_4^{2-}$, $CO_3^{2-}$, $[(FSO_2)_2N]^-$, $[(CF_3SO_2)_2N]^-$ and B $[(OCO)_2]_2^-$. In particular, the anion preferably includes one or two or more ions selected from the group consisting of $Cl^-$, $NO_3^-$, $CO_3^{2-}$, and $SO_4^{2-}$. Accordingly, the charge/discharge efficiency (Coulombic efficiency) of the battery is improved, and the cycle life performance and storage performance of the battery are improved.

Further, the pH value of the positive electrode side electrolyte is preferably in the range from 1 to 8. When the pH value is in the above-described range, the oxygen generation potential the positive electrode is increased, so that the oxygen generation at the positive electrode is reduced. Accordingly, the storage performance and cycle life performance of the battery significantly improves. The pH value of the positive electrode side electrolyte is more preferably in the range from 3 to 7.5.

The positive electrode side electrolyte may be a gel electrolyte containing a complex of the above-described alkali metal salt and a polymeric material. When the positive electrode side electrolyte is a gel electrolyte, diffusion of water molecules from the positive electrode side electrolyte to the negative electrode can be suppressed, and generation of hydrogen at the negative electrode can be significantly suppressed. Therefore, the cycle life performance and storage performance of the battery can be significantly improved. The complex is, for example, a gel electrolyte in which an aqueous solution in which the above-described alkali metal salt is dissolved in an aqueous solvent and a polymeric material are combined to form a gel. Examples of a polymeric material to be complexed with an alkali metal salt include polyacrylate (for example, lithium polyacrylate, potassium polyacrylate, etc.), polyvinylidene fluoride (PVdF), polyacrylonitrile (PAN), polyethylene oxide (PEO). The number of types of polymeric material can be one or two or more. The form of the polymeric material can be, for example, granular and fibrous. The content of the polymeric material in the positive electrode electrolyte can be in the range from 0.5% by weight to 10% by weight.

The type of the anion (anion) of the alkali metal salt contained in the negative electrode side electrolyte and the type of the anion (anion) of the alkali metal salt contained in the positive electrode side electrolyte may be identical to each other and may be different from each other. By using one or two or more ions selected from the group consisting of $Cl^-$, $OH^-$, $[(FSO_2)_2N]^-$ and $[(CF_3SO_2)_2N]^-$ as the anion of the negative electrode side electrolyte and one or two or more ions selected from the group consisting of $Cl^-$, $NO_3^-$, $CO_3^{2-}$ and $SO_4^{2-}$ as anions of the positive electrode side electrolyte, the charge/discharge efficiency (Coulombic efficiency) of the battery is improved and generation of hydrogen at the negative electrode is suppressed. Therefore, the storage performance and cycle life performance of the battery (secondary battery) can be improved. Further, each of the negative electrode side electrolyte and the positive electrode side electrolyte can contain a lithium ion, a sodium ion and a magnesium ion. Furthermore, a zinc ion and a hydroxide ion can also be included. These ions may be used alone or in combination of two or more.

Moreover, a non-aqueous electrolyte can be used instead of the above-described aqueous electrolyte as a negative electrode side electrolyte and a positive electrode side electrolyte. A non-aqueous electrolyte used as the negative electrode side electrolyte and the positive electrode side electrolyte may include a non-aqueous electrolysis solution. The non-aqueous electrolysis solution is prepared by dissolving the electrolyte in an organic solvent. In the non-aqueous electrolysis solution, the concentration of the electrolyte is preferably in the range from 0.5 mol/L to 2.5 mol/L.

Examples of the electrolyte dissolved in the organic solvent include lithium salts such as lithium perchlorate ($LiClO_4$), lithium hexafluorophosphate ($LiPF_6$), lithium tetrafluoroborate ($LiBF_4$), lithium arsenic hexafluoride ($LiAsF_6$), trifluoromethanesulfonate ($LiCF_3SO_3$) and bistrifluoromethylsulfonylimide lithium ($LiN(CF_3SO_2)_2$) and mixtures thereof. In addition, it is preferable that the electrolyte be hardly oxidized even at high potential, and it is most preferable that $LiPF_6$ be used as the electrolyte.

Examples of organic solvents in which the electrolyte is dissolved include cyclic carbonates such as propylene carbonate (PC), ethylene carbonate (EC), and vinylene carbonate; chain carbonate such as diethyl carbonate (DEC), dimethyl carbonate (DMC), and methyl ethyl carbonate (MEC);

a cyclic ether such as tetrahydrofuran (THF), 2 methyltetrahydrofuran (2MeTHF), and dioxolane (DOX); a chain ether such as dimethoxyethane (DME) and diethoxyethane (DEE); γ-butyrolactone (GBL), acetonitrile (AN) and sulfolane (SL). These organic solvents can be used alone or as a mixed solvent.

As the organic solvent, a mixed solvent obtained by mixing at least two or more selected from the group consisting of propylene carbonate (PC), ethylene carbonate (EC), and diethyl carbonate (DEC), or a mixed solvent containing γ-butyrolactone (GBL) is preferably used. The use of these mixed solvents improves the high temperature characteristics of the battery.

In addition, a gel non-aqueous electrolyte can be used instead of the non-aqueous electrolysis solution. The gel non-aqueous electrolyte is prepared by complexing the non-aqueous electrolysis solution and the polymeric material described above. Examples of polymeric materials complexed with non-aqueous electrolysis solution include polyvinylidene fluoride (PVdF), polyacrylonitrile (PAN) and polyethylene oxide (PEO), and mixtures thereof.

2) Negative Electrode

The negative electrode includes a negative electrode current collector and a negative electrode active material-containing layer disposed on the negative electrode current collector. The negative electrode active material-containing layer may be formed on one side or both sides of the negative electrode current collector. The negative electrode active material-containing layer contains a negative electrode active material. In addition, the negative electrode active material-containing layer can optionally contain an electro-conductive agent and a binder.

The negative electrode current collector contains at least one metal selected from the group consisting of aluminum, copper, zinc, nickel, titanium, magnesium, manganese and iron. The negative electrode current collector can include one of the aforementioned metals. The negative electrode current collector can also contain two or more of the above-described metals. In one embodiment, the negative electrode current collector is, for example, a metal foil made of one of the aforementioned metal types. In another embodiment, the negative electrode current collector is, for example, a foil of an alloy containing two or more types of the aforementioned metals. Examples of the shape of a negative electrode current collector include a mesh, a porous body in addition to the foil. From the viewpoint of improving the energy density and output of the battery, it is desirable that the negative electrode current collector be in the form of a foil having a small volume and a large surface area. In addition, the thickness of the negative electrode current collector can be set to a value in the range from 5 μm to 20 μm.

A metal or a compound which absorbs and releases alkali metal ions is used as the negative electrode active material contained in the negative electrode active material-containing layer, and a metal or a compound which absorbs and releases lithium ions is preferably used. In particular, the negative electrode active material desirably has a lithium ion storage/discharge potential in the range from 0.2 V (vs. Li/Li$^+$) to 3 V (vs. Li/Li$^+$) based on the Li potential. Examples of the negative electrode active material include metal alloys such as lithium alloys, carbon materials, and titanium-containing oxides. The number of types of negative electrode active material to be used can be one or two or more.

The negative electrode active material preferably contains a titanium-containing oxide. By using a titanium-containing oxide as the negative electrode active material, generation of hydrogen due to reductive decomposition of water can be significantly suppressed in the negative electrode. Accordingly, lithium ion can be occluded and released efficiently. Examples of titanium-containing oxides include titanium oxide, lithium titanium oxide, niobium titanium oxide and sodium niobium titanium oxide.

Examples of the titanium oxide include a titanium oxide having a monoclinic structure, a titanium oxide having a rutile structure, and a titanium oxide having an anatase structure. The titanium oxide having each crystal structure can be represented by $TiO_2$ as an uncharged composition and $Li_xTiO_2$ (x: 0≤x≤1) as a charged composition. The uncharged structure of the titanium oxide having a monoclinic structure can be represented as $TiO_2$ (B).

Examples of the lithium-titanium-containing composite oxide include a lithium titanium oxide having a spinel structure (for example, the general formula: $Li_{4+x}Ti_5O_{12}$ (−1≤x≤3)), a lithium titanium oxide having a ramsdellite structure (for example, $Li_{2+x}Ti_3O_7$ (−1≤x≤3), $Li_{1+x}Ti_2O_4$ (0≤x≤1), $Li_{1.1+x}Ti_{1.8}O_4$ (0≤x≤1), $Li_{1.07+x}Ti_{1.86}O_4$ (0≤x≤1), and $Li_xTiO_2$ (0≤x≤1). Examples of the lithium titanium oxide include a lithium titanium composite oxide in which a dopant is introduced into the above-described lithium titanium oxide having a spinel structure or a ramsdellite structure.

Examples of the niobium-titanium-containing composite oxide include a monoclinic niobium titanium composite oxide represented by $Li_aTiM_bNb_{2+β}O_{7+σ}$ (0≤a≤5, 0≤b≤0.3, 0≤β≤0.3, 0≤σ≤0.3, M is at least one element selected from the group consisting of Fe, V, Mo, and Ta).

Examples of the sodium-niobium-titanium-containing composite oxide include an orthorhombic Na-containing niobium titanium composite oxide represented by the general formula $Li_{2+v}Na_{2-w}M1_xTi_{6-y-z}Nb_yM2_zO_{14+δ}$ (0≤v≤4, 0<w<2, 0≤x<2, 0<y≤6, 0≤z<3, y+z<6, −0.5≤δ≤0.5; M1 contains at least one selected from group consisting of Cs, K, Sr, Ba, and Ca; and M2 contains at least one selected from group consisting of Zr, Sn, V, Ta, Mo, W, Fe, Co, Mn, and Al).

The titanium-containing oxide having the composition described above has a lithium ion absorption and release potential in the range from 1.4 (vs. Li/Li$^+$) to 2 V (vs. Li/Li$^+$). Therefore, by combining the titanium-containing oxide having the composition described above with the above-described negative electrode side electrolyte and positive electrode side electrolyte, generation of hydrogen can be suppressed in the negative electrode, and lithium ions can be efficiently absorbed and released. Further, it is more preferable that the titanium-containing oxide used for the negative electrode active material contain a lithium titanium oxide having a spinel structure. By using a lithium titanium oxide having a spinel structure, volume change of the negative electrode active material due to charge and discharge reaction can be reduced.

In addition, as the negative electrode active material, compounds such as oxides and sulfides other than the above-described active materials can be used. Compounds such as oxides and sulfides used as negative electrode active materials allows insertion and desorption of any of alkali metal ions (or alkaline earth metals) such as lithium ions, lead ions, zinc ions and hydroxide ions.

In addition, when the negative electrode active material-containing layer contains an electro-conductive agent, the current collection performance at the negative electrode is enhanced, and the contact resistance between the negative electrode active material and the negative electrode current collector can be suppressed. Examples of the electro-conductive agent in the negative electrode active material-containing layer include carbonaceous materials such as acetylene black, carbon black, coke, carbon fibers (for example, vapor grown carbon fibers (VGCF), and graphite. As the electro-conductive agent, one of the above-described carbonaceous materials may be used alone, or a plurality of the above-described carbonaceous substances may be used. Further, instead of using an electro-conductive agent, a carbon coat, an electron conductive inorganic material coat, or the like may be applied to the surface of the particles of the negative electrode active material.

When the negative electrode active material-containing layer contains a binder, the gaps in the negative electrode active material-containing layer are filled with the binder, and the negative electrode active material, the electro-conductive agent, and the negative electrode current collector are bound. Examples of the binder include polytetrafluoroethylene (PTFE), polyvinylidene fluoride (PVdF), fluorine-based rubber, styrene butadiene rubber, acrylic resin, imide compound, and cellulose. Examples of the acrylic resin used for a binder include a polyacrylic acid compound. Moreover, examples of the cellulose used for a binder include Carboxymethyl Cellulose (CMC) and the salt of carboxymethylcellulose. As the binder, one of the above-described materials may be used alone, or a plurality of the above-described materials may be used in combination.

The compounding ratio of the negative electrode active material, the electro-conductive agent, and the binder in the negative electrode active material-containing layer is preferably in a range from 70% by weight to 95% by weight for the negative electrode active material, from 3% by weight to 20% by weight for the electro-conductive agent, and from 2% by weight to 10% by weight for the binder. By setting the electro-conductive agent to 3% by weight or more, the conductivity of the negative electrode is secured. Further, by setting the electro-conductive agent to 20% by mass or less, the decomposition of the aqueous electrolyte on the surface of the electro-conductive agent is reduced. Further, by setting the binder to 2% by weight or more, sufficient electrode strength can be obtained. Further, by setting the binder to 10% by weight or less, the amount of the binder to be the insulating material in the negative electrode is reduced, so that the internal resistance is reduced.

The negative electrode can be produced, for example, by the following method. First, a negative electrode active material, an electro-conductive agent and a binder are suspended in a solvent to prepare a slurry. Next, the prepared slurry is applied to one side or both sides of the negative electrode current collector. And the negative electrode active material-containing layer is formed by drying the coating film on a negative electrode current collector. Thereafter, the negative electrode current collector and the negative electrode active material-containing layer formed on the negative electrode current collector are pressed. Further, instead of the press, the negative electrode active material, the electro-conductive agent and the binder may be formed into pellets and used as a negative electrode active material-containing layer.

3) Positive Electrode

The positive electrode includes a positive electrode current collector and a positive electrode active material-containing layer disposed on the positive electrode current collector. The positive electrode active material-containing layer can be formed on one side or both sides of the positive electrode current collector. The positive electrode active material-containing layer contains a positive electrode active material. In addition, the positive electrode active material-containing layer can optionally contain an electro-conductive agent and a binder.

The positive electrode current collector contains at least one metal selected from the group consisting of aluminum, titanium, copper, zinc, nickel, magnesium, manganese, chromium and iron. In one embodiment, the positive electrode current collector is, for example, a metal foil made of one of the aforementioned metal types. In another embodiment, the positive electrode current collector is, for example, a foil of an alloy containing two or more types of the aforementioned metals. Examples of the shape of a positive electrode current collector include a mesh, a porous body in addition to the foil. The positive electrode current collector is formed, for example, in the same shape as the negative electrode current collector.

As the positive electrode active material, for example, a compound capable of absorbing and releasing lithium can be used. As a compound used for a positive electrode active material, a metal oxide is mentioned. As the positive electrode active material, one of the following active materials may be used alone, or two or more of the following active materials may be used.

Examples of the metal oxide used as a positive electrode active material include lithium manganese composite oxide, lithium nickel composite oxide, lithium cobalt aluminum composite oxide, lithium nickel cobalt manganese composite oxide, spinel type lithium manganese nickel composite oxide, lithium manganese cobalt composite oxide, olivine type lithium iron phosphate (for example, LiFePO$_4$), and olivine type lithium manganese phosphate (for example, LiMnPO$_4$).

Examples of preferred positive electrode active materials include lithium manganese composite oxides such as Li$_x$Mn$_2$O$_4$ (0<x≤1) and Li$_x$MnO$_2$ (0<x≤1), lithium nickel aluminum composite oxides such as Li$_x$Ni$_{1-y}$Al$_y$O$_2$ (0<x≤1, 0<y≤1), lithium cobalt composite oxides such as Li$_x$CoO$_2$ (0<x≤1), lithium nickel cobalt composite oxides such as Li$_x$Ni$_{1-y-z}$Co$_y$Mn$_z$O$_2$ (0<x≤1, 0≤y≤1, 0≤z≤1, 0<1-y-z<1), lithium manganese cobalt composite oxides such as Li$_x$Mn$_y$Co$_{1-y}$O$_2$ (0<x≤1, 0<y≤1), spinel type lithium manganese nickel composite oxide such as Li$_x$Mn$_{2-y}$Ni$_y$O$_4$ (0<x≤1, 0<y<2), lithium phosphate oxides having an olivine structure such as Li$_x$FePO$_4$ (0<x≤1), Li$_x$Fe$_{1-y}$Mn$_y$PO$_4$ (0<x≤1, 0≤y≤1), and Li$_x$CoPO$_4$ (0<x≤1), and fluorinated iron sulfate such as Li$_x$FeSO$_4$F (0<x≤1). By using any of these metal oxides as a positive electrode active material, a high voltage can be obtained.

It is more preferable that any of lithium nickel aluminum composite oxides, lithium nickel cobalt manganese composite oxides, and lithium manganese cobalt composite oxides be used among the above-described positive electrode active materials from which a high voltage can be obtained. In this case, the reaction with the electrolyte in a high temperature environment can be suppressed, and the life of the battery can be significantly improved. In particular, by using a lithium nickel cobalt manganese composite oxide represented by Li$_x$Ni$_{1-y-z}$Co$_y$Mn$_z$O$_2$ (0≤x≤1.1, 0≤y≤0.5, 0≤z≤0.5, more preferably 0<x≤1.1, 0<y≤0.5, 0<z≤0.5) as a positive electrode active material, the durability at high temperature is further improved, and the life of the battery is further improved.

Further, among the above-described positive electrode active materials, each of a lithium phosphorus oxide having an olivine structure and a lithium manganese composite oxide having a spinel structure (for example, Li$_x$Mn$_2$O$_4$ ($0<x\leq1$)) has high stability to an aqueous solvent. Therefore, it is also preferable to use these metal oxides as a positive electrode active material.

In addition, as the positive electrode active material, compounds such as oxides and sulfides other than the above-described active materials can be used. Compounds such as oxides and sulfides used as positive electrode active materials can insert and desorb any of alkali metal ions (or alkaline earth metals) such as lithium ions, lead ions, zinc ions and hydroxide ions.

In addition, when the positive electrode active material-containing layer contains an electro-conductive agent, the current collection performance at the positive electrode is enhanced, and the contact resistance between the positive electrode active material and the positive electrode current collector can be suppressed. The electro-conductive agent of the positive electrode active material-containing layer can contain the same material as the electro-conductive agent contained in the negative electrode active material-containing layer. Therefore, examples of the electro-conductive agent of the positive electrode active material-containing layer include carbonaceous materials such as acetylene black, carbon black, coke, carbon fibers, and graphite. As the electro-conductive agent, one of the above-described carbonaceous materials may be used alone, or a plurality of the above-described carbonaceous substances may be used. Further, instead of using an electro-conductive agent, a carbon coat, an electron conductive inorganic material coat, or the like may be applied to the surface of the particles of the positive electrode active material.

In addition, when the positive electrode active material-containing layer contains a binder, in the same manner as the binder of the negative electrode active material-containing layer, the gaps of the positive electrode active material-containing layer are filled, and the positive electrode active material, the electro-conductive agent, and the positive electrode current collector is bound. The binder of the positive electrode active material-containing layer can contain the same material as the binder contained in the negative electrode active material-containing layer. Therefore, examples of the binder of the positive electrode active material-containing layer include polytetrafluoroethylene, polyvinylidene fluoride, fluorine-based rubber, styrene butadiene rubber, acrylic resin, imide compound, and cellulose. Examples of the acrylic resin used for a binder include a polyacrylic acid compound. Moreover, examples of the cellulose used for a binder include carboxymethylcellulose and the salt of carboxymethylcellulose. As the binder, one of the above-described materials may be used alone, or a plurality of the above-described materials may be used in combination.

The compounding ratio of the positive electrode active material, the electro-conductive agent, and the binder in the positive electrode active material-containing layer is preferably in a range from 70% by weight to 95% by weight for the positive electrode active material, from 3% by weight to 20% by weight for the electro-conductive agent, and from 2% by weight to 10% by weight for the binder. By setting the compounding ratio of the electro-conductive agent to 3% by weight or more, the conductivity of the positive electrode is secured. Further, by setting the compounding ratio the electro-conductive agent to 20% by weight or less, the decomposition of the aqueous electrolyte on the surface of the electro-conductive agent is reduced. Further, by setting the compounding ratio of the binder to 2% by weight or more, sufficient electrode strength can be obtained. Further, by setting the compounding ratio of the binder to 10% by weight or less, the amount of the binder to be the insulating material in the positive electrode is reduced, so that the internal resistance is reduced. In addition, the positive electrode can be manufactured, for example, by using the above-described positive electrode active material by the same method as the negative electrode.

4) Separator

The separator is interposed between the negative electrode and the positive electrode to prevent the negative electrode and the positive electrode from contacting each other. The separator is an insulator, and electrically insulates the negative electrode and the positive electrode. The separator is preferably in contact with the negative electrode, and more preferably in contact with both the negative electrode and the positive electrode. By appropriately separating the negative electrode side and the positive electrode side from each other by the separator, the electrolysis of water can be further suppressed.

The separator includes a first bag in which a first electrode, which is one of a negative electrode and a positive electrode, is housed. The second electrode, which is the other of the negative electrode and the positive electrode, is disposed outside the first bag. Further, in the interior of the first bag of the separator, the first electrolyte corresponding to one of the negative electrode side electrolyte and the positive electrode side electrolyte is retained by the first electrode. Then, outside the first bag, the second electrolyte, which is one of the negative electrode side electrolyte and the positive electrode side electrolyte other than the first electrolyte, is retained by the second electrode.

Also, the separator may include a second bag outside the first bag. In this case, the second electrode is housed in the interior of the second bag. Then, in the interior of the second bag, the second electrolyte is retained by the second electrode. Further, the separator includes a first separator surface facing the negative electrode and a second separator surface facing the positive electrode. In the separator, the first separator surface is preferably in contact with the negative electrode. In the separator, it is more preferable that the first separator surface be in contact with the negative electrode and the second separator surface be in contact with the positive electrode.

The separator can transmit monovalent cations. Examples of monovalent cations include alkali metal ions such as lithium ion and sodium ion. In addition, the separator can transmit lead ions, zinc ions, hydroxide ions, and the like. It is preferable that the separator selectively transmit the above-described ions by the electric potential difference between the negative electrode and the positive electrode. In addition, the separator has low permeability for the aqueous solvent and the like contained in the aqueous electrolyte. Therefore, it is preferable that the solvated alkali metal ion cannot pass through the separator. And, in the separator, the solvated alkali metal ion may change to a non-solvated state. In addition, the separator is formed to have an air permeability coefficient of $1.0\times10^{-14}$ m$^2$ or less.

The separator includes a composition layer. The composition layer is at least one of a layer containing particles and a polymeric material, and a solid electrolyte containing layer containing a solid electrolyte. If the composition layer includes particles and a polymeric material, the composition layer may be a mixed layer in which the particles and the polymeric material are mixed. The mixed layer may be, for example, an electrolyte containing layer, such as a solid electrolyte containing layer containing a solid electrolyte as particles. In addition, the separator may be formed only of a composition layer such as a mixed layer. In the separator, the first separator surface facing the negative electrode is formed of the composition layer. In the separator, in addition to the first separator surface, the second separator surface facing the positive electrode may also be formed of the composition layer. In the above-described embodiment and the like, the composition layers 37 (37A, 37B) and 57 (57A, 57B) correspond to the following composition layers.

When the composition layer is a mixed layer (solid electrolyte containing layer) containing solid electrolyte particles and a polymeric material, it is preferable that the solid electrolyte be a main component of the mixed layer. The ratio of the solid electrolyte in the mixed layer is preferably 50% by mass or more, more preferably 60% by mass or more, and still more preferably 75% by mass or more from the viewpoint of increasing the density of the mixed layer. The ratio of the solid electrolyte in the mixed layer is preferably 98% by mass or less, more preferably 94% by mass or less, and still more preferably 92% by mass or less from the viewpoint of enhancing the flexibility of the mixed layer. The ratio in the mixed layer of particles such as solid electrolyte and polymeric material affects the air permeability coefficient of the separator. The ratio of the solid electrolyte in the mixed layer is preferably 50% by mass or more from the viewpoint of setting the air permeability coefficient of the separator to $1.0 \times 10^{-14}$ $m^2$ or less. Also, the ratio of the solid electrolyte in the mixed layer is preferably 60% by mass or more from the viewpoint of setting the air permeability coefficient of the separator to $1.0 \times 10^{-17}$ $m^2$ or less.

The shape of the solid electrolyte particles is not particularly limited, but can be, for example, spherical, elliptical, flat, or fibrous. The average particle diameter of the solid electrolyte particles is preferably 100 μm or less, more preferably 70 μm or less, and still more preferably 50 μm or less from the viewpoint of enhancing alkali metal ion conductivity. The lower limit of the average particle diameter of the solid electrolyte particles is not particularly limited, but in one example, it is 0.05 μm or more.

It is preferable to use an inorganic solid electrolyte as a solid electrolyte of a mixed layer (solid electrolyte containing layer). Examples of inorganic solid electrolytes include oxide-based solid electrolytes and sulfide-based solid electrolytes. A lithium phosphoric acid solid electrolyte having a NASICON type structure can be used as the oxide-based solid electrolytes. The lithium phosphoric acid solid electrolyte of NASICON type structure can be expressed by the general formula $Li_{1+x}M_2(PO_4)_3$ (M is one or two or more selected from the group consisting of Ti, Ge, Sr, Zr, Sn and Al, x is 0≤x≤0.5). As lithium phosphoric acid solid electrolytes of NASICON type structure, LATP ($Li_{1+x}Al_xTi_{2-x}(PO_4)_3$ (x is 0≤x≤0.5)), $Li_{1+x}Al_xZr_{2-x}(PO_4)_3$ (x is 0≤x≤0.5), and $Li_{1+x}Al_xGe_{2-x}(PO_4)_3$ (x is 0≤x≤0.5) and the like are mentioned. In particular, among the lithium phosphoric acid solid electrolytes of the NASICON type structure, it is preferable to use LATP as a solid electrolyte. Since LATP is excellent in water resistance, hydrolysis is less likely to occur in the battery by using LATP as a solid electrolyte.

In addition, as the oxide-based solid electrolytes, amorphous LIPON ($Li_{2.9}PO_{3.3}N_{0.46}$) or LLZ ($Li_7La_3Zr_2O_{12}$) having a garnet-type structure may be used. In addition, a lithium-titanium-containing composite oxide may be used as the oxide-based solid electrolytes. Examples of lithium titanium-containing composite oxides used as a solid electrolyte include lithium titanium oxides having a spinel structure (for example, the general formula $Li_{4+x}Ti_5O_{12}$ (x is −1≤x≤3)). The solid electrolyte used in the mixed layer may be of one type, or two or more types may be mixed and used. Further, as the solid electrolyte, a sodium-containing solid electrolyte may be used. The sodium-containing solid electrolyte is excellent in the ion conductivity of sodium ions. Examples of sodium-containing solid electrolytes include β-alumina, sodium phosphorus sulfide, and sodium phosphorus oxide. The sodium-containing solid electrolyte is preferably in the form of glass-ceramics.

The polymeric material contained in the mixed layer may be present in the gaps between the solid electrolyte particles. The polymeric material enhances the binding performance of the solid electrolyte particles in the mixed layer. The weight average molecular weight of the polymeric material is, for example, 3,000 or more. By making the weight average molecular weight of the polymeric material 3,000 or more, the binding performance of the solid electrolyte can be further enhanced. The weight average molecular weight of the polymeric material is preferably in a range from 3,000 to 5,000,000, more preferably in a range from 5,000 to 2,000,000, and still more preferably in a range from 10,000 to 1,000,000.

From the viewpoint of enhancing the flexibility of the mixed layer, the ratio of the polymeric material in the mixed layer is preferably 1% by mass or more, more preferably 3% by mass or more, and still more preferably 10% by mass or more. The ratio of the polymeric material in the mixed layer is preferably 20% by mass or less, more preferably 10% by mass or less, from the viewpoint of enhancing the conductivity of lithium ions in the mixed layer. From the viewpoint of making the air permeability coefficient of the separator $1.0 \times 10^{-14}$ $m^2$ or less, the ratio of the polymeric material in the mixed layer is preferably 40% by mass or less. Further, from the viewpoint of setting the air permeability coefficient of the separator to $1.0 \times 10^{-17}$ $m^2$ or less, the ratio of the polymeric material in the mixed layer is preferably 40% by mass or less.

The polymeric material contained in the mixed layer may be a polymer consisting of a single monomer unit, a copolymer consisting of a plurality of monomer units, or a mixture of these. The polymeric material includes a monomer unit composed of a hydrocarbon, and the hydrocarbon constituting the monomer unit includes a functional group containing one or two or more elements selected from the group consisting of oxygen (O), sulfur (S), nitrogen (N) and fluorine (F). In the polymeric material, the ratio of the portion composed of monomer units is 70 mol % or more. Hereinafter, the above-described monomer unit composed of a hydrocarbon is referred to as a first monomer unit. In the copolymer, one other than the first monomer unit is referred to as a second monomer unit. The copolymer of the first monomer unit and the second monomer unit may be an alternating copolymer, may be a random copolymer, or may be a block copolymer.

If the ratio of the portion formed of the first monomer unit in the polymeric material is less than 70 mol %, water is likely to permeate in the mixed layer. Therefore, the charge/ discharge efficiency of the battery may be reduced. In the polymeric material, the ratio of the portion constituted by the first monomer unit is preferably 90 mol % or more. The polymeric material is most preferably a polymer having a ratio of 100 mol % of the portion composed of the first monomer unit, that is, only the first monomer unit.

The first monomer unit may be a compound having a functional group including one or two or more elements selected from the group consisting of oxygen, sulfur, nitrogen and fluorine in the side chain, and including the main chain made by a carbon-carbon bonding. The hydrocarbon constituting the first monomer unit may have one or two or more functional groups containing one or more elements selected from the group consisting of oxygen, sulfur, nitrogen and fluorine. The aforementioned functional groups of the first monomer unit enhance the conductivity of the alkali metal ions passing through the mixed layer. Therefore, the hydrocarbon constituting the first monomer unit preferably has a functional group containing at least one element selected from the group consisting of oxygen, sulfur and nitrogen. Accordingly, the conductivity of the alkali metal ion in the mixed layer is further enhanced, and the internal resistance is reduced.

The functional group contained in the first monomer unit is preferably at least one selected from the group consisting of formal group, a butyral group, a carboxymethyl ester group, an acetyl group, a carbonyl group, a hydroxyl group and a fluoro group. The first monomer unit more preferably contains at least one of a carbonyl group and a hydroxyl group as a functional group, and further preferably contains both a carbonyl group and a hydroxyl group. Therefore, the first monomer unit can be represented by the following Formula (3).

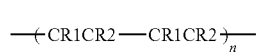

(3)

In Formula (3), R1 is preferably selected from the group consisting of hydrogen (H), an alkyl group, and an amino group. R2 is preferably selected from the group consisting of hydroxyl group (—OH), —OR1, —COOR1, —OCOR1, —OCH(R1)O—, —CN, —N(R1)$_3$, and —SO$_2$R1. Examples of the first monomer unit include at least one or two or more types of elements selected from the group consisting of vinyl formal, vinyl alcohol, vinyl acetate, vinyl acetal, vinyl butyral, acrylic acid and derivatives thereof, methacrylic acid and derivatives thereof, acrylonitrile, acrylamide and derivatives thereof, styrene sulfonic acid, and tetrafluoroethylenes.

The polymeric material preferably contains at least one selected from the group consisting of polyvinyl formal, polyvinyl alcohol, polyvinyl acetal, polyvinyl butyral (PVB), polymethylmethacrylate and polytetrafluoroethylene. An example of a structural formula of a compound that can be used as a polymeric material is shown below.

The structural formula of polyvinyl formal is as the following Formula (4). In Formula (4), it is preferable that a be in a range from 50 to 80, b be in a range from 0 to 5, and c be in a range from 15 to 50.

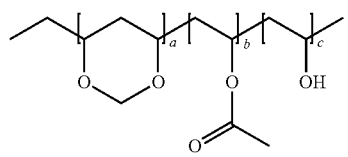

(4)

The structural formula of polyvinyl butyral is as the following Formula (5). In Formula (5), it is preferable that l be in a range from 50 to 80, m be in a range from 0 to 10, and n be in a range from 10 to 50.

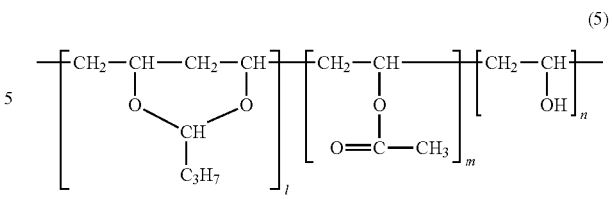

(5)

Moreover, the structural formula of polyvinyl alcohol is as the following Formula (6). In Formula (6), n is preferably in a range from 70 to 20,000.

(6)

The structural formula of polymethylmethacrylate is as represented by the following Formula (7). In Formula (7), n is preferably in a range from 30 to 10,000.

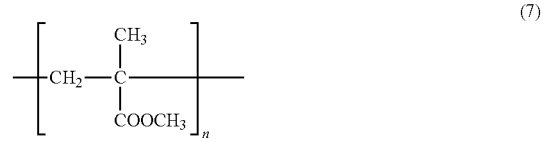

(7)

The second monomer unit is a compound other than the first monomer unit in the polymeric material. Therefore, the second monomer unit does not have a functional group containing one or two or more elements selected from the group consisting of oxygen, sulfur, nitrogen and fluorine, or has this functional group but not a hydrocarbon. Examples of the second monomer unit include ethylene oxide and styrene. As a polymer which consists of a second monomer unit, polyethylene oxide (PEO) and polystyrene (PS) are mentioned, for example.

In addition to the solid electrolyte and the polymeric material, the mixed layer (solid electrolyte containing layer) may contain a plasticizer and an electrolyte salt. The conductivity of the alkali metal ions in the separator is further enhanced by the mixed layer containing an electrolyte salt. As the electrolyte salt, it is preferable to use any of lithium salt, sodium salt and a mixture thereof. As the electrolyte salt, one or two or more kinds can be used. The electrolyte salt contained in the mixed layer may be of the same type as any of the electrolyte salt contained in the above-described negative electrode side electrolyte and positive electrode side electrolyte, and may be of different types from the electrolyte salt contained in the negative electrode side electrolyte and positive electrode side electrolyte.

Examples of the lithium salt contained in the mixed layer, for example, lithium chloride (LiCl), lithium bromide (LiBr), lithium hydroxide (LiOH), lithium sulfate (Li$_2$SO$_4$), lithium nitrate (LiNO$_3$), lithium acetate (CH$_3$COOLi), lithium oxalate (Li$_2$C$_2$O$_4$), lithium carbonate (Li$_2$CO$_3$), lithium bis(trifluoromethanesulfonyl)imide (LiTFSI; LiN (SO$_2$CF$_3$)$_2$), lithium bis(fluorosulfonyl)imide (LiFSI; LiN (SO$_2$F)$_2$) and lithium bis oxalate borate (LiBOB: LiB [(OCO)$_2$]$_2$) or the like can be used. Moreover, sodium chloride (NaCl), sodium sulfate (Na$_2$SO$_4$), sodium hydroxide (NaOH), sodium nitrate (NaNO$_3$), sodium trifluoromethanesulfonylamide (NaTFSA) etc. can be used as a sodium salt.

Also, the density of the mixed layer is preferably high. The increase in density of the mixed layer makes it difficult for the aqueous solvent contained in the aqueous electrolyte to permeate the mixed layer. The density of the mixed layer is 2.4 g/cm$^3$ or more in one example and 2.5 g/cm$^3$ or more in another example when LATP (Li$_{1+x}$Al$_x$Ti$_{2-x}$(PO$_4$)$_3$) particles are used as the solid electrolyte. In the case where LATP particles are used as the solid electrolyte, the density of the mixed layer is 2.8 g/cm$^3$ or less in one example and 2.7 g/cm$^3$ or less in another example.

In addition, the mixed layer preferably has flexibility. The flexibility of the mixed layer makes it difficult for defects such as cracks to occur in the mixed layer. Therefore, by using the separator provided with the mixed layer having flexibility, in the battery, the negative electrode side and the positive electrode side can be more appropriately separated with respect to each other, and the electrolysis of water can be further suppressed. The flexibility of the mixed layer can be adjusted, for example, by changing the type and compounded amount of the polymeric material.

Whether the mixed layer has flexibility can be determined, for example, by conducting a flexibility test on the mixed layer. When the flexibility test is to be conducted, first, the secondary battery is disassembled, and the mixed layer (solid electrolyte containing layer) is taken out. Then, the mixed layer is cut to obtain a test piece. The shape of the test piece is, for example, a strip having a length of 2 cm in the lateral direction and a length of 10 cm in the depth direction. Then, the test piece is immersed in water at a temperature of 23° C. for 24 hours and then dried. And about a test piece after drying, a flexibility test is done according to a method specified in Japanese Industrial Standard JIS C 5016: 1994 "flexible printed wiring board test method". In the bendability test, the bend radius is, for example, 3 mm, and the number of times of bend is 100 times. The test piece after the flexibility test is visually observed, and it is judged to have flexibility if no cracking, breakage or the like occurs.

The layer thickness of the mixed layer is preferably 100 µm or less, more preferably 50 µm or less, from the viewpoint of increasing the energy density of the battery (secondary battery). In a mixed layer containing a polymeric material, sufficient strength can be obtained even if the layer thickness is reduced. Further, the layer thickness of the mixed layer is preferably 1 µm or more from the viewpoint of enhancing mechanical strength.

When the composition layer is a mixed layer containing particles and a polymeric material, aluminum oxide or silica may be contained as particles in the mixed layer instead of the solid electrolyte. In this case, aluminum oxide or silica is mixed with the above-described polymeric material in the mixed layer. In the mixed layer, particles of aluminum oxide and silica may be mixed with particles of the solid electrolyte and the polymeric material.

Also, the composition layer may be formed of a solid electrolyte plate instead of the above-described mixed layer and the like. In this case, the composition layer is a solid electrolyte containing layer formed of a plate of a solid electrolyte. The above-described polymeric material is not included in the solid electrolyte plate. The solid electrolyte plate may be, for example, a ceramic plate of LATP. Furthermore, in the configuration in which the solid electrolyte plate is provided in the separator, the air permeability coefficient of the separator is 0 m$^2$ or almost 0 m$^2$.

The separator may also include a supporter in addition to the composition layer. In the above-described embodiment and the like, the supporters 38 and 58 correspond to the following supporters. In the separator, the aforementioned composition layer or the like is laminated on one side or both sides of the supporter. That is, the composition layer or the like is laminated on at least one of the pair of main surfaces of the supporter. The strength of the separator can further be enhanced by providing a supporter in the separator and making the separator into laminated body.

The supporter may be a porous layer. In this case, in the supporter, the aqueous solvent and the like contained in the aqueous electrolyte are more easily permeated as compared to the composition layer and the like. When the supporter is a porous layer, for example, a porous film or non-woven fabric can be used as the supporter. As a material of the porous film or non-woven fabric, for example, any of polyethylene (PE), polypropylene (PP), cellulose and polyvinylidene fluoride (PVdF) can be used.

In addition, when a separator is a laminated body provided with a composition layer and a supporter, it is preferable that a composition layer be laminated on the side of the supporter where a negative electrode is located. And it is preferable that the first separator surface which opposes a negative electrode in a separator be formed of a composition layer. And it is more preferable that the composition layer and the negative electrode be in contact with each other. By disposing the composition layer as described above, the above-described decomposition of water is further suppressed. When the separator is a laminated body including a composition layer and a supporter, the composition layer is more preferably laminated on the supporter on both the side where the negative electrode is located and the side where the positive electrode is located. In this case, in the separator, in addition to the first separator surface facing the negative electrode, it is preferable that the second separator surface facing the positive electrode be also formed of the composition layer. It is preferable that a composition layer and a negative electrode be in contact with each other and that a composition layer and a positive electrode are in contact. By disposing the composition layer as described above, the above-described decomposition of water is further suppressed.

When the composition layer is a mixed layer in which solid electrolyte particles and a polymeric material are mixed, the mixed layer is formed, for example, by the following method. In the formation of the mixed layer, first, solid electrolyte particles are mixed with a polymeric material and a solvent to obtain a mixed solution. From the viewpoint of setting the air permeability coefficient of the separator to $1.0 \times 10^{-14}$ m$^2$ or less, it is preferable, in the mixed solution, to make the solid electrolyte particles 60% by mass or more and the polymeric material 40% by mass or less. An electrolyte salt may be optionally added to the mixed solution. In this case, from the viewpoint of setting the air permeability coefficient of the separator to $1.0 \times 10^{-14}$ m$^2$ or less in the mixed solution, it is preferable to set the solid electrolyte particles to 60% by mass or more, the polymeric material to 20% by mass or less, and the electrolyte salt to 20% by mass. Examples of the solvent of the mixed solution include N-methyl pyrrolidone (NMP) and the like. Then, the mixed solution is sufficiently stirred by using a disperser such as a ball mill to obtain a slurry. Then, the slurry is applied onto the surface of the supporter by, for example, a doctor blade method. Then, the coated slurry is dried to form a mixed layer. Then, the mixed layer and the supporter are pressed to form a sheet similar to the aforementioned sheets 41A and 41B, for example, and the like. The air permeability coefficient of the separator can be adjusted by the pressing pressure and the pressing temperature in the press work of the mixed layer and the supporter. For example, when either one of the pressing pressure or the pressing temperature is higher, the air permeability coefficient becomes smaller.

In addition, each of the first bag and the second bag of the separator is formed of one or more sheets by any of the aforementioned methods of manufacturing (for example, the method shown in one example of FIGS. 5A and 5B). Each of the sheets forming the bag includes a composition layer or the like as described above. In the bag, the fusion bonded portion of the sheet is heat-bonded via a resin having fusion bonding properties such as polyethylene.

In addition, when the composition layer is a mixed layer containing solid electrolyte particles and a polymeric material, the charge/discharge efficiency of the secondary battery can be enhanced by using a separator including the mixed layer. For example, in a secondary battery using a lithium ion as an alkali metal ion, part of the lithium ion moves from the positive electrode side to the negative electrode side via the separator during battery charging. Here, most of the lithium ions in the positive electrode side electrolyte (aqueous electrolyte) are in a solvated state. Further, in the mixed layer of the separator, the solid electrolyte and the polymeric material are mixed substantially uniformly throughout the layer. Therefore, when charging is started, part of the solvated lithium ion on the positive electrode side contacts each of the solid electrolyte and the polymeric material on the main surface on the positive electrode side of the separator, that is, on the second separator surface. Then, the solvated lithium ion in contact with the solid electrolyte is desolvated to change to an unsolvated state. Then, only lithium ions intrude into the separator. A part of the lithium ion which has penetrated into the separator moves to the negative electrode side via the solid electrolyte particles in the separator and reaches the negative electrode.

Meanwhile, part of the solvated lithium ions in contact with the polymeric material on the second separator surface may penetrate into the polymeric material. Part of the solvated lithium ions in the polymeric material migrate as solvated lithium ions in the separator until they come in contact with the solid electrolyte particles. Then, part of the solvated lithium ions in the polymeric material changes to an unsolvated state as described above when it contacts the solid electrolyte particles. Then, only lithium ions move to the negative electrode side.

Note that at the time of discharge of the secondary battery, lithium ions move in the opposite direction to that at the time of charge. That is, at the time of discharge, at least a part of lithium ions on the negative electrode side move to the positive electrode side. Also in this case, when part of the solvated lithium ions comes into contact with the solid electrolyte particles in the separator or the like, it changes to a non-solvated state as described above. Then, only lithium ions move to the positive electrode side.

The polymeric material contained in the mixed layer contains the first monomer unit described above. Then, the above-described functional group which is included in the first monomer unit promotes migration of the lithium ion in a mixed layer. Therefore, the conductivity of the lithium ions is enhanced by using the separator provided with the mixed layer containing the above-described polymeric material. In addition, the mixed layer containing the above-described polymeric material has low permeability for the aqueous solvent. Therefore, by using the separator provided with the mixed layer, the solvated lithium ion and the aqueous solvent of the aqueous electrolyte hardly permeate the inside of the separator, and hardly move to the negative electrode side. Further, by using the separator provided with the above-described mixed layer, since the separator has low permeability for the aqueous solvent and the like, the negative electrode side electrolyte and the positive electrode side electrolyte can hardly be mixed. Therefore, even if charge and discharge are repeated, the pH of the negative electrode side electrolyte is maintained in a high state. From the above viewpoint, the secondary battery provided with the separator including the above-described mixed layer can realize excellent charge/discharge efficiency.

5) Container Member

A housing space is defined in the interior of the container member. In the housing space, a separator in which the first electrode and the first electrolyte are housed in the interior of the first bag is housed. Further, a second electrode is disposed outside the first bag in the housing space, and the second electrolyte is retained by the second electrode outside the first bag in the housing space. In addition, if the separator is provided with the first bag and the second bag, the second bag is formed outside the first bag in the housing space. In this case, the second electrolyte is retained by the second electrode in the interior of the second bag.

As the container member, any of a laminated film bag-like container, a metal container and a resin container can be used. Examples of the shape of the container member include a flat type, a square type, a cylindrical type, a coin type, a button type, a sheet type, and a laminated type.

The metal container is preferably made of, for example, at least one metal selected from the group consisting of iron, aluminum, zinc and titanium, or an alloy of these metals. Specifically, examples of alloys include stainless steel and aluminum alloys. The resin container is formed of, for example, any of polyethylene and polypropylene. The thickness of each of the metal container and the resin container is preferably 0.5 mm or less, and more preferably 0.3 mm or less.

As the laminate film, for example, a multilayer film can be used, and the multilayer film can include a plurality of resin layers and a metal layer disposed between the resin layers. In this case, the metal layer is preferably an aluminum foil or an aluminum alloy foil from the viewpoint of weight reduction. For the resin layer, for example, polymeric materials such as polypropylene (PP), polyethylene (PE), nylon, and polyethylene terephthalate (PET) can be used. The laminate film is formed into the shape of the container member, for example, by sealing by heat-bonding. The thickness of the laminate film is preferably 0.5 mm or less, more preferably 0.2 mm or less.

In the battery 1 of the above-described embodiment and so forth, the separator 8 includes the bag 26, and the first electrode, which is one of the negative electrode 6 and the positive electrode 7, is housed in the interior of the bag 26. The second electrode, which is the other of the negative electrode 6 and the positive electrode 7, is disposed outside the bag 26. In the battery 1 according to the embodiment and the like, the electrolyte 31 is retained by the first electrode in the interior of the bag 26, and the electrolyte 32 is retained by the second electrode outside the bag 26. Therefore, the electrolytes 31 and 32 are isolated from each other by the bag 26. With such a configuration, in the embodiments and so forth, it becomes possible to use different electrolytes from each other as the electrolytes 31 and 32, and it becomes possible to use electrolytes different from each other as the negative electrode side electrolyte and the positive electrode side electrolyte.

For example, by using an electrolyte having high oxidation resistance as the positive electrode side electrolyte and by using an electrolyte having high reduction resistance as the negative electrode side electrolyte, the side reaction of the electrolyte hardly occurs. When an aqueous electrolysis solution containing an aqueous solvent is used as the electrolyte, electrolysis of water may occur as a side reaction of the electrolyte. In the electrolysis of water, the chemical reaction shown in Equation (8) occurs at the negative electrode, and the chemical reaction shown by Equation (9) occurs at the positive electrode.

$$2H^+ + 2e^- \Rightarrow H_2 \qquad (8)$$

$$2O^{2-} \Rightarrow O_2 + 2e^- \qquad (9)$$

Moreover, in the oxidation-reduction reaction of electrolytes, such as electrolysis of water, the electric potential window in which decomposition by oxidation reaction is not generated, and the electric potential window in which decomposition produce by reduction reaction is not generated. For example, in the electrolysis of water, from the Nernst Equation, when the relationship represented by Equation (10) is established with respect to the potential E1 of the negative electrode, hydrogen is likely to be generated at the negative electrode due to the reduction reaction. Then, when the relationship represented by Equation (11) is established with respect to the potential E2 of the positive electrode, oxygen is likely to be generated at the positive electrode due to the oxidation reaction. Here, in Expression (10) and Expression (11), pH shows pH of an electrolyte (aqueous electrolysis solution).

$$E1 < -0.059 \times pH \qquad (10)$$

$$E2 > 1.23 - 0.059 \times pH \qquad (11)$$

From Expression (10) and Expression (11), when the electrolyte is not separated on the negative electrode side and the positive electrode side, if the voltage between the negative electrode and the positive electrode becomes larger than 1.23 V, the electrolysis of water is likely to occur thermodynamically regardless of the pH of the electrolyte. In the above-described embodiment and so forth, the negative electrode side electrolyte and the positive electrode side electrolyte are separated from each other by the separator 8. Therefore, it becomes possible to use the electrolytes different from each other in pH as the positive electrode side electrolyte and the negative electrode side electrolyte. Here, by using an electrolyte having a pH smaller than that of the negative electrode side electrolyte as the positive electrode side electrolyte, the electrolysis of water hardly occurs even when the voltage between the negative electrode and the positive electrode becomes larger than 1.23 V. For example, it seems that when an electrolyte having a pH of 1 is used as the positive electrode side electrolyte and an electrolyte having a pH of 14 is used as the negative electrode electrolyte, electrolysis of water is less likely to take place unless the voltage between the negative electrode and the positive electrode rises to about 2 V.

As described above, in the embodiment and so forth, by using an electrolyte having high oxidation resistance as the positive electrode side electrolyte and by using an electrolyte having high reduction resistance as the negative electrode side electrolyte, side reactions of the electrolyte such as electrolysis of water is less likely to occur. Therefore, in the battery of the embodiment, the side reaction of the electrolyte is stably suppressed. By stably suppressing the side reaction of the electrolyte, charge/discharge efficiency (Coulomb efficiency), storage performance and cycle characteristics are improved. Therefore, in the embodiment, it is possible to provide a battery having a high energy density and superior other characteristics such as charge/discharge efficiency, storage performance and cycle characteristics.

Even when a non-aqueous electrolyte containing an organic solvent is used as the electrolytes 31 and 32, the negative electrode side electrolyte and the positive electrode side electrolyte are separated from each other by the separator 8, and different electrolytes are used as the negative electrode side electrolyte and the positive electrode side electrolyte, so that it is possible to suppress the side reaction of the electrolyte. For example, in a lithium ion battery in which a non-aqueous electrolyte solution containing an organic solvent is used as an electrolyte, side reactions shown below may occur. For example, in a lithium ion battery in which a non-aqueous electrolyte solution is used, an irreversible exchange reaction of the organic solvent represented by Equation (12) can occur as a side reaction.

$$2EMC \Rightarrow DEC + DMC \qquad (12)$$

When lithium cobaltite, which is a type of lithium cobalt composite oxide, is used as a positive electrode active material, a reaction shown in Equation (13) occurs as a side reaction corresponding to the change in the crystal structure of the positive electrode active material. Oxygen is generated by the reaction shown in Equation (13).

$$3CoO_2 \Rightarrow Co_3O_4 + O_2\uparrow \qquad (13)$$

Moreover, the oxidative decomposition of the organic solvent shown to Equation (14) may occur as a side reaction by the oxygen generated at the positive electrode. The side reaction represented by Equation (14) generates carbon dioxide and water. In Equation (14), R represents a hydrocarbon group.

$$ROCO_2R + 3O_2 \Rightarrow 3CO_2\uparrow + 3H_2O \qquad (14)$$

In the negative electrode, reductive decomposition of the organic solvent represented by Equation (15) and Equation (16) may occur as a side reaction. Side reactions such as Equation (15) and Equation (16) may generate a large amount of various types of hydrocarbon. In Equation (15) and Equation (16), R shows a hydrocarbon group.

$$ROCO_2R + e^- + Li^+ + 1/2H_2 \Rightarrow ROCO_2Li + Alkyl\uparrow \qquad (15)$$

$$ROCO_2R + 2e^- + 2Li^+ + H_2 \Rightarrow Li_2CO_3 + R - R\uparrow \qquad (16)$$

In a lithium ion battery in which a non-aqueous electrolyte solution is used as an electrolyte, Solid Electrolyte Interphase (SEI) is formed on the surfaces of the negative electrode and the positive electrode by the reaction of the surfaces of the negative electrode active material and the positive electrode active material with the electrolysis solution. When the SEI is excessively formed, the respective resistances of the negative electrode and the positive electrode increase. In the embodiment and so forth, it is possible to prevent excessive formation of SEI by using different electrolytes for the negative electrode side electrolyte and the positive electrode side electrolyte.

In the embodiment and so forth, as described above, the side reaction of the electrolyte can be stably suppressed even in the battery using the non-aqueous electrolyte. By stably suppressing the side reaction of the electrolyte, charge/discharge efficiency (Coulomb efficiency), storage performance and cycle characteristics are improved. Therefore, in the embodiment, it is possible to provide a battery having a high energy density and superior other characteristics such as charge/discharge efficiency, storage performance and cycle characteristics.

In the embodiment, for example, the air permeability coefficient of the separator 8 is $1.0 \times 10^{-14}$ m$^2$ or less. Therefore, the separator 8 has low permeability for the aqueous solvent and the like contained in the electrolytes 31 and 32. Since the separator 8 has a low permeability for the aqueous solvent and the like, the electrolytes 31 and 32 become difficult to mix in the housing space 5. Accordingly, when electrolytes having different pH values with respect to each other are used for the negative electrode side electrolyte and the positive electrode side electrolyte as described above, the pH of the negative electrode side electrolyte is maintained in a high state and the pH of the positive electrode side electrolyte is maintained in a low state even if charge and discharge are repeated. Accordingly, even if charge and discharge are repeated, side reactions such as electrolysis of water are appropriately suppressed.

In the embodiment, for example, the smaller one of the osmotic pressures of the electrolytes 31 and 32 is in a range from 10% to 100% with respect to the other large one of the electrolytes 31 and 32. Since the osmotic pressure of the electrolytes 31 and 32 is as described above, it is difficult for the electrolytes 31 and 32 to be mixed in the housing space 5. Therefore, when electrolytes having different pH values with respect to each other are used for the negative electrode side electrolyte and the positive electrode side electrolyte, the pH of the negative electrode side electrolyte is maintained in a high state, and the pH of the positive electrode side electrolyte is maintained in a low state. Therefore, side reactions such as electrolysis of water are suppressed more appropriately. When the smaller one of the osmotic pressures of the electrolytes 31 and 32 is 50% or more of the larger one of the electrolytes 31 and 32, the electrolytes 31 and 32 become more likely to mix, and the side reaction is more appropriately suppressed.

In the embodiment, for example, it is preferable that the first separator surface 35 facing the negative electrode 6 in the separator 8 be formed of a composition layer which is less likely to transmit an aqueous solvent or the like. Accordingly, in the negative electrode 6, generation and the like of hydrogen due to reductive decomposition of water are further suppressed, and side reactions are further suppressed. And, in the separator 8 of the embodiment, for example, it is preferable that the second separator surface 36 facing the positive electrode 7 be also formed of the composition layer in addition to the first separator surface 35. Accordingly, in the positive electrode 7, the generation of oxygen or the like by the oxidative decomposition of water is further suppressed, and the side reaction is further suppressed.

Further, in the configurations of the third embodiment and fourth embodiment, for example, a plurality of first electrodes are housed and the electrolyte (first electrolyte) 31 is housed in the interior of one bag 26. With such a configuration, it is possible to increase the number of electrolytes (electrolysis solution) 31 housed in the interior of the bag 26. By increasing the amount of electrolyte 31 in the interior of the bag 26, the occurrence of dry-up (liquid wither) in each of the first electrodes is effectively prevented.

When dry-up occurs in the first electrode, the conduction path of an alkali metal ion such as the lithium ion is interrupted at the site where the dry-up occurs, and a site that cannot be used as a conduction path is generated in the first electrode. Therefore, the discharge capacity of the battery is reduced. In addition, when dry-up occurs in the first electrode, current concentrates to a portion where dry-up does not occur. Therefore, the temperature rises locally in the battery, and the deterioration progresses even in the portion (the usable portion) which is not dried up in the first electrode. Accordingly, this degrades the cycle characteristics. In the configurations of the third embodiment and fourth embodiment, the dry-up the first electrode is effectively prevented, so that deterioration of the battery is further effectively prevented, and the cycle characteristics of the battery are further improved.

Further, in the configuration of the fourth embodiment, for example, a plurality of second electrodes are housed in the interior of one bag 46, and the electrolyte (second electrolyte) 32 is housed. With such a configuration, it is possible to increase the number of electrolytes (electrolysis solution) 32 housed in the interior of the bag 46. By increasing the amount of electrolyte 32 in the interior of the bag 46, the occurrence of dry up (liquid withering) can be effectively prevented also in each of the second electrodes. By effectively preventing dry-up at the second electrode, deterioration of the battery is further effectively prevented, and the cycle characteristics of the battery are further improved.

[Battery Pack]

Next, a battery pack in which the battery of the above-described embodiment and the like is used will be described. The battery pack includes a battery module. The battery module includes plural of the battery of the above-described embodiment and the like. In the battery module, a plurality of the batteries are electrically connected in at least one of series and parallel. In addition, in the battery pack, only one battery of the above-described embodiment and the like may be provided instead of the battery module.

In the battery module provided in the battery pack, each of the batteries is electrically connected to another battery. In the battery of the above embodiment and the like, the positive electrode terminal and the negative electrode terminal are provided as the electrode terminals. In the battery module, the electrode terminal of each of the batteries is connected to a corresponding electrode terminal of another battery via a connection member such as a metal bus bar. Examples of the metal forming the bus bar include aluminum, nickel, and copper. Note that two batteries are electrically connected in parallel by connecting the positive electrode terminals and connecting the negative electrode terminals between the two batteries. In addition, two batteries are electrically connected in series by connecting the positive electrode terminal of one of the two batteries to the negative electrode terminal of the other of the two batteries.

The battery pack may further include an energizing external terminal. The external terminal is connected to an external device of the battery pack. The external terminal is used to output a current from the battery module to the outside and/or to input a current to the battery module. When the battery module is used as the electric power source, a current is supplied to the outside of the battery pack through the energizing external terminal. When the battery module is charged, a charge current is supplied to the battery module through the energizing external terminal. Examples of the charge current of the battery module include a regenerative energy due to the mechanical power of an automobile or the like.

The battery pack can have current detection function and voltage detection function, and includes a temperature detector, and the like. In the battery pack, the input current to the battery module and the output current from the battery module may be detected, or the current flowing through any one of the batteries forming the battery module may be detected. In addition, in the battery pack, the voltage applied to the entire battery module may be detected, or the voltage applied to any one of the batteries forming the battery module may be detected. Furthermore, the temperature detector detects the temperature of each of the batteries forming the battery module.

The battery pack may further include a protective circuit. The protective circuit has a function capable of interrupting the electrical connection between the battery module and the external terminal. In the protective circuit, a relay, a fuse, or the like is provided as a connection blocking unit.

In addition, the protective circuit has a function of controlling the charge and discharge of the battery module. The protective circuit controls the charge and discharge of the battery module based on the detection result of any one of the current, the voltage, the temperature, and the like described above. Therefore, in the battery module, the charge and discharge of each of the batteries is controlled. For example, the protective circuit blocks the electrical connection between the battery module and the external terminal based on the detection of the overcurrent of the battery module. Therefore, the input of the current to the battery module and the output of the current from the battery module are stopped. In certain embodiment, a circuit formed in a device using the battery pack (battery module) as the electric power supply may be used as the protective circuit.

FIGS. 18 and 19 show an example of a battery pack using the battery of the above-described embodiment and the like. FIG. 18 is an exploded perspective view of a battery pack 70. FIG. 19 is a view showing a circuit configuration of the battery pack 70 of FIG. 18.

In one example of FIGS. 18 and 19, the battery pack includes the battery module 80, and the battery module 80 includes a plural of the battery 1 of the above-described embodiments. In the battery module 80, a plurality of batteries 1 are stacked, and the stacked batteries 1 are fastened with an adhesive tape 94 or the like. In the battery module 80, each of the batteries 1 is electrically connected to the corresponding other battery 1 via the above-described electrode terminals (positive electrode terminal and negative electrode terminal). In one example of FIGS. 18 and 19, in the battery module 80, the plurality of batteries 1 are connected in series.

In the battery pack 70, a printed wiring board 84 is disposed to face the battery module 80. A thermistor 101 as a temperature detector, a protective circuit 100, and an energizing external terminal 102 are mounted on the printed wiring board 84. An insulating plate (not shown) is preferably attached to the surface of the printed wiring board 84 which faces the battery module 80. This prevents unnecessary connection between an electric path on the printed wiring board 84 and the wiring of the battery module 80.

In the battery pack 70, a positive electrode lead 92 and a negative electrode lead 93 are connected to the battery module 80. In one embodiment, one end of the positive electrode lead 92 is connected to the positive electrode terminal in one of the batteries 1 forming the battery module 80. The other end of the positive electrode lead 92 is electrically connected to a positive electrode connector 95 of the printed wiring board 84. In addition, one end of the negative electrode lead 93 is connected to the negative electrode terminal in one of the batteries 1 forming the battery module 80, which is different from the battery 1 to which the positive electrode lead 92 is connected. The other end of the negative electrode lead 93 is electrically connected to a negative electrode connector 96 of the printed wiring board 84. The positive electrode connector 95 is connected to the protective circuit 100 via a wiring 95A formed on the printed wiring board 84, and the negative electrode connector 96 is connected to the protective circuit 100 via a wiring 96A formed on the printed wiring board 84.

In the battery module 80 of the battery pack 70, a protective sheet 83 is disposed on each of three side surfaces excluding a side surface facing the printed wiring board 84. The protective sheet 83 is formed of rubber or resin. The battery module 80 is stored in a housing container 81 together with the protective sheet 82 and the printed wiring board 84. The battery module 80 is located in a space surrounded by the protective sheets 83 and the printed wiring board 84. A lid 82 is attached to the upper surface of the housing container 81.

The thermistor 101 detects the temperature of each of the plurality of batteries 1 which constitutes the battery module 80. The thermistor 101 outputs a detection signal of the temperature to the protective circuit 100.

In addition, in the battery pack 70, the input current to the battery module 80 and the output current from the battery module 80 are detected. In addition, in the battery pack 70, the voltage of each of the batteries 1 is detected in the battery module 80. In the battery pack 70, battery module 80 is connected to the protective circuit 100 via a wiring 85. A detection signal related to a current a detection signal related to a voltage is output to the protective circuit 100 via the wiring 85.

In certain Example, in place of detecting the voltage of each of the batteries 1, a positive electrode electric potential or a negative electrode electric potential is detected for each of the batteries 1 constituting the battery module 80. In this case, a lithium electrode or the like as a reference electrode is provided in the battery module 80. With reference to an electric potential at the reference electrode, a positive electrode electric potential or a negative electrode electric potential of each of the batteries 1 is detected.

The protective circuit 100 may determine whether or not the battery module 80 satisfies a predetermined condition based on each of the detection results of the temperature, the current, and the voltage. For example, when the detected temperature of the thermistor 101 is equal to or higher than a predetermined temperature, the protective circuit 100 determines that the battery module 80 satisfies a predetermined condition. When any of over-charge, over-discharge, and over-current or the like is detected in the battery module 80, the protective circuit 100 determines that the battery module 80 satisfies a predetermined condition.

In the battery pack 70, the energizing external terminal 102 is provided. The protective circuit 100 can be connected to the external terminal 102 via a plus wiring 103A and a minus wiring 103B. When the protective circuit 100 determines that the battery module 80 satisfies the above-described predetermined condition, the protective circuit 100 can cut off conduction between the protective circuit 100 and the energizing external terminal 102. By cutting off the conduction between the protective circuit 100 and the energizing external terminal 102, the output of the current from the battery module 80 to the outside and the input of the current to the battery module 80 are stopped. This effectively prevents over-current or the like from continuously occurring in the battery module 80.

Instead of the adhesive tape 94, a heat shrinkable tape may be used for fixing the battery module 80. In this case, the protective sheet 83 is disposed on both sides of the battery module 80 along the long side direction, and the heat shrinkable tape is caused to circulate around the battery module 80. Therefore, the heat shrinkable tape is thermally shrunk to bind the battery module 80.

In addition, in the examples of FIGS. 17 and 18, the batteries 1 are connected in series to each other in the battery module 80, but the batteries may be connected in parallel to each other in the battery module. In addition, in the battery, module, both the series connection in which the batteries are connected in series and the parallel connection in which the batteries are connected in parallel may be formed. In addition, plural of the battery pack may be formed, and the battery modules of the battery packs may be electrically connected in series and/or in parallel.

The batteries of the above-described embodiment, for example, are used for the above-described battery pack. The battery of the embodiment has a high energy density and is also excellent in other characteristics such as charge/discharge efficiency, storage performance and cycle characteristics. Therefore, by using the battery of the embodiment, a battery pack having high energy density and excellent in other characteristics such as charge/discharge efficiency, storage performance and cycle characteristics is provided.

[Applications of Battery Pack]

The configuration or the like of the battery pack described above is appropriately changed depending on the application. The application of the battery pack is preferably an apparatus or the like which is required to be charged and discharged with a large current. Specific examples of the application of the battery pack include electric power supplies for digital cameras, vehicle-installed batteries, and stationary batteries. In this case, examples of the vehicle on which the battery pack including the battery module is mounted include two- or four-wheel hybrid electric automobiles, two- or four-wheel electric automobiles, assisted bicycles, and railway vehicles.

As described above, the battery pack provided with the battery of the embodiment described above has a high energy density, and also has excellent other characteristics such as charge/discharge efficiency (Coulombic efficiency) and storage performance. Therefore, the battery pack (battery module) is preferably used as a starter power supply for vehicles as a substitute power supply for lead batteries, and is also suitable as an on-vehicle power supply mounted on a hybrid vehicle and a stationary power supply.

(Vehicle)

FIG. 20 is a diagram showing an application example to a vehicle 110 as a first usage example of the above-described battery pack 70. In one example shown in FIG. 20, the vehicle 110 includes a vehicle body 111 and a battery pack 750. In one example shown in FIG. 20, the vehicle 110 is a four-wheeled automobile. The vehicle 110 may include a plurality of battery packs 70 mounted thereon.

In one example of FIG. 20, the battery pack 70 is mounted in an engine room located in a front part of the vehicle body ill. The battery pack 70 may be mounted, for example, a behind part of the vehicle body 111 or below a seat. As described above, the battery pack 70 can be used as an electric power supply for the vehicle 110. The battery pack 70 can recover the regenerative energy of the mechanical power of the vehicle 110.

(Stationary Power Supply)

FIG. 21 is a diagram showing an application example to stationary power supplies 122, 133 as a second usage example of the above-described battery packs 70 (70A, 70B). In one example shown in FIG. 21, a system 120 is shown, which uses the stationary power supplies 122, 133. The system 120 includes an electric power plant 121, the stationary power supply 122, a customer side electric power system 123, and an energy management system (EMS) 125. Also, an electric power network 126 and a communication network 127 are formed in the system 120, and the electric power plant 121, the stationary power supply 122, the customer side electric power system 123 and the EMS 125 are connected via the electric power network 126 and the communication network 127. The EMS 125 performs control to stabilize the entire system 120 by utilizing the electric power network 126 and the communication network 127.

The electric power plant 121 generates a large amount of electric power from fuel sources such as thermal power or nuclear power. Electric power is supplied from the electric power plant 121 through the electric power network 126 and the like. In addition, the battery pack 70A is installed in the stationary power supply 122. The battery pack 70A can store electric power and the like supplied from the electric power plant 121. In addition, the stationary power supply 122 can supply the electric power stored in the battery pack 70A through the electric power network 126 and the like. The system 120 is provided with an electric power converter 128. The electric power converter 128 includes a converter, an inverter, a transformer and the like. Thus, the electric power converter 128 can perform conversion between direct current (DC) and alternate current (AC), conversion between alternate currents of frequencies different from each other, voltage transformation (step-up and step-down) and the like. Therefore, the electric power converter 128 can convert electric power from the electric power plant 121 into electric power that can be stored in the battery pack 70A.

The customer side electric power system 123 includes an electric power system for factories, an electric power system for buildings, an electric power system for home use and the like. The customer side electric power system 123 includes a customer side EMS 131, an electric power converter 132, and the stationary power supply 133. The battery pack 70B is installed in the stationary power supply 133. The customer side EMS 131 performs control to stabilize the customer side electric power system 123.

Electric power from the electric power plant 121 and electric power from the battery pack 70A are supplied to the customer side electric power system 123 through the electric power network 126. The battery pack 70B can store electric power supplied to the customer side electric power system 123. Similarly to the electric power converter 128, the electric power converter 132 includes a converter, an inverter, a transformer and the like. Thus, the electric power converter 132 can perform conversion between direct current and alternate current, conversion between alternate currents of frequencies different from each other, voltage transformation (step-up and step-down) and the like. Therefore, the electric power converter 132 can convert electric power supplied to the customer side electric power system 123 into electric power that can be stored in the battery pack 70B.

Note that the electric power stored in the battery pack 70B can be used, for example, for charging a vehicle such as an electric vehicle. Also, the system 120 may be provided with a natural energy source. In such a case, the natural energy source generates electric power by natural energy such as wind power and solar light. In addition to the electric power plant 121, electric power is also supplied from the natural energy source through the electric power network 126.

Verification on Embodiment

In addition, verification related to the above-described embodiment was performed. The following describes the verification performed. In the verification, batteries of Examples 1 to 13 and Comparative Examples 1 to 4 below were produced. Then, tests were conducted on the batteries of Examples 1 to 13 and Comparative Examples 1 to 4. Test conditions and test results of Examples 1 to 13 and Comparative Examples 1 to 4 will be described below with reference to Tables 1 and 2.

In forming the negative electrode active material-containing layer, $Li_4Ti_5O_{12}$ having an average secondary particle diameter (diameter) of 15 μm was used as a negative electrode active material, graphite powder was used as an electro-conductive agent, and polyacrylimide (PAI) was used as a binder. Then, 80% by weight of the negative electrode active material, 10% by weight of the electro-

TABLE 1

| | | Electrolytes | | | | |
|---|---|---|---|---|---|---|
| | | Solute | | Osmotic pressure | | |
| | Electrode group | Negative Electrode Side | Positive Electrode Side | Negative Electrode side | Positive Electrode Side | Osmotic pressure ratio |
| Example 1 | Structure γ1 | 12M LiCl + 1M LiOH | 12M LiCl | 26RT | 24RT | 92% |
| Example 2 | Structure γ1 | 12M LiCl + 1M LiOH | 12M LiCl | 26RT | 24RT | 92% |
| Example 3 | Structure γ1 | 12M LiCl + 1M LiOH | 12M LiCl | 26RT | 24RT | 92% |
| Example 4 | Structure γ1 | 12M LiCl + 1M LiOH | 12M LiCl | 26RT | 24RT | 92% |
| Example 5 | Structure γ1 | 12M LiCl + 1M LiOH | 12M LiCl | 26RT | 24RT | 92% |
| Example 6 | Structure γ1 | 12M LiCl + 1M LiOH | 12M LiCl | 26RT | 24RT | 92% |
| Example 7 | Structure γ2 | 12M LiCl + 1M LiOH | 12M LiCl | 26RT | 24RT | 92% |
| Example 8 | Structure γ3 | 12M LiCl + 1M LiOH | 12M LiCl | 26RT | 24RT | 92% |
| Example 9 | Structure γ4 | 12M LiCl + 1M LiOH | 12M LiCl | 26RT | 24RT | 92% |
| Example 10 | Structure γ1 | 12M LiCl + 1M LiOH | 13M LiCl | 26RT | 26RT | 100% |
| Example 11 | Structure γ1 | 12M LiCl + 1M LiOH | 6.5M LiCl | 26RT | 13RT | 50% |
| Example 12 | Structure γ1 | 12M LiCl + 1M LiOH | 2.6M LiCl | 26RT | 5.2RT | 20% |
| Example 13 | Structure γ1 | 12M LiCl + 1M LiOH | 1.3M LiCl | 26RT | 2.6RT | 10% |
| Comparative Example 1 | Structure γ0 | 12M LiCl | | 24RT | | — |
| Comparative example 2 | Structure γ0 | 12M LiCl + 1M LiOH | | 26RT | | — |
| Comparative example 3 | Structure γ0 | 12M LiCl | | 24RT | | — |
| Comparative example 4 | Structure γ0 | 12M LiCl + 1M LiOH | | 26RT | | — |

TABLE 2

| | Separator | | | |
|---|---|---|---|---|
| | Constitution | Air permeability coefficient ($m^2$) | Coulombic efficiency (%) | Cycle characteristics (cycle) |
| Example 1 | Mixed layer + Non-woven | $1.0 \times 10^{-17}$ | 94 | 2000 |
| Example 2 | Mixed layer + Non-woven | $1.0 \times 10^{-14}$ | 86 | 800 |
| Example 3 | Mixed layer + Non-woven | $1.0 \times 10^{-16}$ | 93 | 1200 |
| Example 4 | Mixed layer + Non-woven | $1.0 \times 10^{-18}$ | 96 | 2500 |
| Example 5 | Mixed layer + Non-woven | $1.0 \times 10^{-20}$ | 97 | 2700 |
| Example 6 | Solid electrolyte plate | 0 | 97.5 | 2800 |
| Example 7 | Mixed layer + Non-woven | $1.0 \times 10^{-17}$ | 94 | 1800 |
| Example 8 | Mixed layer + Non-woven | $1.0 \times 10^{-17}$ | 94 | 3000 |
| Example 9 | Mixed layer + Non-woven | $1.0 \times 10^{-17}$ | 94 | 3000 |
| Example 10 | Mixed layer + Non-woven | $1.0 \times 10^{-17}$ | 94 | 4000 |
| Example 11 | Mixed layer + Non-woven | $1.0 \times 10^{-17}$ | 93.5 | 1800 |
| Example 12 | Mixed layer + Non-woven | $1.0 \times 10^{-17}$ | 93 | 1600 |
| Example 13 | Mixed layer + Non-woven | $1.0 \times 10^{-17}$ | 87 | 500 |
| Comparative Example 1 | Mixed layer + Non-woven | $1.0 \times 10^{-17}$ | 80 | 300 |
| Comparative example 2 | Mixed layer + Non-woven | $1.0 \times 10^{-17}$ | 82 | 200 |
| Comparative example 3 | Non-woven | $1.0 \times 10^{-12}$ | 71 | 100 |
| Comparative example 4 | Non-woven | $1.0 \times 10^{-12}$ | 73 | 120 |

(Example 1)

In the battery, as in the above-described embodiment, for example, an electrode group in which a plurality of negative electrodes and a plurality of positive electrodes were alternately arrayed in the array direction was formed. In the electrode group, negative electrodes were disposed at both outer ends in the array direction. Each of the negative electrodes and the positive electrodes was formed as follows.

conductive agent, and 10% by weight of the binder were compounded, and the compounded negative electrode active material, electro-conductive agent and binder were diffused in solvent of N-methylpyrrolidone (NMP) to prepare a slurry. Further, as the negative electrode current collector, a zinc foil of 50 μm in thickness was used. The prepared slurry was applied to a zinc foil, and the applied slurry was dried to form a negative electrode active material-containing layer. Then, the negative electrode current collector and the negative electrode active material-containing layer were pressed to form a negative electrode. In the formed negative electrode, the electrode density in portions other than the negative electrode current collector was 2.0 g/cm³. In addition, a total of four negative electrodes were formed as described above.

For each of the two negative electrodes disposed at both outer ends of the electrode group in the array direction, the slurry was applied only to one side of the negative electrode current collector, and the negative electrode active material-containing layer was only formed on one side of the negative electrode current collector. Furthermore, for each of the negative electrodes other than the two negative electrodes disposed at both outer ends of the electrode group in the array direction, the slurry was applied to both surfaces of the negative electrode current collector, and the negative electrode active material-containing layer was formed on both sides of the negative electrode current collector.

In forming the positive electrode active material-containing layer, a lithium manganese oxide ($LiMn_2O_4$) having a spinel structure with an average particle diameter of 10 μm was' used as a positive electrode active material, a graphite powder was used as an electro-conductive agent, and poly-acrylimide (PAI) was used as a binder. Then, 80% by weight of the positive electrode active material, 10% by weight of the electro-conductive agent, and 10% by weight of the binder were compounded, and the compounded positive electrode active material, electro-conductive agent and binder were diffused in solvent of N-methylpyrrolidone (NMP) to prepare a slurry. In addition, a titanium foil with a thickness of 12 lam was used as the positive electrode current collector. The prepared slurry was applied to a titanium foil, and the applied slurry was dried to form a positive electrode active material-containing layer. Then, the positive electrode current collector and the positive electrode active material-containing layer were pressed to form a positive electrode. In the formed positive electrode, the electrode density in portions other than the positive electrode current collector was 3.0 g/cm³. In addition, a total of three positive electrodes were formed as described above. In addition, the slurry was applied on both sides of the positive electrode current collector about each of all the positive electrodes, and the positive electrode active material-containing layer was formed in both surfaces of the positive electrode current collector.

In the battery, a sheet for forming a separator was formed as follows. The sheet was formed into a two-layer structure including one mixed layer (solid electrolyte containing layer) and one supporter (porous layer). And in this example, the mixed layer was formed in the solid electrolyte containing layer including solid electrolyte particles and a polymeric material. In forming the mixed layer, $Li_4Ti_5O_{12}$ having an average secondary particle diameter (diameter) of 15 μm was used as a solid electrolyte, and polyvinyl butyral (PVB) was used as a polymeric material. Then, 90% by weight of solid electrolyte and 10% by weight of polymeric material were compounded and the compounded solid electrolyte and polymeric material were diffused in a solvent of N-methylpyrrolidone (NMP) to prepare a slurry. Moreover, the non-woven fabric was used as the supporter body. The prepared slurry was applied to a non-woven fabric, and the applied slurry was dried to form a mixed layer. Then, the mixed layer and the supporter were pressed at a pressing pressure of 20 kN and a pressing temperature of 120° C. to form a sheet. In addition, about each of all the sheets, the slurry was applied only to one side of the supporter to form the mixed layer only on the one side the supporter.

Each of the sheets was formed in a substantially rectangular shape having four sides, similarly to the sheets 41A, 41B and the like in one example of FIGS. 5A and 5B. Then, each of the sheets was formed to a thickness of 20 μm. By forming the sheet as described above, the air permeability coefficient of the separator became $1.0 \times 10^{-17}$ m². The air permeability coefficient of the separator was measured and calculated as described above in the first embodiment.

In the formation of the electrode group, the same number of the first bags (corresponding to the bags 26) as the negative electrode were formed by using the sheet formed as described above. Each of the first bags was formed of two sheets in the same manner as in the example of FIGS. 5A and 5B. At this time, in each of the first bags, the two sheets were heat-bonded with the mixed layer positioned inside with respect to the supporter. Therefore, each of the first bags was formed in a state in which the mixed layer (solid electrolyte containing layer) formed the inner surface. Further, in each of the first bags, the bag openings were formed in the same manner as in the example of FIGS. 5A and 5B, and the fusion bonded portion of the two sheets were formed in a substantially U shape. In each of the first bags, the two sheets were heat-bonded via polyethylene by heat-pressing at 130° C.

And, in the interior of each of the first bag, the corresponding one of the negative electrode was housed. Then, the negative electrodes (first bags) and the positive electrodes were arrayed alternately with each of the negative electrodes being housed within the interior of corresponding one of the first bags and the positive electrode being disposed outside all the first bags. Accordingly, a flat electrode group was formed. Therefore, in this example, an electrode group similar to that of the first embodiment and the like was formed. Hereinafter, the structure of the electrode group similar to that of the first embodiment and the like will be referred to as a structure γ1.

Then, the electrode group formed in the structure γ1 was housed in the housing space of the container member. As the container member, a thin metal container formed of stainless steel was used. A container having a thickness of 0.25 mm was used as the metal container. Then, in a state in which the electrode group is housed in the housing space of the container member, the negative electrode side electrolyte was injected into the interior of each of the first bags. Further, in the housing space of the container member, the positive electrode side electrolyte was injected into the outside of all the first bags.

As the positive electrode side electrolyte, an aqueous electrolysis solution obtained by dissolving 12 mol/L of LiCl in water was used. Further, as the negative electrode electrolyte, an aqueous electrolysis solution obtained by dissolving 12 mol/L of LiCl and 1 mol/L of LiOH in water was used. Therefore, the osmotic pressure of the positive electrode side electrolyte was 24 RT, and the osmotic pressure of the negative electrode side electrolyte was 26 RT. Therefore, the osmotic pressure of the positive electrode side electrolyte was 92% with respect to the osmotic pressure of the negative electrode side electrolyte. That is, the osmotic pressure ratio of smaller one of the osmotic pressures of the positive electrode side electrolyte and the negative electrode side electrolyte to larger one of the osmotic pressures of the positive electrode side electrolyte and the negative electrode side electrolyte was 92%. In addition, the osmotic pressure was calculated by using Equation (1), where the unit of the volume was m³, the unit of the substance mass of the solute in electrolyte was mol.

(Example 2)

In Example 2, in the mixed layer (solid electrolyte containing layer) of the sheet forming the separator, the solid electrolyte was set to 90% by weight and the polymeric material was set to 10% by weight as is Example 1. However, in this example, in the press work of the mixed layer and the supporter, the press pressure was 20 kN, and the pressing temperature was 110° C. Accordingly, the air permeability coefficient of the separator was $1.0 \times 10^{-14}$ m$^2$, which was higher than that of Example 1. Except for the matters described above, a battery was formed in the same manner as in Example 1 such that the electrode group was formed to have a structure γ1.

(Example 3)

In Example 3, in the mixed layer (solid electrolyte containing layer) of the sheet forming the separator, the solid electrolyte was set to 90% by weight and the polymeric material was set to 10% by weight as is Example 2. However, in the press work of the mixed layer and the support, the press pressure was 10 kN, and the pressing temperature was 120° C. Accordingly, the air permeability coefficient of the separator was $1.0 \times 10^{-16}$ m$^2$, which is lower than that of Example 2 but higher than that of Example 1. Except for the matters described above, a battery was formed in the same manner as in Example 1 and Example 2 such that the electrode group was formed to have a structure γ1.

(Example 4)

In Example 4, in the mixed layer (solid electrolyte containing layer) of the sheet which formed a separator, the ratio of a solid electrolyte and a polymeric material was changed from that in Example 1 to that in Example 3. In this example, the ratio of the polymeric material was made higher than that of Example 1 by setting the ratio of the solid electrolyte to 80% by weight and the polymeric material to 20% by weight. In the press work of the mixed layer and the supporter, the press pressure was 20 kN, and the pressing temperature was 120° C. Accordingly, the air permeability coefficient of the separator was $1.0 \times 10^{-18}$ m$^2$ and was lower than that of Example 1. Except for the matters described above, a battery was formed in the same manner as in Example 1 to Example 3 such that the electrode group was formed to have a structure γ1.

(Example 5)

In Example 5, in the mixed layer (solid electrolyte containing layer) of the sheet forming the separator, the solid electrolyte was set to 80% by weight and the polymeric material was set to 20% by weight as is Example 4. In the press work of the mixed layer and the supporter, the press pressure was 30 kN, and the pressing temperature was 130° C. Accordingly, the air permeability coefficient of the separator was $1.0 \times 10^{-20}$ m$^2$ and was further lower than that of Example 4. Except for the matters described above, a battery was formed in the same manner as in Example 1 to Example 4 such that the electrode group was formed to have a structure γ1.

(Example 6)

In Example 6, in the sheet for forming the separator, the mixed layer and the supporter were not formed, and the sheet was formed only of the solid electrolyte plate. The ceramic plate of LATP was used as a sheet formed only of the plate of a solid electrolyte. In this example, the air permeability coefficient of the separator was 0 m$^2$. Except for the matters described above, a battery was formed in the same manner as in Example 1 to Example 5 such that the electrode group was formed to have a structure γ1.

(Example 7)

In Example 7, in the same manner as in Example 1, the same number of first bags (corresponding to the bags 26) as the negative electrodes were formed. Further, in this example, in addition to the first bag, the second bag (corresponding to the bag 46) was formed in the same number as the positive electrode. Similar to the first bag, each of the second bags was formed by using the sheet described above in Example 1. Therefore, each of the second bags was formed of two sheets in the same manner as in the example of FIGS. 5A and 5B. At this time, in each of the second bags, the two sheets were heat-bonded with the solid electrolyte containing layer positioned outside the supporter. Therefore, each of the second bags was formed in a state in which the solid electrolyte containing layer (mixed layer) formed the outer surface. Further, in each of the second bags, a bag opening was formed, and a fusion bonded portion of the two sheets was formed in a substantially U shape. In each of the second bags, the two sheets were heat-bonded via polyethylene by heat-bonded at 130° C.

Corresponding one of the negative electrodes was housed within the interior of each of the first bags and corresponding one of the positive electrodes was housed within the interior of each of the second bags. Then, the negative electrodes (first bags) and the positive electrodes (second bags) were alternately arrayed in a state in which each of the negative electrodes was housed in the interior of corresponding one of the first bags and each of the positive electrodes was housed in each of the second bags. Accordingly, a flat electrode group was formed. Therefore, in this example, an electrode group similar to that of the second embodiment and the like was formed. Hereinafter, the structure of the electrode group similar to that of the second embodiment and the like will be referred to as a structure γ2.

Then, the electrode group formed in the structure γ2 was housed in the housing space of the container member. As a container member, the metal container similar to Example 1 was used. Then, in a state in which the electrode group is housed in the housing space of the container member, the negative electrode side electrolyte was injected into the interior of each of the first bags, and the positive electrode side electrolyte was injected into each of the second bags. Except for the matters described above, a battery was formed in the same manner as in Example 1 such that the air permeability coefficient of the separator was $1.0 \times 10^{-17}$ m$^2$.

(Example 8)

In Example 8, only one first bag (corresponding to the bag 26) was formed in the separator. The first bag was formed of a single sheet, in the same manner as the example of FIGS. 15A and 15B. The sheet forming the first bag was formed in a substantially rectangular shape having four sides as in the sheet 61 in one example of FIGS. 15A and 15B, and was formed into a two-layer structure including the mixed layer (solid electrolyte containing layer) and the supporter in the same manner as in the first example.

In the first bag, one part of the sheet was heat-bonded to another part of the sheet with the solid electrolyte containing layer positioned inside the supporter. Therefore, the first bag was formed in a state in which the solid electrolyte containing layer (mixed layer) formed the inner surface. Further, in the first bag, the bag opening and the zigzag portion were formed in the same manner as in the example of FIGS. 15A and 15B to form the fusion bonded portion in the sheet. In the first bag, heat pressing was performed at 130° C. to heat-bond one part of the sheet to another part of the sheet through polyethylene.

All the negative electrodes were then housed in the interior of the first bag. The negative electrodes and the positive electrodes were alternately arrayed in a state in which all the negative electrodes were housed in the interior of the first bag and the positive electrodes were disposed outside the first bag. At this time, in the interior of the first bag, corresponding ones of the negative electrodes were disposed on each of the convex portions of the zigzag portion. Further, outside the first bag, the corresponding one of the positive electrodes was disposed in a gap formed by each of the concave portions of the zigzag portion. By disposing the positive electrodes and the negative electrodes as described above, a flat electrode group was formed. Therefore, in this example, an electrode group similar to that of the third embodiment, for example, is formed. Hereinafter, the structure of the electrode group similar to that of the third embodiment, for example, will be referred to as a structure γ3.

Then, the electrode group formed in the structure γ3 was housed in the housing space of the container member. As a container member, the metal container similar to Example 1 was used. Then, in a state in which the electrode group is housed in the housing space of the container member, the negative electrode side electrolyte was injected into the interior of the first bag. Further, in the housing space of the container member, the positive electrode side electrolyte was injected to the outside the first bag. Except for the matters described above, a battery was formed in the same manner as in Example 1 such that the air permeability coefficient of the separator was $1.0 \times 10^{-17}$ m$^2$.

(Example 9)

In Example 9, in the same manner as in Example 8, only one first bag (corresponding to the bag 26) was formed. Further, in this example, only one second bag (corresponding to the bag 46) was formed in addition to the first bag. The second bag was also formed by using the sheet described above in Example 8 in the same manner as the first bag. Therefore, the second bag was also formed of one sheet in the same manner as in the example of FIGS. 15A and 15B. At this time, in the second bag, one part of the sheet was heat-bonded to another part of the sheet with the solid electrolyte containing layer positioned outside the supporter. Therefore, the second bag was formed in a state in which the solid electrolyte containing layer (mixed layer) formed the outer surface. In the second bag, a bag opening and a zigzag portion were formed to form a fusion bonded portion in the sheet. In the second bag, one part of the sheet was heat-bonded to another part of the sheet through polyethylene at 130° C.

All the negative electrodes were housed in the interior of the first bag, and all the positive electrodes were housed in the interior of the second bag. The negative electrodes and the positive electrodes were alternately arrayed in a state in which all the negative electrodes were housed in the interior of the first bag and the positive electrodes were housed in the interior of the second bag. At this time, in the interior of the first bag, corresponding ones of the negative electrodes were disposed on each of the convex portions of the zigzag portion. In addition, in the interior of the second bag, corresponding one of the positive electrodes was disposed on each of the convex portions of the zigzag portion. By disposing the positive electrodes and the negative electrodes as described above, a flat electrode group was formed. Therefore, in this example, an electrode group similar to that of the fourth embodiment, for example, is formed. Hereinafter, the structure of the electrode group similar to that of the fourth embodiment, for example, will be referred to as a structure γ4.

Then, the electrode group formed in the structure γ4 was housed in the housing space of the container member. The metal container similar to Example 1 and Example 8, for example, was used as a container member. Then, in a state in which the electrode group is housed in the housing space of the container member, the negative electrode side electrolyte was injected into the interior of the first bag, and the positive electrode side electrolyte was injected into the second bag. Except for the matters described above, a battery was formed in the same manner as in Example 8 such that the air permeability coefficient of the separator was $1.0 \times 10^{-17}$ m$^2$.

(Example 10)

In Example 10, as the positive electrode side electrolyte, an aqueous electrolysis solution obtained by dissolving 13 mol/L of LiCl in water was used. Further, as the negative electrode electrolyte, an aqueous electrolysis solution obtained by dissolving 12 mol/L of LiCl and 1 mol/L of LiOH in water was used in the same manner as in Example 1. Therefore, the osmotic pressure of the positive electrode side electrolyte was 26 RT, and the osmotic pressure of the negative electrode side electrolyte was 26 RT. Therefore, the osmotic pressure of the positive electrode side electrolyte was 100% with respect to the osmotic pressure of the negative electrode side electrolyte. That is, the osmotic pressure ratio of smaller one of the osmotic pressures of the positive electrode side electrolyte and the negative electrode side electrolyte to larger one of the osmotic pressures of the positive electrode side electrolyte and the negative electrode side electrolyte was 100%. Except for the matters described above, a battery was formed in the same manner as in Example 1 such that the electrode group was formed on the structure γ1 and that the air permeability coefficient of the separator was $1.0 \times 10^{-17}$ m$^2$.

(Example 11)

In Example 11, as the positive electrode side electrolyte, an aqueous electrolysis solution obtained by dissolving 6.5 mol/L of LiCl in water was used. Further, as the negative electrode electrolyte, an aqueous electrolysis solution obtained by dissolving 12 mol/L of LiCl and 1 mol/L of LiOH in water was used in the same manner as in Example 1. Therefore, the osmotic pressure of the positive electrode side electrolyte was 13 RT, and the osmotic pressure of the negative electrode side electrolyte was 26 RT. Therefore, the osmotic pressure of the positive electrode side electrolyte was 50% with respect to the osmotic pressure of the negative electrode side electrolyte. That is, the osmotic pressure ratio of smaller one of the osmotic pressures of the positive electrode side electrolyte and the negative electrode side electrolyte to larger one of the osmotic pressures of the positive electrode side electrolyte and the negative electrode side electrolyte was 50%. Except for the matters described above, a battery was formed in the same manner as in Example 1 such that the electrode group was formed on the structure γ1 and that the air permeability coefficient of the separator was $1.0 \times 10^{-17}$ m$^2$.

(Example 12)

In Example 12, as the positive electrode side electrolyte, an aqueous electrolysis solution obtained by dissolving 2.6 mol/L of LiCl in water was used. Further, as the negative electrode electrolyte, an aqueous electrolysis solution obtained by dissolving 12 mol/L of LiCl and 1 mol/L of LiOH in water was used in the same manner as in Example 1. Therefore, the osmotic pressure of the positive electrode side electrolyte was 5.2 RT, and the osmotic pressure of the negative electrode side electrolyte was 26 RT. Therefore, the osmotic pressure of the positive electrode side electrolyte was 20% with respect to the osmotic pressure of the negative electrode side electrolyte. That is, the osmotic pressure ratio of smaller one of the osmotic pressures of the positive electrode side electrolyte and the negative electrode side electrolyte to larger one of the osmotic pressures of the positive electrode side electrolyte and the negative electrode side electrolyte was 20%. Except for the matters described above, a battery was formed in the same manner as in Example 1 such that the electrode group was formed on the structure γ1 and that the air permeability coefficient of the separator was $1.0 \times 10^{-17}$ m$^2$.

(Example 13)

In Example 13, as the positive electrode side electrolyte, an aqueous electrolysis solution obtained by dissolving 1.3 mol/L of LiCl in water was used. Further, as the negative electrode electrolyte, an aqueous electrolysis solution obtained by dissolving 12 mol/L of LiCl and 1 mol/L of LiOH in water was used in the same manner as in Example 1. Therefore, the osmotic pressure of the positive electrode side electrolyte was 2.6 RT, and the osmotic pressure of the negative electrode side electrolyte was 26 RT. Therefore, the osmotic pressure of the positive electrode side electrolyte was 10% with respect to the osmotic pressure of the negative electrode side electrolyte. That is, the osmotic pressure ratio of smaller one of the osmotic pressures of the positive electrode side electrolyte and the negative electrode side electrolyte to larger one of the osmotic pressures of the positive electrode side electrolyte and the negative electrode side electrolyte was 10%. Except for the matters described above, a battery was formed in the same manner as in Example 1 such that the electrode group was formed on the structure γ1 and that the air permeability coefficient of the separator was $1.0 \times 10^{-17}$ m$^2$.

(Comparative Example 1)

In Comparative Example 1, one negative electrode was formed in the same manner as in Example 1, and one positive electrode was formed in the same manner as in Example 1. The negative electrode active material-containing layers were formed on both sides of the negative electrode current collector, and the positive electrode active material-containing layers were formed on both sides of the positive electrode current collector. Further, in the same manner as in Example 1, two sheets each having a two-layer structure provided with a mixed layer (solid electrolyte containing layer) and a supporter (non-woven fabric) were formed. The laminated body laminated in order of a negative electrode, a sheet, a positive electrode, and a sheet was formed. Then, the formed laminated body was spirally wound. At this time, the laminated body was wound such that the negative electrode formed the outermost periphery. Then, the rolled laminated body was heat-pressed at 90° C. to form a flat electrode group. Accordingly, in the electrode group, a portion of the separator interposed between the negative electrode and the positive electrode was formed by the sheet.

In the formation of the electrode group, the above-described lamination and winding were performed with the mixed layer formed the first separator surface facing the negative electrode in the separator, and the supporter formed the second separator surface facing the positive electrode in the separator. The structure of the electrode group formed as described above is referred to as structure γ0.

Then, the electrode group formed in the structure γ0 was housed in the housing space of the container member. As a container member, the metal container similar to Example 1 was used. In the electrode group of the structure γ0, a separator (sheet) is interposed between the negative electrode and the positive electrode, but unlike examples 1 to 13, the first bag and the second bag were not formed by the separator. Therefore, the electrolyte cannot be separated between the negative electrode side and the positive electrode side in the housing space of the container member. Therefore, in this comparative example, only one type of electrolyte was used, and a common electrolyte was used for the negative electrode side and the positive electrode side.

In this comparative example, the same electrolyte as the positive electrode side electrolyte of Example 1 was used. That is, the electrolyte used was an aqueous electrolysis solution obtained by dissolving 12 mol/L of LiCl in water. Therefore, the osmotic pressure of the electrolyte was 24 RT. The electrolyte was injected into the housing space with the electrode group disposed in the housing space of the container member. Except for the matters described above, a battery was formed in the same manner as in Example 1 such that the air permeability coefficient of the separator was $1.0 \times 10^{-17}$ m$^2$.

(Comparative Example 2)

In Comparative Example 2, as in Comparative Example 1, an electrode group was formed to have a structure γ0. Therefore, also in this comparative example, only one type of electrolyte was used, and a common electrolyte was used for each of the negative electrode side and the positive electrode side. However, in this comparative example, the same electrolyte as the negative electrode side electrolyte of Example 1 was used. That is, the electrolyte used was an aqueous electrolysis solution obtained by dissolving 12 mol/L of LiCl and 1 mol/L of LiOH in water. Therefore, the osmotic pressure of the electrolyte was 26 RT. Except for the matters described above, a battery was formed in the same manner as in Comparative Example 1 such that the air permeability coefficient of the separator was $1.0 \times 10^{-17}$ m$^2$.

(Comparative Example 3)

In Comparative Example 3, the electrode group was formed to have a structure γ0 as in Comparative Example 1 and Comparative Example 2. Therefore, also in this comparative example, only one type of electrolyte was used, and a common electrolyte was used for each of the negative electrode side and the positive electrode side. However, in this comparative example, the above-described mixed layer (solid electrolyte containing layer) was not provided on the separator, and the separator was formed only of the non-woven fabric (supporter). Therefore, the air permeability coefficient of the separator was $1.0 \times 10^{-12}$ m$^2$. Except for the above-described matters, a battery was formed in the same manner as in Comparative Example 1 such that an aqueous electrolysis solution obtained by dissolving 12 mol/L of LiCl in water was used as an electrolyte.

(Comparative Example 4)

In Comparative Example 4, as in Comparative Examples 1 to 3, the electrode group was formed to have a structure γ0. Therefore, also in this comparative example, only one type of electrolyte was used, and a common electrolyte was used for each of the negative electrode side and the positive electrode side. Further, also in this comparative example, as in Comparative Example 3, the separator was formed only of the non-woven fabric (supporter) without providing the above-described mixed layer in the separator. However, in this comparative example, the same electrolyte as the negative electrode side electrolyte of Example 1 was used. That is, the electrolyte used was an aqueous electrolysis solution obtained by dissolving 12 mol/L of LiCl and 1 mol/L of LiOH in water. Therefore, the osmotic pressure of the electrolyte was 26 RT. Except for the matters described above, a battery was formed in the same manner as in Comparative Example 3 such that the air permeability coefficient of the separator was $1.0\times10^{-12}$ m$^2$.

(Contents of Test)

In the test, Coulombic efficiency (charge/discharge efficiency) was evaluated as follows for each of the batteries of Examples 1 to 13 and Comparative Examples 1 to 4 described above. First, the batteries of Examples 1 to 13 and Comparative Examples 1 to 4 were formed as described above, and were allowed to stand for 6 hours. Then, after 6 hours of waiting time had elapsed, each of the batteries was charged to 2.7 V. Charging was performed at a constant current of 1C (corresponding to 100 mA) rate under a 25° C. environment. In addition, 1C of each battery was calculated based on the negative electrode active material. After charging to 2.7 V, it was discharged to 2.2 V. Discharge was also performed at a constant current of 1C rate in a 25° C. environment. And in the test, 10 cycles of charging up to 2.7V at 1C rate and discharging up to 2.2 V at 1C rate were performed for each of the batteries. And Coulombic efficiency η was calculated like Equation (17) from charge capacity Q1 and discharge capacity Q2 of the 10th cycle.

$$\eta(\%)=(Q2/Q1)\times100 \quad (17)$$

Further, in the test, the cycle characteristics of the batteries of Examples 1 to 13 and Comparative Examples 1 to 4 were evaluated as follows. In the tests, similarly to the evaluation of the Coulombic efficiency, the batteries of Examples 1 to 13 and Comparative Examples 1 to 4 were formed as described above, and then were allowed to stand for 6 hours. After 6 hours of waiting time had elapsed, each battery was charged at a constant current of 1C rate up to 2.7 V and was discharged at a constant current of 1C rate up to 2.2 V repeatedly under an environment of 25° C. When charging to 2.7 V and discharging to 2.2 V were repeated, the discharge capacity at the 10th cycle was measured for each of the batteries. The cycle number during which the discharge capacity reduces to 80% with respect to the discharge capacity of 10th cycle was acquired as cycle characteristics.

(Test Results and Discussion)

In Examples 1 to 13, both the Coulombic efficiency and the cycle characteristics were improved as compared to Comparative Examples 1 to 4. Therefore, it was proved that the Coulombic efficiency and the cycle characteristics were improved by separating the electrolyte between the negative electrode side and the positive electrode side by the separator and by using an appropriate electrolyte for the positive electrode side electrolyte and the negative electrode side electrolyte. Therefore, it was demonstrated that the electrolyte side reaction was stably suppressed by separating the electrolyte between the negative electrode side and the positive electrode side by the separator and by using an appropriate electrolyte for the positive electrode side electrolyte and the negative electrode side electrolyte.

In addition, in Examples 1 to 13, in the configuration in which the electrolyte was separated into the negative electrode side and the positive electrode side by the separator, it was demonstrated that the Coulombic efficiency and the cycle characteristics were ensured high by setting the air permeability coefficient of the separator to $1.0\times10^{-14}$ m$^2$ or less. Therefore, it was demonstrated that by separating the electrolyte between the negative electrode side and the positive electrode side by the separator having an air permeability coefficient of $1.0\times10^{-14}$ m$^2$ or less, the negative electrode side electrolyte and the positive electrode side electrolyte becomes less likely to permeate the separator, and the negative electrode side electrolyte and the positive electrode side electrolyte was proved to become less likely to mix. Therefore, it was demonstrated that side reactions of the electrolyte suppressed more stably by separating the electrolyte between the negative electrode side and the positive electrode side by a separator having an air permeability coefficient of $1.0\times10^{-14}$ m$^2$ or less, and by using appropriate electrolytes for the positive electrode side electrolyte and the negative electrode side electrolyte.

Further, from Examples 1 to 6, it was demonstrated that the Coulombic efficiency and the cycle characteristics of the battery were improved as the separator's air permeability coefficient was smaller if the other conditions were the same. Therefore, it was demonstrated that the lower the air permeability coefficient of the separator, the less likely the negative electrode side electrolyte and the positive electrode side electrolyte to permeate through the separator, and the more stably the side reaction of the electrolyte was suppressed.

Further, according to Example 1 and Examples 7 to 9, if the other conditions were the same, it was demonstrated that when the electrode group was formed to any one of the structures γ3 and γ4, the cycle characteristics of the battery were improved as compared to the case under the same other conditions, the electrode group was formed to any one of the structures γ1 and γ2. Therefore, it was proved that the above-described dry-up was less likely to occur in the first electrode in each of the structures γ3 and γ4 in which the plurality of first electrodes and the first electrolyte were housed in one first bag.

Further, it was demonstrated from Example 1 and Examples 10 to 13 that the larger (the closer to 100%) the osmotic pressure ratio which was the ratio of the osmotic pressure of the positive electrode side electrolyte to the osmotic pressure of the negative electrode side electrolyte (here, (smaller osmotic pressure))/(larger osmotic pressure)), the more the Coulombic efficiency of the battery and the cycle characteristics were improved, if the other conditions were the same. In particular, it was demonstrated that the Coulombic efficiency and the cycle characteristics of the battery could be secured to a high level by setting the smaller one of the osmotic pressures of the positive electrode side electrolyte and the negative electrode side electrolyte to be 10% or more with respect to the larger one of the osmotic pressures of the positive electrode side electrolyte and the negative electrode side electrolyte. That is, it was demonstrated that the positive electrode side electrolyte and the negative electrode side electrolyte were less likely to permeate through the separator and the negative electrode side electrolyte and the positive electrode side electrolyte were less likely to mix by setting the smaller one of the osmotic pressures of the positive electrode side electrolyte and the negative electrode side electrolyte to 10% or more with respect to the larger one of the osmotic pressures of the positive electrode side electrolyte and the negative electrode side electrolyte.

According to the battery of at least one of the embodiments or examples described above, in the housing space of the container member, the first electrode is housed in the interior of the bag of the separator, and in the interior of the bag, the first electrolyte is retained by the first electrode. The second electrode is disposed outside the bag in the housing space, and the second electrolyte is retained by the second electrode outside the bag in the housing space. Accordingly, a battery in which the side reaction of the electrolyte is stably suppressed can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery comprising:
a container member having a housing space in the interior thereof;
a separator which is housed in the housing space of the container member, and which has an air permeability coefficient of greater than 0 m$^2$ and less than or equal to $1.0\times10^{-14}$ m$^2$, the separator including a first bag;
a first electrode housed in the interior of the first bag of the separator in the housing space;
a first electrolyte retained by the first electrode in the interior of the first bag;
a second electrode which is opposite polarity to the first electrode, and which is disposed outside the first bag in the housing space; and
a second electrolyte retained by the second electrode outside the first bag in the housing space.

2. The battery according to claim 1, comprising:
plural of the first electrode and plural of the second electrode, wherein
the separator includes the same number of first bags as the first electrodes,
corresponding one of the first electrodes is housed within the interior of each of the first bags of the separator,
the first electrode and the second electrode are alternately arrayed in the housing space of the container member, and
at least a part of the separator is interposed between the first electrode and the second electrode adjacent to each other in an array direction.

3. The battery according to claim 1, wherein the separator includes a second bag in which the second electrode is housed,
the second bag is formed outside the first bag in the housing space of the container member, and
the second electrolyte is retained by the second electrode in the interior of the second bag.

4. The battery according to claim 1, wherein the separator includes a first separator surface facing the negative electrode which is one of the first electrode and the second electrode, and a second separator surface facing the positive electrode which is other than the negative electrode of the first electrode and the second electrode,
the separator includes a composition layer,
the composition layer includes a particle and a polymeric material, or includes a solid electrolyte, and
the first separator surface of the separator is formed of the composition layer.

5. The battery according to claim 4, wherein the composition layer includes at least one selected from the group consisting of solid electrolyte, aluminum oxide and silica as the particle.

6. The battery according to claim 4, wherein the separator further includes a supporter, and
the composition layer is disposed on at least the side where the negative electrode is located with respect to the supporter.

7. The battery according to claim 1, wherein a ratio of a smaller one of an osmotic pressure of the first electrolyte and an osmotic pressure of the second electrolyte to a larger one of the osmotic pressure of the first electrolyte and the osmotic pressure of the second electrolyte is in a range from 10% to 100%.

8. The battery according to claim 1, wherein each of the first electrolyte and the second electrolyte is an electrolyte including an aqueous solvent.

9. The battery according to claim 1, wherein the first electrolyte and the second electrolyte have different pH values from each other.

10. A battery pack comprising one or more of the batteries according to claim 1.

11. A battery pack according to claim 10, further comprising:
an external terminal electrically connected to the battery; and
a protective circuit.

12. A stationary power supply comprising the battery pack according to claim 10.

13. A battery comprising:
a container member having a housing space in the interior thereof;
a separator including a first bag and housed in the housing space of the container member, the separator having an air permeability coefficient of greater than 0 m$^2$ and less than or equal to $1.0\times10^{-14}$ m$^2$;
a plurality of first electrodes housed in the interior of the first bag of the separator in the housing space;
a first electrolyte retained by the plurality of first electrodes in the interior of the first bag;
a plurality of second electrodes which are opposite polarity to the first electrodes, and which are disposed outside the first bag in the housing space; and
a second electrolyte retained by the plurality of second electrodes outside the first bag in the housing space.

14. The battery according to claim 13, wherein the separator includes a second bag in which the plurality of second electrodes are housed,
the second bag is formed outside the first bag in the housing space of the container member, and
the second electrolyte is retained by the plurality of second electrodes in the interior of the second bag.

15. The battery according to claim 13, wherein the first electrodes and the second electrodes are alternately arrayed in the housing space of the container member, and
a part of the separator is interposed between the first electrode and the second electrode adjacent to each other in an array direction.

16. The battery according to claim 13, wherein the separator includes a first separator surface facing the negative electrode which is one of the first electrode and the second electrode, and a second separator surface facing the positive electrode which is other than the negative electrode of the first electrode and the second electrode,
the separator includes a composition layer,
the composition layer includes a particle and a polymeric material, or includes a solid electrolyte, and
the first separator surface of the separator is formed of the composition layer.

17. The battery according to claim 16, wherein the composition layer includes at least one selected from the group consisting of solid electrolyte, aluminum oxide and silica as the particle.

18. The battery according to claim 16, wherein the separator further includes a supporter, and the composition layer is disposed on at least the side where the negative electrode is located with respect to the supporter.

19. The battery according to claim 13, wherein a ratio of a smaller one of an osmotic pressure of the first electrolyte and an osmotic pressure of the second electrolyte to a larger one of the osmotic pressure of the first electrolyte and the osmotic pressure of the second electrolyte is in a range from 10% to 100%.

20. The battery according to claim 13, wherein each of the first electrolyte and the second electrolyte is an electrolyte including an aqueous solvent.

21. The battery according to claim 13, wherein the first electrolyte and the second electrolyte have different pH values from each other.

22. A battery pack comprising one or more of e batteries according to claim 13.

23. A battery pack according to claim 22, further comprising:

an external terminal electrically connected to the battery; and a protective circuit.

24. A stationary power supply comprising the battery pack according to claim 22.

25. The battery according to claim 1, wherein the air permeability coefficient of the separator is from $1.0 \times 10^{-20}$ $m^2$ to $1.0 \times 10^{-14}$ $m^2$.

26. The battery according to claim 13, wherein the air permeability coefficient of the separator is from $1.0 \times 10^{-20}$ $m^2$ to $1.0 \times 10-14$ $m^2$.

* * * * *